(12) United States Patent
Kang et al.

(10) Patent No.: US 11,906,232 B2
(45) Date of Patent: *Feb. 20, 2024

(54) REFRIGERATOR

(71) Applicant: LG ELECTRONICS INC., Seoul (KR)

(72) Inventors: Myoungju Kang, Seoul (KR); Deokhyun Youn, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,466

(22) Filed: Sep. 21, 2022

(65) Prior Publication Data
US 2023/0022735 A1 Jan. 26, 2023

Related U.S. Application Data

(63) Continuation of application No. 17/042,111, filed as application No. PCT/KR2019/004005 on Apr. 4, 2019, now Pat. No. 11,480,381.

(30) Foreign Application Priority Data

Apr. 5, 2018 (KR) .......................... 10-2018-0039914

(51) Int. Cl.
*F25D 11/02* (2006.01)
*F16L 59/065* (2006.01)
(Continued)

(52) U.S. Cl.
CPC ............ *F25D 11/02* (2013.01); *F16L 59/065* (2013.01); *F25D 23/02* (2013.01); *F25D 23/06* (2013.01);
(Continued)

(58) Field of Classification Search
CPC ...... F25D 11/02; F25D 2201/14; F25D 23/02; F25D 23/06; F25D 23/065; F25D 23/066;
(Continued)

(56) References Cited

U.S. PATENT DOCUMENTS 6,625,998 B2   9/2003   Kim et al.
6,725,624 B2   4/2004   Hirath
(Continued)

FOREIGN PATENT DOCUMENTS

CN   102494460   6/2012
CN   107850380   3/2018
(Continued)

OTHER PUBLICATIONS

International Search Report and PCT/KR2019/004005 Written Opinion dated Jul. 26, 2019 issued in Application No. PCT/KR2019/004005.

(Continued)

*Primary Examiner* — Filip Zec
(74) *Attorney, Agent, or Firm* — KED & ASSOCIATES, LLP

(57) ABSTRACT

A refrigerator includes a vacuum adiabatic body having a storage space to store a product and a door to open or close the storage space. The main body includes a first plate and perforation plate. A cool air supply gap through which cool aft flows is formed between the first plate and the perforation plate. At least two holes through which cool air is discharged to the storage space are formed in the perforation plate. The first plate may be a wall of the main body.

20 Claims, 47 Drawing Sheets

(51) Int. Cl.
  *F25D 23/02* (2006.01)
  *F25D 23/06* (2006.01)
  *F25D 23/08* (2006.01)

(52) U.S. Cl.
  CPC ......... *F25D 23/065* (2013.01); *F25D 23/066* (2013.01); *F25D 23/069* (2013.01); *F25D 23/087* (2013.01); *F25D 2201/14* (2013.01)

(58) Field of Classification Search
  CPC .... F25D 23/069; F25D 23/082; F25D 23/087; F16L 59/065
  See application file for complete search history.

(56) References Cited

U.S. PATENT DOCUMENTS

| | | | |
|---|---|---|---|
| 9,441,779 B1 * | 9/2016 | Alshourbagy | ........... F25D 23/08 |
| 9,463,918 B2 * | 10/2016 | Reid | .................. B65D 81/3818 |
| 11,085,690 B2 | 8/2021 | Naik | |
| 11,248,833 B2 | 2/2022 | Kim | |
| 11,287,079 B2 | 3/2022 | Biswas | |
| 11,320,086 B2 * | 5/2022 | Reid | ........................ A47J 41/02 |
| 2004/0226956 A1 | 11/2004 | Brooks | |
| 2006/0070395 A1 | 4/2006 | Lee et al. | |
| 2009/0288441 A1 | 11/2009 | Fotiadis et al. | |
| 2012/0104923 A1 | 5/2012 | Jung et al. | |
| 2015/0030800 A1 | 1/2015 | Jung | |
| 2015/0159937 A1 | 6/2015 | Jang et al. | |
| 2016/0236452 A1 | 8/2016 | Caps | |
| 2018/0216872 A1 | 8/2018 | Jung et al. | |
| 2018/0224194 A1 | 8/2018 | Jung et al. | |
| 2018/0224195 A1 | 8/2018 | Jung et al. | |
| 2018/0266620 A1 * | 9/2018 | Kawarazaki | ....... B65D 81/2069 |

FOREIGN PATENT DOCUMENTS

| | | |
|---|---|---|
| CN | 107850381 | 3/2018 |
| EP | 2 884 208 | 6/2015 |
| JP | 59-176570 | 10/1984 |
| JP | 2011-153719 | 8/2011 |
| KR | 10-0343719 | 6/2002 |
| KR | 10-2006-0030760 | 4/2006 |
| KR | 10-2015-0012712 | 2/2015 |
| KR | 10-2017-0016187 | 2/2017 |
| KR | 10-2017-0016188 | 2/2017 |
| KR | 10-2019-0070791 | 6/2019 |
| WO | WO 2014/196219 | 12/2014 |
| WO | WO 2017/023097 | 2/2017 |

OTHER PUBLICATIONS

Chinese Office Action issued in Application No. 201980019026.1 dated Nov. 12, 2021.
European Search Report issued in Application No. 19781152.4 dated Nov. 19, 2021.
Korean Office Action issued in Application No. 10-2018-0039914 dated May 20, 2022.
U.S. Notice of Allowance dated Jun. 23, 2022 issued in U.S. Appl. No. 17/042,111.

* cited by examiner

REFRIGERATOR

CROSS-REFERENCE TO RELATED APPLICATIONS

This application is a continuation of U.S. application Ser. No. 17/7,042,111, filed Sep. 26, 2020, which is a U.S. National Stage Application under 35 U.S.C. § 371 of POT Application No. PCT/KR2019/004005, filed Apr. 4, 2019, which claims priority to Korean Patent Application No. 10-2018-0039914, filed Apr. 5, 2018, whose entire disclosures are hereby incorporated by reference.

TECHNICAL FIELD

The present invention relates to a refrigerator.

BACKGROUND ART

A vacuum adiabatic body may suppress heat transfer by vacuuming an interior of a body. The vacuum adiabatic body may reduce heat transfer by convection and conduction, and may be applied to heating apparatuses and refrigerating apparatuses. In a typical adiabatic method applied to a refrigerator, although applied differently in refrigeration and freezing, a foam urethane adiabatic wall having a thickness of about 30 cm or more is generally provided. However, the internal volume of the refrigerator may be reduced.

In order to increase the internal volume of a refrigerator, a vacuum adiabatic body may be applied. Korean Patent No. 10-0343719 discloses a method in which a vacuum adiabatic panel is prepared and then built in the walls of a refrigerator. The exterior of the vacuum adiabatic panel may be finished with a separate molding such as Styrofoam (polystyrene). According to the method, additional foaming is not required, and the adiabatic performance of the refrigerator is improved. However, fabrication cost is increased, and a fabrication method is complicated.

As another example, a technique of providing walls using a vacuum adiabatic material and additionally providing adiabatic walls using a foam filling material is disclosed in Korean Patent Publication No. 10-2015-0012712. However, fabrication cost is increased, and a fabrication method is complicated.

As another example, all walls of a refrigerator may be fabricated using a vacuum adiabatic body that is a single product. For example, a technique of providing an adiabatic structure of a refrigerator configured to be in a vacuum state is disclosed in U.S. Patent Publication No. US 2004/0226956 A1 However, it is difficult to obtain an adiabatic effect of a practical level, as it may be difficult to provide refrigerator walls of in a sufficient vacuum state. It may be difficult to prevent heat transfer at a contact portion between external and internal cases having different temperature, to maintain a stable vacuum state, and to prevent deformation of the cases due to a sound pressure in the vacuum state. Due to these problems, the technique disclosed in U.S. Patent Publication No. US 2004/0226956 A1 is limited to cryogenic refrigerating apparatuses, and is not applied to refrigerating apparatuses used in general households.

As a further alternative, the applicant of the present invention has filed Korean Patent Application Publication No. 10-2017-0016187, which discloses a refrigerator in which both a main body and a door are provided as vacuum adiabatic bodies. The vacuum adiabatic body itself may perform an adiabatic function, regardless of a type of other installed components.

As a further alternative, the applicant of the present invention has proposed a configuration of a cool air flow path in a case of a refrigerator to which a vacuum adiabatic body is applied in Korean Patent Application No. 10-2017-0171666.

However, a space inside the refrigerator is divided into a strongly cooled region and a weakly cooled region by applying a method using a forced flow of air while supplying cool air to the space inside the refrigerator. In the strongly cooled region, the stored product freezes, and in the weakly cooled region, food goes bad. When the stored product blocks the cool air discharge port, this problem becomes worse. In addition, in when excess product is stored and loaded inside the refrigerator, cool air cannot reach the product stored on the side having the door.

DISCLOSURE

Technical Problem

The present invention is proposed in the background described above and an objective thereof is to solve an imbalance in the temperature distribution in the space inside the refrigerator.

An object of the present invention is to prevent a strong cooling of a stored product and an unbalanced distribution of cool air which occurs when the stored product blocks a cool air discharge port.

An object of the present invention is to obtain a fresh storage effect with respect to a product near the door by sufficiently supplying cool air to a side of the door.

Technical Solution

A refrigerator according to the present invention may include a main body-side vacuum adiabatic body which has an accommodation space for accommodating a product and a door configured to selectively open the accommodation space. The vacuum adiabatic body may include a first plate member configured to define at least a portion of a wall for space inside the refrigerator and which is made of a material having a high thermal conductivity coefficient, a second plate member configured to define at least a portion of a wall for space outside the refrigerator having a different temperature from the space inside the refrigerator to provide a vacuum space between the first plate member and the second plate member, and a perforation plate which provides a cool air supply gap part through which cool air flows at a gap between the first plate member and the perforation plate and provides at least two holes for discharging cool air into the space inside the refrigerator. According to the present invention, cool air can be supplied to a wide area through the perforation plate.

The perforation plate may be provided on at least one of a rear surface or an upper surface of the body-side vacuum adiabatic body. Since the cool air is widely supplied through the surface of the perforation plate, the cooling uniformity of the product stored in the accommodation space can be improved. The perforation plate may be provided on both the rear surface and the upper surface of the body-side vacuum adiabatic body, so that uniformity of cooling performance over the entire accommodation space can be enhanced.

The perforation plate may be provided on the entirety of the rear surfaces of the body-side vacuum adiabatic body so that cool air may be supplied to the entire rear surface thereof. The perforation plate may be provided on the entirety of the upper surfaces of the body-side vacuum adiabatic body so that cool air may be supplied to the entire upper surface thereof.

The perforation plate installed on the upper surface of the main body-side vacuum adiabatic body may be configured to discharge a larger amount of cool air from the front side and more cool air is applied to the product provided at the door, thereby improving the usability of the door.

The perforation plate installed on the upper surface of the main body-side vacuum adiabatic body may be configured to have a larger size of a hole on the front side, thereby enhancing the cool air supply efficiency to the front side.

The at least two holes may be three or more, and the perforation plate installed on the upper surface of the main body-side vacuum adiabatic body may be configured to have more holes at the front side, so that the cool air can be uniformly supplied through the front left and right gaps.

The perforation plate installed on the rear surface of the main body-side vacuum adiabatic body may be configured to charge or produce a larger amount of cool air from the upper portion so that uneven cooling of the product placed under or behind the accommodation space can be prevented.

The perforation plate installed on the rear surface of the main body-side vacuum adiabatic body may be configured to have a larger size of a hole on the upper portion, so that more cool air can be discharged from the upper portion or cool air can be uniformly discharged to at least the upper portion and the lower portion.

The at least two holes may be three or more, and the perforation plate installed on the rear surface of the main body-side vacuum adiabatic body may be configured to have more holes on the upper portion so that cool air can be uniformly discharged from the entire upper space in the left and right direction.

The first plate member may be made of stainless steel and the perforation plate may be made of resin so that the product which is in direct contact with the resin can be prevented from being frozen by conduction cooling and the product can be stored safely. The first plate member may be made of stainless steel so as to increase the strength of the vacuum adiabatic body.

The perforation plate may be provided with a plurality of the at least two holes and the at least two holes may be provided substantially on the entire surface of the perforation plate. Accordingly, the cool air can be supplied to the entire area of the perforation plate so that cool air can be uniformly distributed inside the accommodation space. At least, cool air can sufficiently reach all products adjacent to the perforation plate.

The plurality of holes may be provided at an uneven density in the perforation plate to provide a hole in the region of the perforation plate more tightly or more densely corresponding to the downstream side with respect to the flow path. Accordingly, the supply of cool air to the entire inner surface of the refrigerator can be evenly provided.

Each of the at least two holes may have an area of 7.065 mm2 to 19.625 mm2 so that the cool air is not sprayed at a high speed, and thus cool air discharged outdoors when the door is opened can be reduced and the flow of cool air can be stopped inside the accommodation space. Accordingly, by increasing the wind speed, it is possible to prevent problems such as channel loss and overcooling in a large wind speed region due to the manner in which the cool air reaches the inside of the accommodation space.

The accommodation space may be provided in a refrigerating space and can be more preferably applied in a case of refrigerated products. The perforation plate and the first plate member may contact the cool air supplied from outside, thereby providing a path through which cool air flows directly.

According to another aspect of the present invention, a refrigerator may include a main body which provides an accommodation space in which a product is accommodated and a door configured to selectively open the accommodation space. The main body may further include a perforation plate which is spaced apart from a plate member which forms a wall. A space of a predetermined distance between the perforation plate and the wall may be formed inside the refrigerator to provide a cool air supply gap part through which the cool air flows. A plurality of holes may be machined on the perforation plate. According to this, cool air is discharged through the plurality of holes, so that the product placed in the accommodation space can be uniformly cooled.

The first plate member may be made of a metal material and the perforation plate may be made of resin so that the strength of the main body increases and overcooling of the product in contact with the perforation plate can be prevented.

According to another aspect of the present invention, a refrigerator may include a main body which provides an accommodation space in which a product is accommodated, a door configured to selectively open the accommodation space, and a perforation plate which provides a cool air supply gap part through which cool air flows. The perforation plate may be spaced apart from the first plate member and is configured to define any one surface wall in the space inside the refrigerator. A plurality of holes are machined on the perforation plate. According to the present invention, it is possible to define a wall of any one of the spaces inside the refrigerator in which the product is accommodated, so that the product can be in direct contact with the wall, and thus the uniform cooling of the product accommodated therein can be efficiently performed.

Advantageous Effect

According to the present invention, there is an advantage that the temperature distribution in the space inside the refrigerator becomes uniform.

According to the present invention, there is an advantage that even if any stored product blocks any cool air discharge port, the effect of cool air on the stored product is small, and sufficient cool air can be also supplied to other stored products.

According to the present invention, cool air is also supplied to the product stored on the door side, so that the supply of cool air to the product stored in the door and the product stored close to the door side can be smooth.

According to the present invention, the inner volume inside the refrigerator can be made larger, and the satisfaction of the user can be improved.

DESCRIPTION OF DRAWINGS

FIG. 13 is a view illustrating a state where fastening thereof is completed and FIG. 14 is a view illustrating a fastening process thereof.

FIG. 16 is a view illustrating before the door hinge is installed, and FIG. 17 is a view illustrating a state where the door hinge is installed.

FIG. 18(a) is a sectional view illustrating a contact part between a main body-side vacuum adiabatic body and a door according to the present invention, and FIG. 18(b) is a sectional view illustrating the main body and the door according to the related art.

FIG. 26 is a sectional view illustrating a portion through which the wiring of the lamp does not pass, and FIG. 27 is a sectional view illustrating a portion through which the wiring of the lamp passes.

BEST MODE

Figure 1:
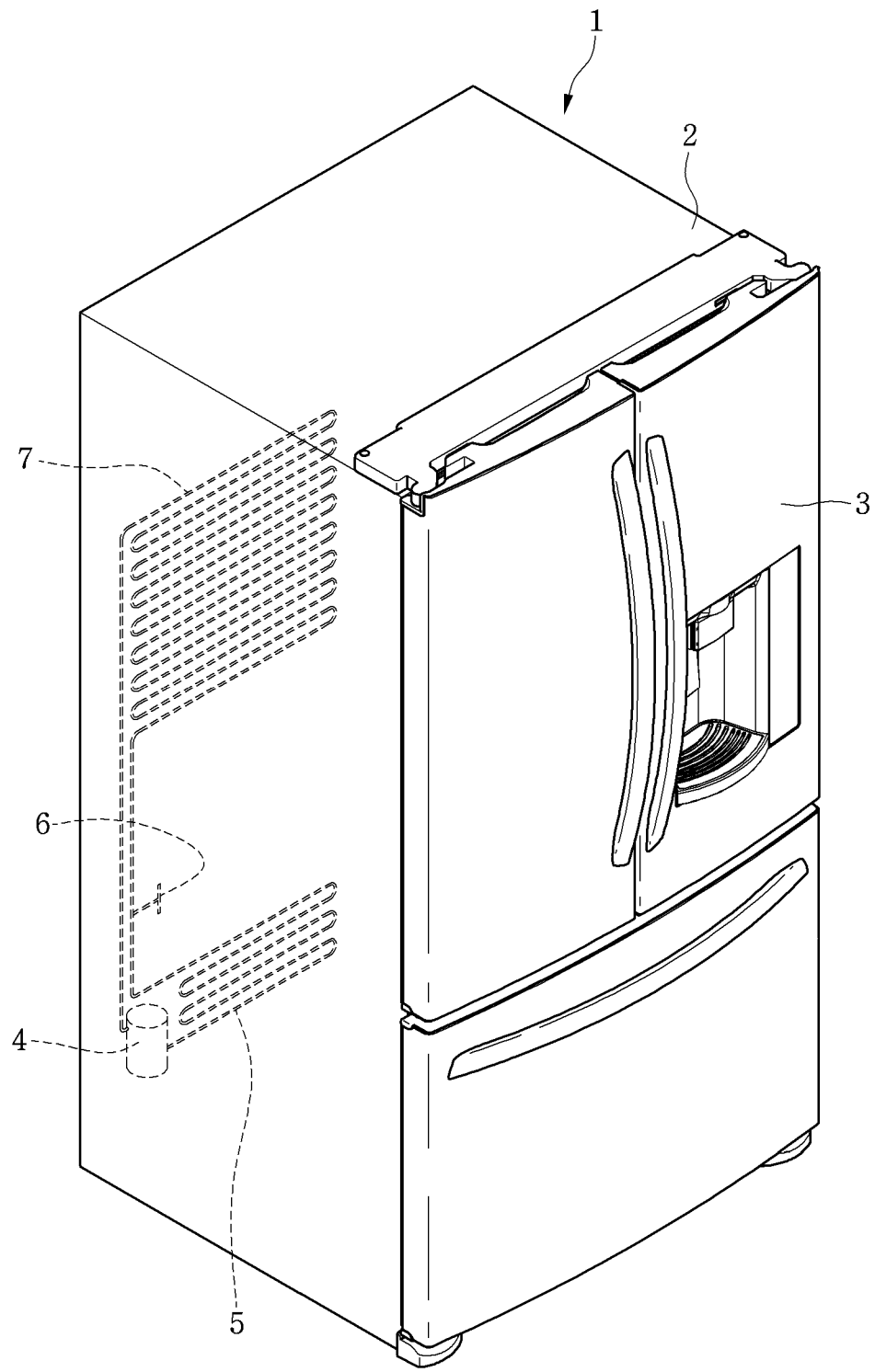
FIG. 1 is a perspective view of a refrigerator according to an embodiment.

Hereinafter, specific embodiments of the present invention are proposed with reference to the drawings. However, there is no intention to limit the idea of the invention to the embodiments described below, a person skilled in the art which understands the idea of the present invention can easily propose other embodiments included within the scope of the same idea by adding, changing, and deleting constituent elements, or the like, but it will be understood that other embodiments are also included within the scope of the present invention.

Hereinafter, the drawings presented for the explanation of the embodiments may simply display parts which differ from the actual products, be exaggerated, simple, or detailed, however, this is to facilitate the understanding of the technical idea of the present invention, and should not be construed as being limited to sizes, structures, and shapes illustrated in the drawings. However, preferably, the actual shape may be illustrated as much as possible.

In the following embodiments, unless the embodiments are not compatible with each other, the description of any one embodiment may be applied to the description of another embodiment, and some configurations of any one embodiment may be applied to another configuration in a state where only a specific part thereof is modified.

In the following description, the term 'vacuum pressure' means a certain pressure state lower than atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity or chamber 9 (FIG. 2) capable of storing storage goods and a door 3 provided to open and/or close the main body 2. The door 3 may be rotatably or movably disposed to open and/or close the cavity 9. The cavity 9 may provide at least one of a refrigerating chamber R and a freezing chamber F (for example, as in FIG. 32).

A freezing cycle in which cool air is supplied into the cavity 9 may be provided to include a compressor 4 to compress a refrigerant, a condenser 5 to condense the compressed refrigerant, an expander 6 to expand the condensed refrigerant, and an evaporator 7 to evaporate the expanded refrigerant to take heat. As a typical structure, a fan (for example, as in fan module 503 in FIG. 33) may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or chamber R or a freezing space or chamber F.

Figure 2:
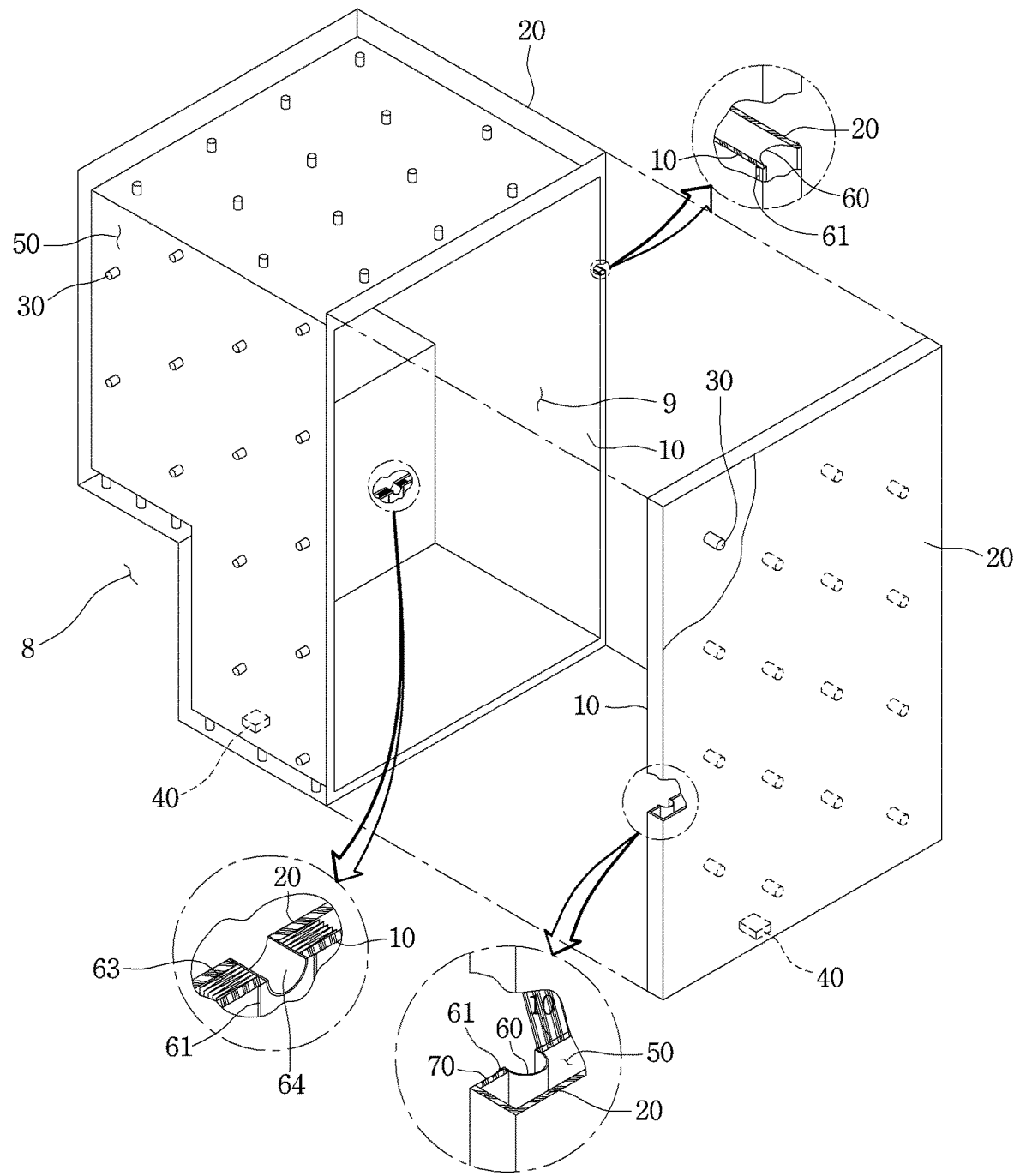
FIG. 2 is a view schematically showing a vacuum adiabatic body used in a main body and a door of the refrigerator.

FIG. 2 is a view schematically showing a vacuum adiabatic body used in the main body 2 and the door 3 of the refrigerator. In FIG. 2, a main body-side or rear vacuum adiabatic body (for example, as in the main body-side vacuum adiabatic body 800 in FIG. 44) is illustrated in a state in which top and side walls are removed, and a door-side or front vacuum adiabatic body is illustrated in a state in which a portion of a front wall is removed. In addition, sections of portions at conductive resistance sheets are schematically illustrated for convenience of understanding.

Referring to FIG. 2, each vacuum adiabatic body includes a first plate member 10 to provide a wall facing a low-temperature or first temperature space, a second plate member 20 to provide a wall facing a high-temperature or second temperature space, and a vacuum space part or gap 50 defined as a gap between the first and second plate members 10 and 20. Also, the vacuum adiabatic body includes conductive resistance sheets 60 and 63 to prevent heat conduction between the first and second plate members 10 and 20. The conductive resistance sheet 60 may be a seal. A sealing or fixing part 61 to couple the conductive resistance sheet 60 to the first plate member 10 and for sealing the first and second plate members 10 and 20 is provided such that the vacuum space part 50 is in a sealing state.

When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the main body-side vacuum adiabatic body. In addition, a pipeline 64 passing through the vacuum space part 50 may be further installed to receive a defrosting water line and electric lines.

The first plate member 10 may define at least one portion of a wall for a first space. The second plate member 20 may define at least one portion of a wall for a second space. The first space and the second space may be defined as spaces having different temperatures. Here, the wall for each space may directly contact or be exposed in the space, or alternatively may not contact the space. For example, the vacuum adiabatic body of the embodiment may also include a separate wall contacting each space, and such embodiment may be applied to a product (e.g., refrigerator 1).

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Figure 3A:
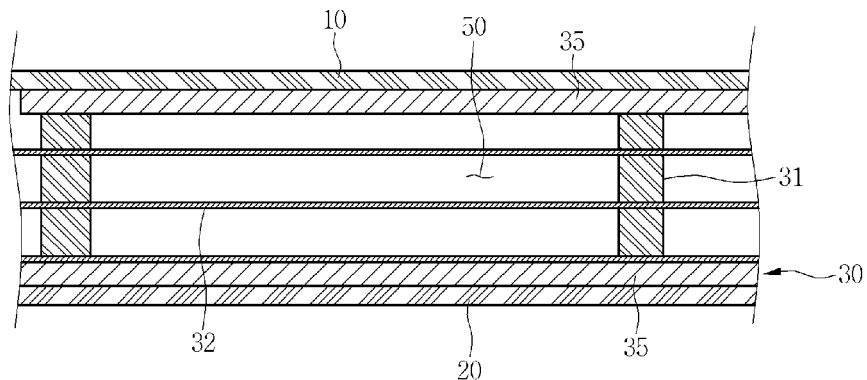
FIGS. 3A-3O are views showing various embodiments of an internal configuration of a vacuum space part.
Figure 3B:
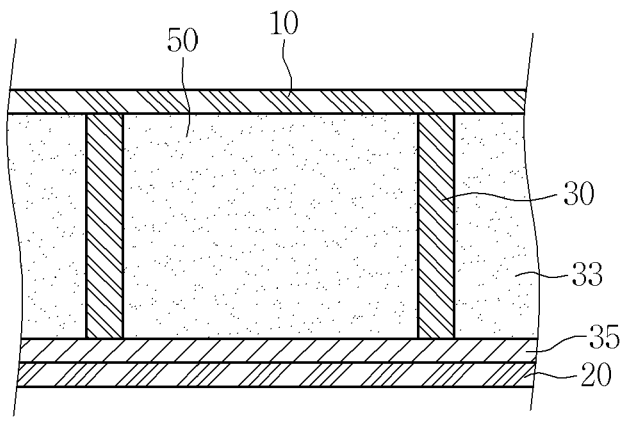
Figure 3C:
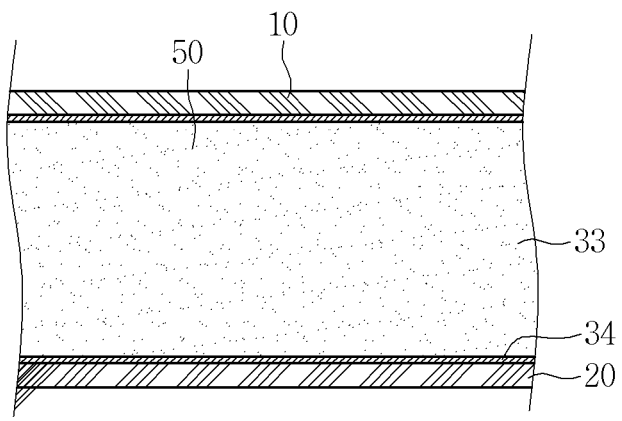

Hereinafter, a heat resistance unit provided to reduce adiabatic loss related to the factors of the heat transfer will be provided. Meanwhile, the vacuum adiabatic body and the refrigerator of the embodiment do not exclude other adiabatic means provided at at least one side of the vacuum adiabatic body. Therefore, an adiabatic means using foaming or the like may be further provided at another side of the vacuum adiabatic body FIG. 3 is a view showing various embodiments of an internal configuration of the vacuum space part. First, referring to FIG. 3(*a*), the vacuum space part 50 is provided in a third space having a different pressure from the first and second spaces and may be in a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction so as to be reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit or support 30 may be provided to reduce the deformation of the vacuum space part 50. The supporting unit 30 includes bars 31. The bars 31 may extend in a direction substantially vertical or perpendicular to the first and second plate members 10 and 20 so as to support a distance between the first and second plate members 10 and 20. A support plate 35 may be additionally provided to support at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, and may be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A material of the supporting unit 30 may include a resin selected from the group consisting of polycarbonate (PC), glass fiber PC, low outgassing PC, polyphenylene sulfide (PPS), and liquid crystal polymer (LOP) so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the first and second plate members 10 and 20, and may not be entirely provided at or overlap with inner surfaces of the first and second plate members 10 and 20. Hence, the supporting unit 30 does not have great influence on radiation heat. Therefore, the radiation resistance sheet 32 may be provided in a plate shape over a majority of the cross-sectional area of the vacuum space part 50 so as to concentrate on reduction of radiation heat transferred between the first and second plate members 10 and 20. A product hav g a low emissivity may be used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3(*b*), the distance between the first and second plate members 10 and 20 is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer. In this embodiment, the vacuum adiabatic body can be fabricated without using the radiation resistance sheet 32.

Referring to FIG. 3(*c*), the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30.

FIG. 4 is a view showing various embodiments of the conductive resistance sheets and peripheral portions thereof. Structures of the conductive resistance sheets are briefly illustrated in FIG. 2, but will be understood in detail with reference to FIG. 4.

First, a conductive resistance sheet 60 proposed in FIG. 4(*a*) may be applied to the main body-side vacuum adiabatic body. The first and second plate members 10 and 20 are to be sealed so as to vacuum the interior (i.e., a third space) of the vacuum adiabatic body. In this case, since the first and second plate members 10 and 20 have different temperatures from each other, heat transfer may occur between the two plate members 10 and 20. A conductive resistance sheet 60 is provided to prevent heat conduction between two different kinds of plate members.

The conductive resistance sheet 60 may be provided with sealing or fixing parts 61 at which both ends of the conductive resistance sheet 60 are sealed or fixed at the first and second plate members 10 and 20 to define at least one portion of the wall for the third space and maintain the vacuum state. The conductive resistance sheet 60 may be provided as a thin foil in unit of micrometer so as to reduce the amount of heat conducted along the wall for the third space. The sealing parts 61 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided to be longer than the linear distance between the first and second plate members 10 and 20, so that the amount of heat conduction can be further reduced.

A change in temperature occurs along the conductive resistance sheet 60. Therefore, in order to block heat transfer to the exterior of the conductive resistance sheet 60, a shielding part or shield 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened or exposed space may seriously occur. So as to reduce heat loss or transfer, the shielding part 62 is provided at the exterior of the conductive resistance sheet 60. For example, when the conductive resistance sheet 60 is exposed to any one of the low-temperature space and the space inside the refrigerator 1, the conductive resistance sheet 60 and/or an exposed portion thereof does not serve as a conductive resistor.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be provided as a porous substance or a separate adiabatic structure.

A conductive resistance sheet 60 proposed in FIG. 4(*b*) may be applied to the door-side vacuum adiabatic body. In FIG. 4(*b*), portions different from those of FIG. 4(*a*) are described in detail, and the same description is applied to portions identical to those of FIG. 4(*a*). A side frame 70 is further provided at an outside of the conductive resistance sheet 60. The side frame 70 may include a part for sealing between the door 3 and the main body 2, an exhaust port necessary for an exhaust process, a getter port for vacuum maintenance, and the like. This is because the mounting of parts is convenient in the main body-side vacuum adiabatic body, but the mounting positions of parts are limited in the door-side vacuum adiabatic body.

Figure 4A:
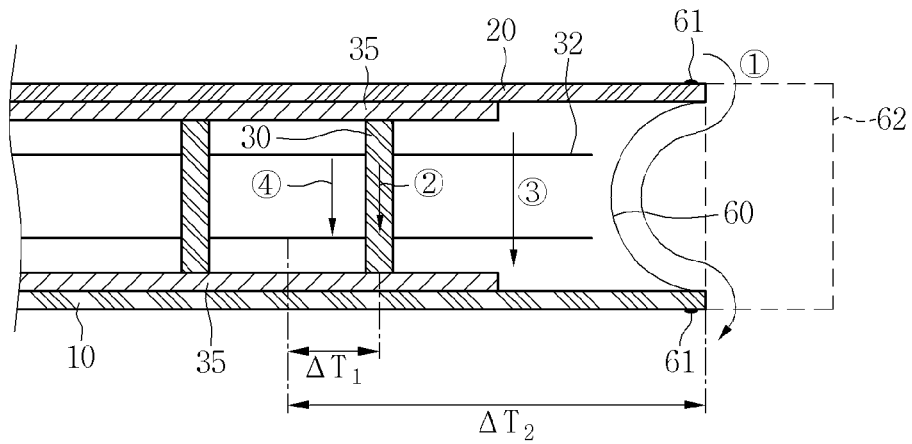
FIGS. 4A-4O are views showing various embodiments of conductive resistance sheets and peripheral portions thereof.

In the door-side vacuum adiabatic body, it is difficult to place the conductive resistance sheet 60 at a front end portion or side of the vacuum space part, i.e., a corner side part of the vacuum space part 50. This is because, unlike the main bod 2, a corner edge portion of the door 3 is exposed to the exterior. More specifically, if the conductive resistance sheet 60 is placed at the same location as shown in FIG. 4(a), the corner edge portion of the door is exposed to the exterior, and hence there is a disadvantage in that a separate adiabatic part should be configured so as to heat-insulate the conductive resistance sheet 60.

Figure 4B:
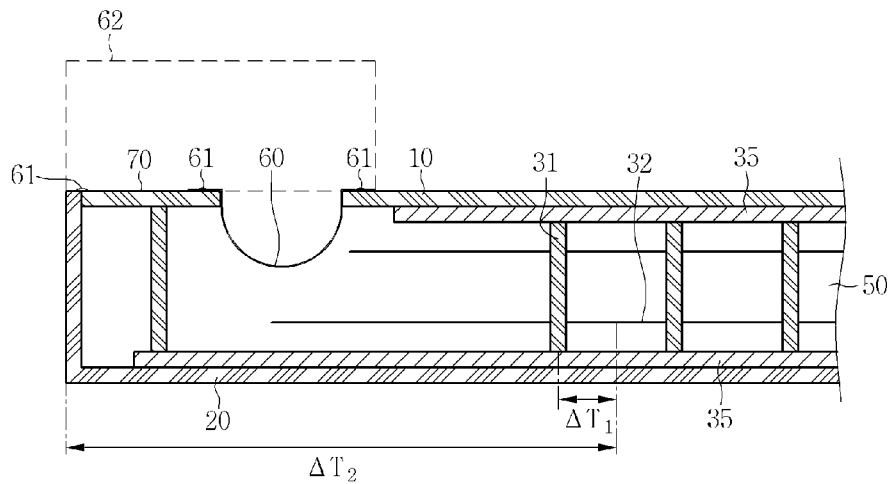
Figure 4C:
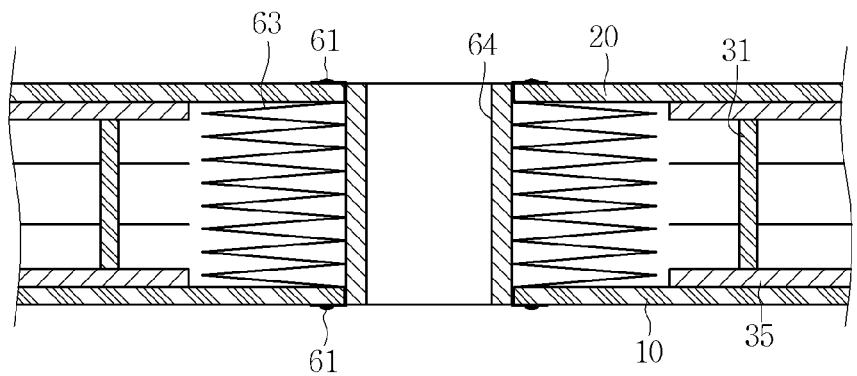

A conductive resistance sheet 63 proposed in FIG. 4(c) may be installed in the pipeline 64 passing through the vacuum space part 50. In FIG. 4(c), portions different from those of FIGS. 4(a) and 4(b) are described in detail, and the same description is applied to portions identical to those of FIGS. 4(a) and 4(b). A conductive resistance sheet 63 having the same or similar shape as that of FIG. 4(a), (such as a wrinkled conductive resistance sheet) may be provided at a peripheral or side portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4(a). Heat passing through the vacuum adiabatic body may be divided into surface conduction heat ①  conducted along the conductive resistance sheet 60, supporter conduction heat ② conducted along the supporting unit 30, gas conduction heat ③ conducted through an internal gas in the vacuum space part 50, and radiation transfer heat ④ transferred through the vacuum space part 50.

The transfer heat may be changed depending on various design dimensions. For example, the supporting unit 30 may be changed such that the first and second plate members 10 and 20 can endure a vacuum pressure without being deformed, the vacuum pressure may be changed, the distance between the plate members 10 and 20 may be changed, and the length of the conductive resistance sheet 60 and/or 63 may be changed. The transfer heat may be changed depending on a difference in temperature between the spaces (the first and second spaces) respectively provided by the plate members 10 and 20. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest among heat transfer amounts. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat is largest among the heat transfer amounts. For example, the heat transfer amount by the sold conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (K: effective K) (W/mK) of the surface conduction heat ①, the supporter conduction heat ②, the gas conduction heat ③, and the radiation transfer heat ④ may have an order of Math FIG. 1.

Math FIG. 1 eKsolid conduction heat>eKradiation transfer heat>eKgas conduction heat

Here, the effective heat transfer coefficient (eK) is a value that can be measured using a shape and temperature differences of a target product. The effective heat transfer coefficient (eK) is a value that can be obtained by measuring a total heat transfer amount and a temperature of at least one portion at which heat is transferred. For example, a calorific value (W) is measured using a heating source that can be quantitatively measured in the refrigerator, a temperature distribution (K) of the door is measured using heats respectively transferred through a main body 2 and an edge of the door 3 of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, 'Q' denotes a calorific value (W) and may be obtained using a calorific value of a heater. 'A' denotes a sectional area (m2) of the vacuum adiabatic body, 'L' denotes a thickness (m) of the vacuum adiabatic body, and '$\Delta T$' denotes a temperature difference.

For the surface conduction heat ①, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet 60 or 63 (the thermal conductivity of the conductive resistance sheet 60 or 63 is a material property of a material and can be obtained in advance).

For the supporter conduction heat ②, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit 30 is a material property of a material and can be obtained in advance.

The sum of the gas conduction heat ③ and the radiation transfer heat ④ may be obtained by subtracting the surface conduction heat ① and the supporter conduction heat ② from the heat transfer amount of the entire vacuum adiabatic body. A ratio of the gas conduction heat ③ and the radiation transfer heat ④ may be obtained by evaluating radiation transfer heat when no gas conduction heat exists by remarkably lowering a vacuum degree of the vacuum space part 50.

When a porous substance 33 is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance.

According to an embodiment, a temperature difference $\Delta T1$ between a geometric center formed by adjacent bars 31 and a point at which each of the bars 31 is located may be provided to be less than 0.5° C. Also, a temperature difference $\Delta T2$ between the geometric center formed by the adjacent bars 31 and an edge portion of the vacuum adiabatic body may be provided to be less than 0.5° C. A temperature difference between an average temperature of the second plate member 20 and a temperature at a point at which a heat transfer path passing through the conductive resistance sheet 60 or 63 meets the second plate member 20 may be largest. For example, when the second space is a region hotter than the first space, the temperature at the point at which the heat transfer path passing through the conductive resistance sheet 60 or 63 meets the second plate member 20 becomes lowest. Similarly, when the second space is a region colder than the first space, the temperature at the point at which the heat transfer path passing through the conductive resistance sheet 60 or 63 meets the second plate a ember 20 becomes highest.

This means that the amount of heat transferred through other points except the surface conduction heat ① passing through the conductive resistance sheet 60 or 63 should be controlled, and the entire heat transfer amount satisfying the vacuum adiabatic body can be achieved only when the surface conduction heat ① occupies the largest heat transfer amount. To this end, a temperature variation of the conductive resistance sheet 60 or 63 may be controlled to be larger than that of the second plate member 20.

Physical characteristics of the parts constituting the vacuum adiabatic body will be described. In the vacuum adiabatic body, a force by vacuum pressure is applied to all of the parts. Therefore, a material having a strength (N/m2) of a certain level may be used.

Under such circumferences, the plate members 10 and 20 and the side frame 70 may be made of a material having a sufficient strength with which they are not damaged by even vacuum pressure. For example, when the number of bars 31 is decreased so as to limit the supporter conduction heat ②, of the plate members 10 and 20 occurs due to the vacuum pressure, which may negatively influence the external appearance of the refrigerator 1. The radiation resistance sheet 32 may be made of a material that has a low emissivity and can be easily subjected to thin film processing. Also, the radiation resistance sheet 32 may have a strength strong enough not to be deformed by an external impact. The supporting unit 30 is provided with a strength strong enough to support the force by the vacuum pressure and endure an external impact, and is to have machinability. The conductive resistance sheet 60 or 63 may be made of a material that has a thin plate shape and can endure the vacuum pressure.

In an embodiment, the plate members 10 and 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis frown the point of view of stiffness is required. Higher stiffness (N/m) means less easily deformed. Although the same material is used, its stiffness may be changed depending on its shape. The conductive resistance sheets 60 or 63 may be made of a material having a high strength, but the stiffness of the material is low so as to increase heat resistance and minimize radiation heat as the conductive resistance sheet 60 or 63 is uniformly spread without any roughness when the vacuum pressure is applied. The radiation resistance sheet 32 requires a stiffness of a certain or prescribed level so as not to contact another part due to deformation. Particularly, an edge portion of the radiation resistance sheet 32 may generate conduction heat due to drooping caused by the self-load of the radiation resistance sheet 32. Therefore, a stiffness of a certain level is required. The supporting unit 30 requires a stiffness stiff enough to endure a compressive stress from the plate members 10 and/or 20 and an external impact.

In an embodiment, the plate members 10 and 20 and the side frame 70 may have the highest stiffness (i.e., a higher stiffness than the supporting unit 30, the bar 31, the conductive resistance sheet 60 or 63, etc.) so as to prevent deformation caused by the vacuum pressure. The supporting unit 30, particularly the bar 31, may have the second highest stiffness. The radiation resistance sheet 32 may have a stiffness that is lower than that of the supporting unit 30 but higher than that of the conductive resistance sheet 60 or 63. The conductive resistance sheet 60 or 63 may be made of a material that is easily deformed by the vacuum pressure and has the lowest stiffness.

Even when the porous substance 33 is filled in the vacuum space part 50, the conductive resistance sheet 60 or 63 may have the lowest stiffness, and the plate members 10 and 20 and the side frame 70 may have the highest stiffness.

Hereinafter, a vacuum pressure may be determined depending on an internal state of the vacuum adiabatic body. As already described above, a vacuum pressure is to be maintained inside the vacuum adiabatic body so as to reduce heat transfer. At this time, it will be easily expected that the vacuum pressure is maintained as low as possible so as to reduce the heat transfer.

The vacuum space part 50 may resist the heat transfer via only the supporting unit 30. Alternatively, the porous substance 33 may be filled together with the supporting unit 30 in the vacuum space part 50 to resist the heat transfer. As another alternative, the vacuum space part 50 may resist the heat transfer by using the porous substance 33 and omitting the supporting unit 30.

The case where only the supporting unit 30 is applied will be described.

Figure 5:
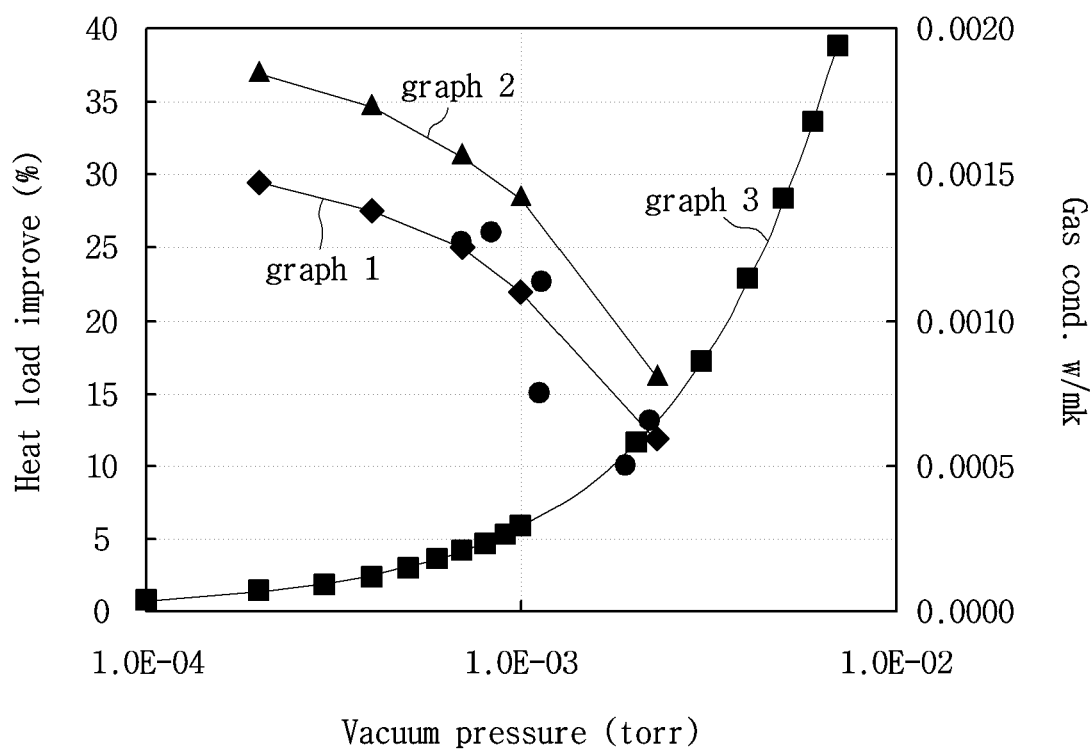
FIG. 5 illustrates graphs showing changes in adiabatic performance and changes in gas conductivity with respect to vacuum pressures by applying a simulation.

FIG. 5 illustrates graphs showing changes in adiabatic performance and changes in gas conductivity with respect to vacuum pressures by applying a simulation.

Referring to FIG. 5, it can be seen that, as the vacuum pressure is decreased, le as the vacuum degree is increased, a heat load in the case of only the main body 2 (Graph 1) or in the case where the main body 2 and the door 3 are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes a long time to obtain excessive vacuum pressure, and much cost is consumed due to excessive use of a getter. In the embodiment, an optimal vacuum pressure is proposed from the above-described point of view.

Figure 6:
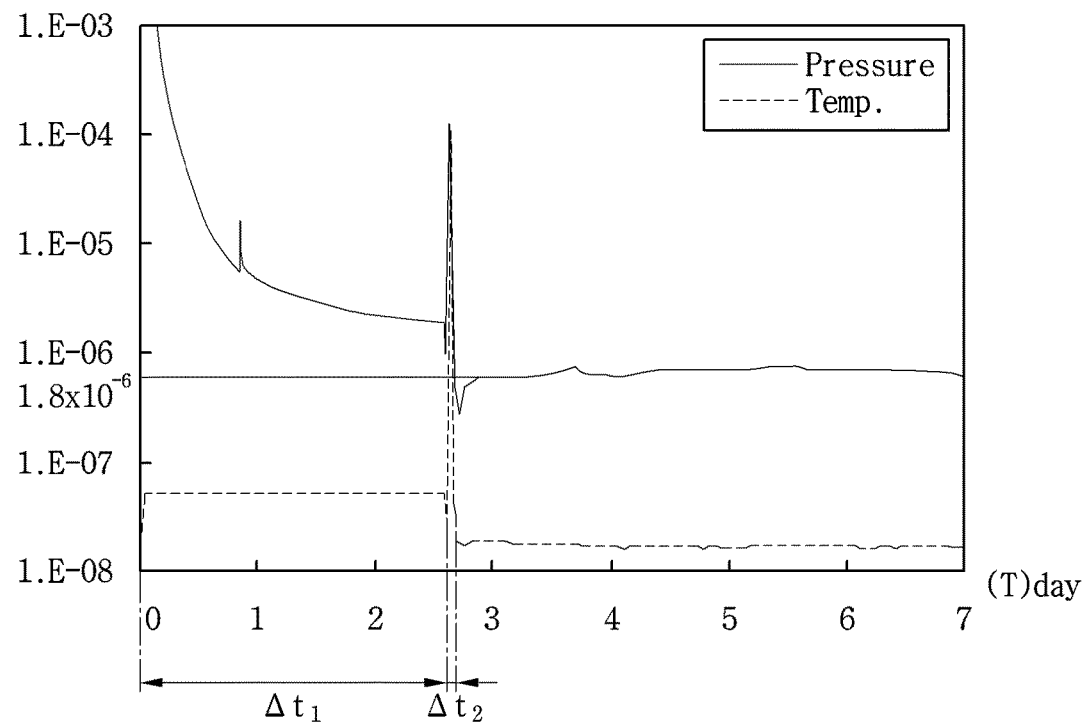
FIG. 6 illustrates graphs obtained by observing, over time and pressure, a process of exhausting the interior of the vacuum adiabatic body when a supporting unit is used.

FIG. 6 illustrates graphs obtained by observing, over time and pressure, a process of exhausting the interior of the vacuum adiabatic body when the supporting unit 30 is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more (Δt1). After that, the getter is activated by disconnecting the vacuum space part 50 from the vacuum pump and applying heat to the vacuum space part 50 (Δt2). If the getter is activated, the pressure in the vacuum space part 50 is decreased for a certain period of time, but then normalized to maintain a vacuum pressure of a certain level. The vacuum pressure that maintains the certain level after the activation of the getter is approximately 1.8×10-6 Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to 1.8×10-6 Torr.

Figure 7:
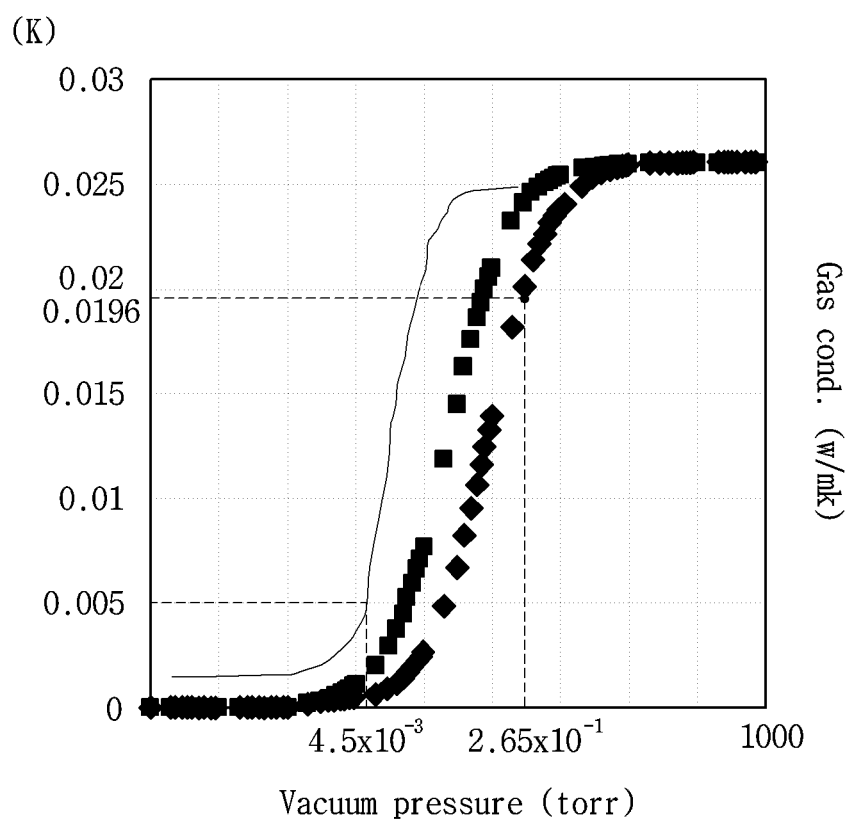
FIG. 7 illustrates graphs obtained by comparing vacuum pressures and gas conductivities.

FIG. 7 illustrates graphs obtained by comparing vacuum pressures and gas conductivities. Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the vacuum space part 50 has three sizes of 2.76 mm, 6.5 mm, and 12.5 mm. The vacuum space part 50 may be or include the gap, which has a size defined as follows. When the radiation resistance sheet 32 exists inside the vacuum space part 50, the size of the gap is a distance between the radiation resistance sheet 32 and the plate member 10 or 20 adjacent thereto. When the radiation resistance sheet 32 does not exist inside vacuum space part 50, the size of the gap is a distance between the first and second plate members.

It can be seen that, since the size of the gap of the vacuum space part 50 is small at a point corresponding to a typical effective heat transfer coefficient of 0.0196 W/mK, which is applied to an adiabatic material formed by foaming polyurethane, the vacuum pressure is 2.65×10−1 Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately 4.5×10-3 Torr. The vacuum pressure of 4.5×10−3 Torr can be defined as the point at which the reduction in adiabatic effect caused by gas conduction heat is saturated. Also, when the effective heat transfer coefficient is 0.1 W/mK, the vacuum pressure is 1.2×10−2 Torr.

When the vacuum space part 50 is not provided with the supporting unit 30 but provided with the porous substance 33, the size of the gap ranges from a few micrometers to a few hundreds of micrometers. In this case, the amount of radiation heat transfer is small due to the porous substance 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately 2.0×10-4 Torr. Also, the vacuum pressure at the point at which the reduction in adiabatic effect caused by gas conduction heat is saturated is approximately 4.7×10−2 Torr. Also, the pressure where the reduction in adiabatic effect caused by gas conduction heat reaches the typical effective heat transfer coefficient of 0.0196 W/mK is 730 Torr.

When the supporting unit 30 and the porous substance 33 are provided together in the vacuum space part 50, a vacuum pressure may be created and used, which is an intermediate pressure between the vacuum pressure when only the supporting unit 30 is used and the vacuum pressure when only the porous substance 33 is used. In a case where only the porous substance 33 is used, the lowest vacuum pressure can be created and used.

Figure 8:
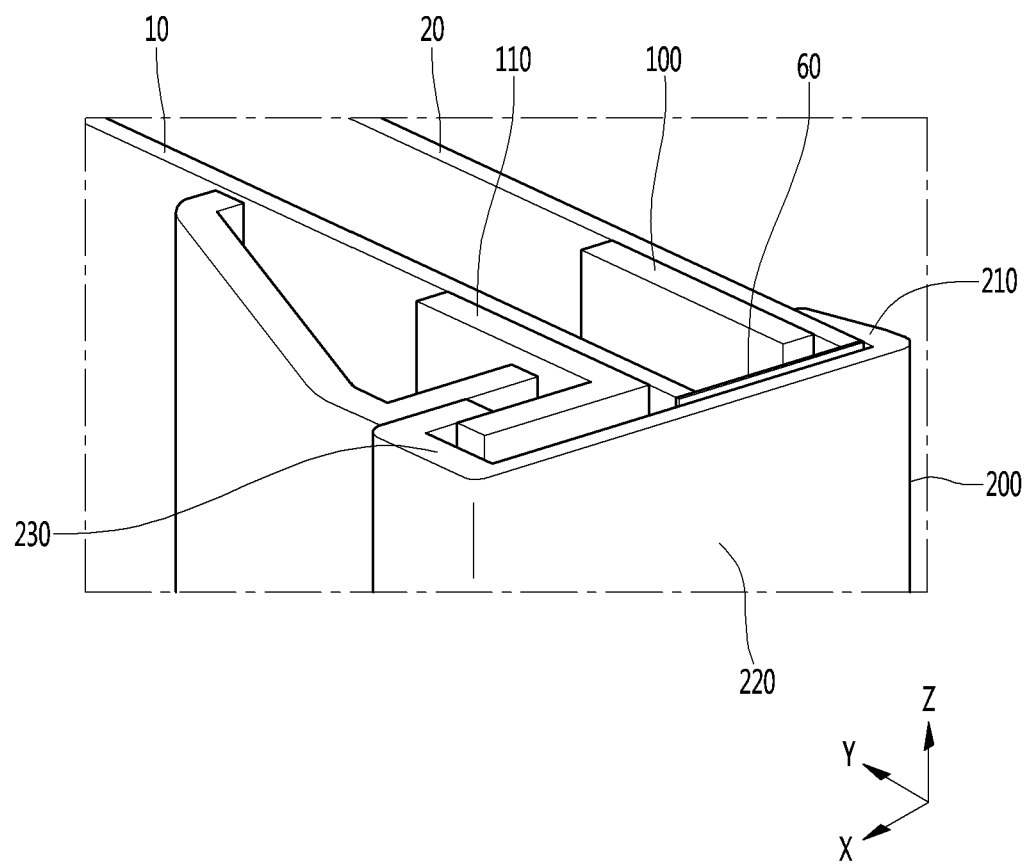
FIG. 8 is a sectional perspective view illustrating a peripheral portion of the vacuum adiabatic body.

FIG. 8 is a sectional perspective view illustrating the peripheral portion of the vacuum adiabatic body. Referring to FIG. 8, a first plate member 10, a second plate member 20, and a conductive resistance sheet 60 are provided. The conductive resistance sheet 60 may be provided as a thin plate to resist thermal conduction between the plate members 10 and 20. The conductive resistance sheet 60 is provided as a thin plate and is provided as a flat surface in the drawing, but may be pulled inward to have a curved shape when vacuum is applied to the vacuum space part 50.

Since the conductive resistance sheet 60 is in the form of a thin plate and has low strength, the conductive resistance sheet 60 can be broken even by a small external impact. When the conductive resistance sheet 60 is broken, the vacuum of the vacuum space part 50 is destroyed and the performance of the vacuum adiabatic body is not exerted. So as to solve this problem, a sealing frame or side cover 200 may be provided on the outer surface of the conductive resistance sheet 60. According to the sealing frame 200, since the parts of the door 3 or other external products indirectly contacts the conductive resistance sheet 60 through the sealing frame 200 without directly contacting the conductive resistance sheet 60, the breakage of the conductive resistance sheet 60 can be prevented. In order that the sealing frame 200 does not transfer an impact to the conductive resistance sheet 60, a gap may be formed between the conductive resistance sheet 60 and the sealing frame 20 such that the conductive resistance sheet 60 and the sealing frame 20 may be spaced from each other, and a buffer member may be interposed therebetween.

So as to reinforce the strength of the vacuum adiabatic body, the plate members 10 and 20 may be provided with a reinforcing member. For example, the reinforcing member may include a first reinforcing member 100 fastened to a peripheral portion of the second plate member 20 and a second reinforcing member 110 fastened to a peripheral portion of the first plate member 10. The first and second reinforcing members 100 and 110 may be thicker or have a higher strength than the first and second plate members 10 and 20 to such an extent that the strength of the vacuum adiabatic body can be increased. The first reinforcing member 100 may be provided in the inner space of the vacuum space part 50 and the second reinforcing member 110 may be provided on the inner surface part of the main body 2.

It is preferable that the conductive resistance sheet 60 is not in contact with the reinforcing members 100 and 110. This is because the thermal conductive resistance characteristic generated in the conductive resistance sheet 60 is destroyed by the reinforcing members 100 and 110. In other words, this is because the width of the narrow heat bridge for resisting the heat conduction is greatly expanded by the reinforcing members 100 and 110, and the narrow heat bridge characteristic is destroyed.

Since the width of the internal space of the vacuum space part 50 is narrow, the section of the first reinforcing member 100 may be provided in a flat plate shape. The second reinforcing member 110 provided on the inner surface of the main body 2 may be provided in a shape in which the section thereof is bent.

The sealing frame 200 may include an inner surface part 230 which is placed in an inner space of the main body 2 and supported by the first plate member 10, an outer surface part 210 which is placed in an outer space of the main body 2 and supported by the second plate member 20, and a side surface part 220 which is placed in a side surface of a peripheral portion of the vacuum adiabatic body constituting the main body 2, covers the conductive resistance sheet 60, and connects the inner surface part 230 and the outer surface part 210.

The sealing frame 200 may be made of a resin that permits slight deformation. The mounting position of the sealing frame 200 can be maintained by an interaction between the inner surface part 230 and the outer surface part 210, that is, by a catching action therebetween. In other words, the setting position of the sealing frame 200 may not deviate.

The fixing position of the sealing frame 200 will be described in detail.

First, the movement of the plate members 10 and 20 in the extending direction (y-axis direction in FIG. 8) on the plane may be fixed by the inner surface part 230 being engaged with and supported by the second reinforcing member 110. More specifically, the position movement of the sealing frame 200 falling out from the vacuum adiabatic body to the outside may cause the inner surface part 230 to be engaged with the second reinforcing member 110 and be interrupted. On the contrary, the position movement of the sealing frame 200 moving to the inside of the vacuum adiabatic body may be interrupted by at least one of, firstly, the action of the inner surface part 230 to be engaged with and supported by the second reinforcing member 110 (this action can be acted in both directions including an elastic restoring force of the sealing frame provided as resin), secondly the action of the side surface part 220 to be stopped with respect to the plate members 10 and 20, and thirdly the action of the movement of the inner surface part 230 with respect to the first plate member 10 in the y-axis direction to be blocked.

The movement of the plate members 10 and 20 in a direction extending perpendicular to the end surfaces of the plate members 10 and 20 (x-axis direction in FIG. 8) may be fixed by the outer surface part 210 being engaged to and supported by the second plate member 20. As an auxiliary action, the movement of the plate members 10 and 20 in the x-axis direction may be interrupted by the action of the inner surface part 230 to hold the second reinforcing member 110 and the action of contacting the inner surface part 230 with the second reinforcing member 110.

The movement of the sealing frame 200 in the extending direction (z-axis direction in FIG. 8) can be stopped by at least one of the inner surface part 230 of any one sealing frame 200 contacting the inner surface part of the other sealing frame 200, or the inner surface part 230 of any one sealing frame 200 contacting a mullion or dividing wall 300 described later.

Figure 9:
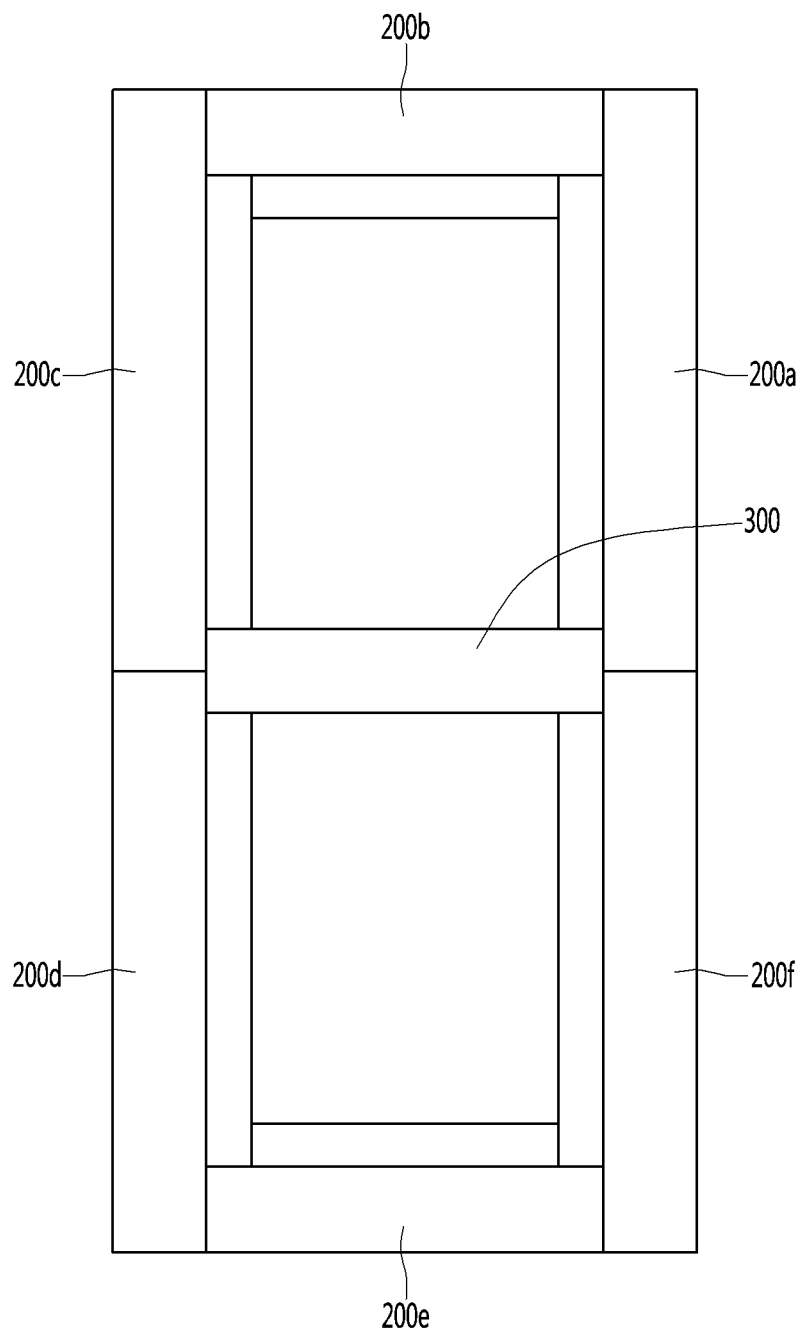
FIGS. 9 and 10 schematically illustrate a front surface of the main body in a virtual state where the inner surface part is unfolded.
Figure 10:
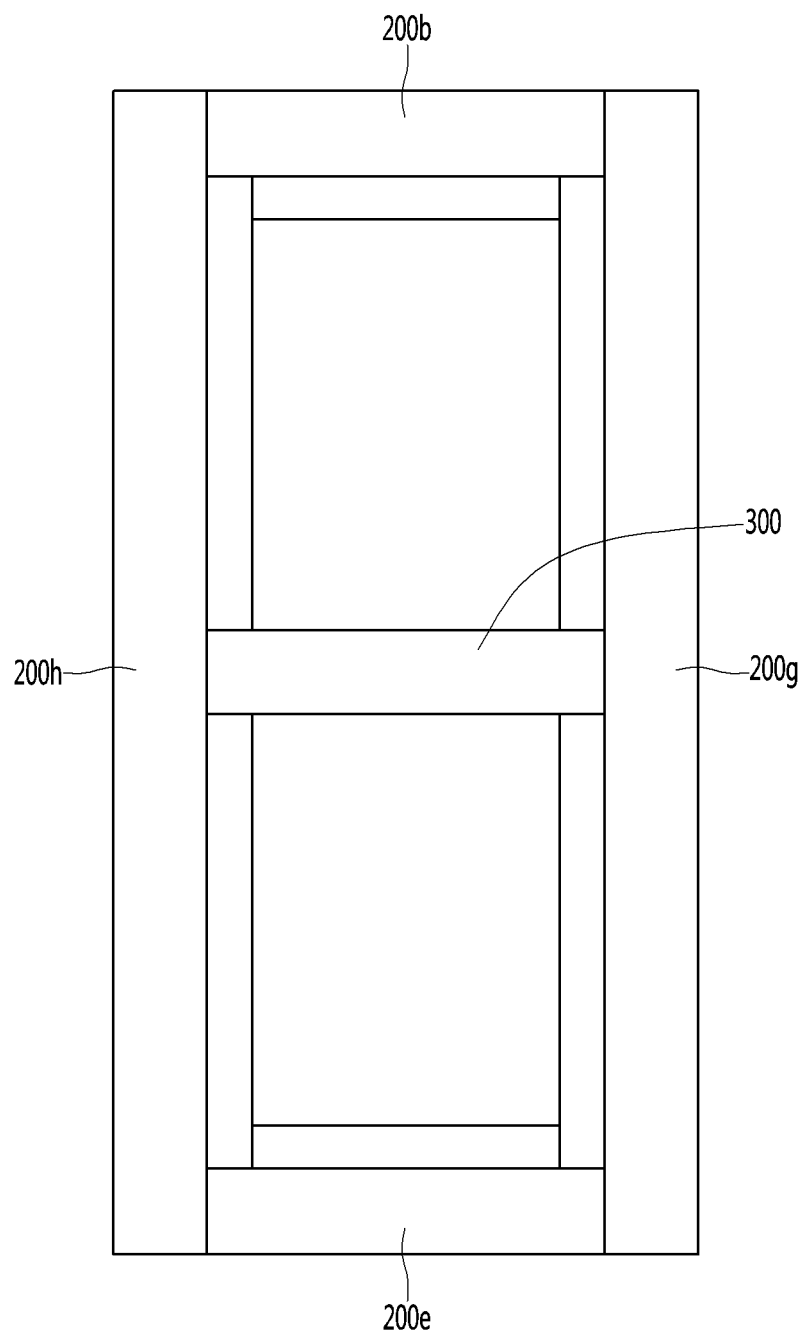

FIGS. 9 and 10 schematically illustrate the front face of the main body 2, and, in the drawing, it should be noted that the sealing frame 200 is in a virtual or unbent state where the inner surface part 230 is unfolded in a direction parallel to the side surface part 220.

Referring to FIGS. 9 and 10, the sealing frame 200 may include upper and lower members 200*b* and 200*e* which seal the upper and lower peripheral portions of the main body 2, respectively. The side peripheral portions of the main body 2 can be divided according to whether the spaces in the refrigerator divided based on the mullion 300 are sealed separately (in a case of FIG. 9) or integrally (in a case of FIG. 10).

In a case where the side peripheral portions of the main body 2 are separately sealed as illustrated in FIG. 9, the sealing frame 200 can be divided into four sealing frames 200*a*, 200*c*, 200*d*, and 200*f*. In a case where the side peripheral portions of the main body 2 are integrally sealed as illustrated in FIG. 10, the sealing frame 200 can be divided into two sealing frames 200*g* and 200*h*.

In a case where the side peripheral portions of the main body 2 are sealed by the two sealing frames 200*g* and 200*h* as illustrated in FIG. 10, since two fastening operations are required (less than in FIG. 9), manufacturing is facilitated, but cool air may be lost by heat transfer between the separated sealing frames 200*g* and 200*h* with heat conduction of the sealing frame 200. In a case where the side peripheral portions of the main body 2 are sealed by the four sealing frames 200*a*, 200*c*, 200*d*, and 200*f* as illustrated in FIG. 9, since four fastening operations may be required, manufacturing is inconvenient, but heat conduction between the sealing frames 200*a*, 200*c*, 200*d*, and 200*f* is obstructed, and heat transfer between the separated sealing frames 200*a*, 200*c*, 200*d*, and 200*f* is reduced, thereby reducing the loss of cool air.

Meanwhile, the embodiment of the vacuum adiabatic body illustrated in FIG. 8 can exemplify a main body-side vacuum adiabatic body. However, such an embodiment does not exclude a case where the sealing frame 200 is provided at the door-side vacuum adiabatic body. However, in general, since a gasket 80 (FIG. 11) is provided on the door 3, it is more preferable that the sealing frame 200 is provided on the main body-side vacuum adiabatic body. In this case, the side surface part 220 of the sealing frame 200 can have a further advantage that the side surface part 220 can provide a width sufficient for the gasket 80 to contact.

In detail, the width of the side surface part 220 is provided to be wider than the adiabatic thickness of the vacuum adiabatic body, that is, the width of the vacuum adiabatic body, so that the adiabatic width of the gasket 80 can be provided sufficiently wide. For example, in a case where the adiabatic thickness of the vacuum adiabatic body is 10 mm, it is possible to provide a large storage space in the refrigerator 1, thereby increasing the accommodation space of the refrigerator 1.

However, there is a problem in that, in a case where the adiabatic thickness of the vacuum adiabatic body is 10 mm, a gap sufficient for the gasket 80 to contact cannot be provided. In this case, since the side surface part 220 can provide a wide gap corresponding to the contact area of the gasket 80, it is possible to effectively prevent the loss of the cool air through the contact gap between the main body 2 and the door 3. In other words, in a case where the contact width of the gasket 80 is 20 mm, even if the adiabatic thickness of the vacuum adiabatic body is 10 mm, the width of the side surface part 220 can be provided to be 20 mm or more in correspondence with the contact width of the gasket 80.

It can be understood that the sealing frame 200 performs the function of sealing and shielding of the conductive resistance sheet 60 to prevent or reduce loss of cool air.

Figure 11:
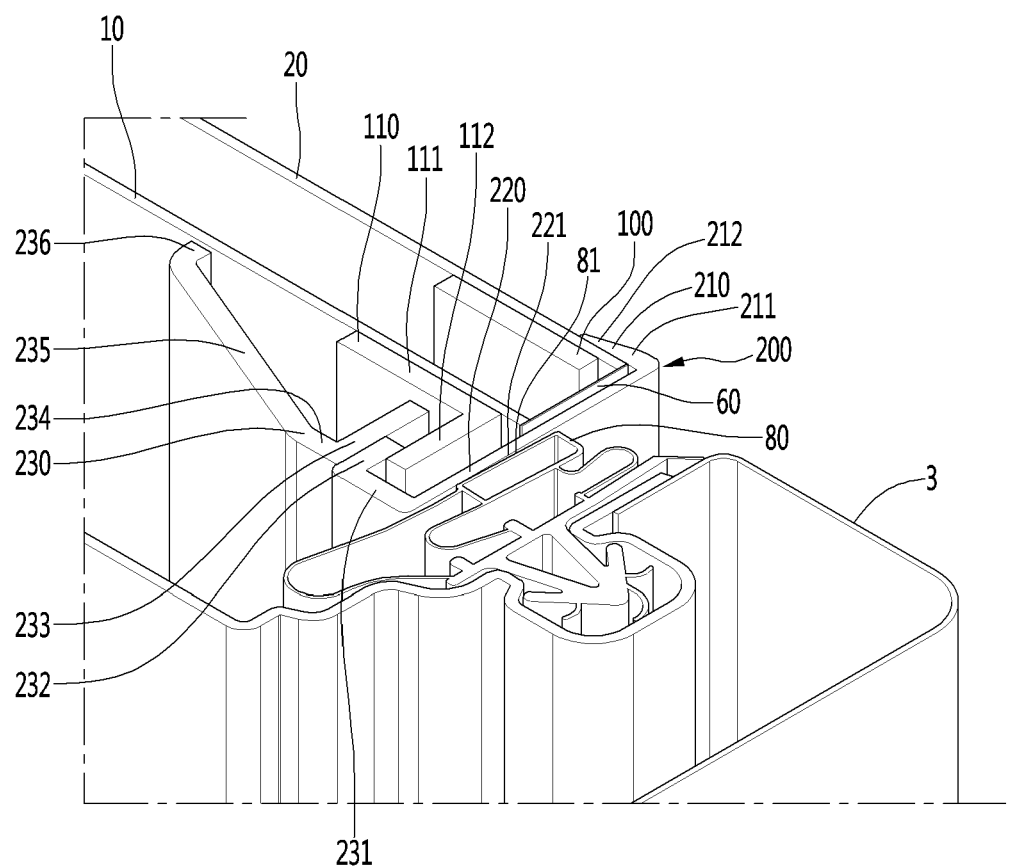
FIG. 11 is a sectional view illustrating a contact part when the main body is closed by the door.

FIG. 11 is a sectional view illustrating the contact part illustrated in a state where the main body 2 is closed by the door 3. Referring to FIG. 11, a gasket 80 is interposed in a boundary surface between the main body 2 and the door 3. The gasket 80 can be fastened to the door 3 and can be provided as a deformable member as a flexible material. The gasket 80 includes a magnet as one part and when the magnet pulls and approaches a magnetic body (i.e., magnetic body of peripheral portion of main body 2), the contact surface between the main body 2 and the door 3 can block the leakage or escape of the cool air by the sealing surface or the side surface part 220 having a predetermined width by the action of the gasket 80 being smoothly deformed.

When a gasket sealing surface 81 of the gasket 80 is in contact with the side surface part 220, a side surface part sealing surface 221 having a sufficient width can be provided. The side surface part sealing surface 221 may be defined as a contact surface on the side surface part 220 which is correspondingly in surface contact with the gasket sealing surface 81 when the gasket 80 is in contact with the side surface part 220.

According to this, it is possible to secure sealing surfaces 81 and 221 having a sufficient area regardless of the adiabatic thickness of the vacuum adiabatic body. This is because even if the adiabatic thickness of the vacuum adiabatic body is narrow, for example, even if the adiabatic thickness of the vacuum adiabatic body is narrower than the gasket sealing surface 81, if the width of the side surface part 220 is increased, the side surface part sealing surface 221 having a sufficient width can be obtained. In addition, regardless of the deformation of the member which may affect the deformation of the contact surface between the main body 2 and the door 3, the sealing surfaces 81 and 221 having a sufficient area can be secured. This is because it is possible to provide a predetermined clearance in and out of the side surface part sealing surface 221 in designing the side surface part 220 so that even if slight deformation occurs between the sealing surfaces 81 and 221, the width and area of the sealing surface can be maintained.

In the sealing frame 200, the outer surface part 210, the side surface part 220, and the inner surface part 230 are provided so that the set position thereof can be maintained. Simply, the outer surface part 210 and the inner surface part 230 has a pursing shape or concave groove shape, so that the configuration which holds the end portion of the vacuum adiabatic body, more precisely, the plate members 10 and 20, can be provided. Here, It can be understood that the concave groove has a a configuration in which the width between the end portion of the outer surface part 210 and the end portion of the inner surface part 230 is smaller than the width of the side surface part 220.

The fastening of the sealing frame 200 will be briefly described. Firstly, the side surface part 220 and the outer surface part 210 is rotated in a direction of the second plate 20 in a state where the inner surface part 230 is engaged with the second reinforcing member 110. Then, the sealing frame 200 is elastically deformed, and the outer surface part 210 moves inward along the outer surface of the second plate member 20 so that the fastening can be completed. When the fastening of the sealing frame 200 is completed, the sealing frame 200 can be restored to the original shape thereof designed before the deformation. When the fastening is completed, the installation position thereof can be maintained as described above.

The detailed configuration and detailed action of the sealing frame 200 will be described. The outer surface part 210 may include an extension part 211 outside the refrigerator 1 which extends inward from an end of the second plate member 20, and a contact part 212 outside the refrigerator 1 which is in contact with the outer surface of the second plate member 20 at an end of the extension part 211 outside the refrigerator 1.

The extension part 211 outside the refrigerator 1 has a predetermined length so as to prevent the removal of the outer surface part 210 due to a weak external acting force. In other words, the outer surface part 210 is not completely removed from the second plate member 20 even if the outer surface part 210 is forced so as to be pulled toward the door 3 due to the user's carelessness. However, if the outer surface part 210 is excessively long, there is difficulty in intentional removal at the time of repair and the fastening operation becomes difficult, so it is preferable that the outer surface part 210 is limited to the predetermined length.

The contact part 212 outside the refrigerator 1 may be provided with a structure in which the end of the extension part 211 outside the refrigerator is slightly bent toward the surface outside the second plate member 20. According to this, sealing by the contact between the outer surface part 210 and the second plate member 20 becomes perfect, so that foreign matter can be prevented from being introduced.

The side surface part 220 may be bent at an angle of about 90 degrees from the outer surface part 210 toward the opening of the main body 2 and secures a sufficient width of the side surface part sealing surface 221. The side surface part 220 may be provided thinner than the inner surface part 210 and the outer surface part 230 to permit elastic deformation at the time of fastening or removing the sealing frame 200 and to prevent or reduce increasing a distance and weakening a magnetic force between the magnet installed on the gasket 80 and the magnetic body on the main body 2. The side surface part 220 may protect the conductive resistance sheet 60 and configure an outer appearance as an exposed portion of the exterior. In a case where the adiabatic member is laid inside the side surface part 220, the adiabatic performance of the conductive resistance sheet 60 can be reinforced.

The inner surface part 230 is bent and extends from the side surface part 220 by about 90 degrees in an inner direction of the refrigerator 1, that is, the rear surface direction of the main body 2. The inner surface part 230 performs an action for fixing the sealing frame 200, an action for installing parts necessary for the operation of a product to which a vacuum adiabatic body is installed such as a refrigerator 1, and an action for preventing the inflow of outer foreign matters into the inside.

The action corresponding to each configuration of the inner surface part 230 will be described. The inner surface part 230 includes an extension part 231 inside the refrigerator 1 which is bent and extends from an inner end portion of the side surface part 220 and a first member fastening part 232 which is bent from the inner end portion of the extension part 231 inside the refrigerator 1 to an outside direction, that is, toward the inner surface of the first plate member 10. The first member fastening part 232 may be in contact with and is engaged with a protrusion part 112 of the second reinforcing member 110. The extension part 231 inside the refrigerator 1 may provide a gap which extends to an inside of the refrigerator1 so that the first member fastening part 232 is engaged inside the second reinforcement member 110.

The first member fastening part 232 may be engaged with the second reinforcing member 110 to draw the supporting action of the sealing frame 200. The second reinforcement member 110 may further include a base part 111 which is fastened to the first plate member 10 and a protrusion part 112 which bends and extends from the base part 111. The inertia of the second reinforcing member 110 is increased by the structure of the base part 111 and the protrusion part 112 so that the ability to resist the bending strength can be increased.

The second member fastening part 233 may be fastened to the first member fastening part 232. The first and second member fastening parts 232 and 233 may be provided as separate members to be fastened to each other or alternatively may be provided as a single member from at the time of the design thereof.

The second member coupling part 233 may further be provided with a gap forming part 234 that further extends to the inside of the refrigerator 1 from the inner end portion of the second member fastening part 233. The gap forming part 234 may serve as a portion for providing a gap or space where parts necessary for the operation of the appliance such as a refrigerator 1 provided as the vacuum adiabatic body are placed.

An inclined part 235 inside the refrigerator 1 is further provided inside the gap forming part 234. The inclined part 235 inside the refrigerator 1 may be provided so as to be inclined so as to approach the first plate member 10 toward the end thereof, that is, toward the inside of the refrigerator 1. In the inclined part 235 inside the refrigerator 1, the gap between the sealing frame 200 and the first plate member 10 is provided to be reduced as being directed to the inside thereof so that the volume of the sealing frame 200 occupying the space inside the refrigerator 1 is reduced as much as possible and it is possible to expect an effect of securing a space in which a part such as a lamp is mounted by the cooperation with the gap forming part 234.

A contact part 236 inside the refrigerator 1 is provided at the inner end portion of the inclined part 235 inside the refrigerator. The contact part 236 inside the refrigerator 1 may be provided in a structure in which the end of the inclined part 235 inside the refrigerator 1 is slightly bent toward the inner surface side of the first plate member 10. According to this, sealing by the contact between the inner surface part 230 and the first plate member 10 is perfect or tight, so that it is possible to prevent the inflow of foreign matter or the like.

In a case where an accessory part such as a lamp or light is installed on the inner surface part 230, the inner surface part 230 may be divided into two parts so as to achieve the purpose of convenience of installation of the part. For example, the inner surface part 230 can be divided into a first member which provides the extension part 231 inside the refrigerator and the first member fastening part 232, and a second member which provides the second member fastening part 233, the gap forming part 234, the inclined part 235 inside the refrigerator 1, and the contact part 236 inside the refrigerator. The first member and the second member of the inner surface part 230 are fastened to each other in such a manner that the second member fastening part 233 is fastened to the first member fastening part 232 in a state where a product such as a lamp is mounted on the second member of the inner surface part 230. Of course, such an embodiment does not exclude other variations or configurations of the inner surface part 230. For example, the inner surface part 230 may be provided as a single member.

Figure 12:
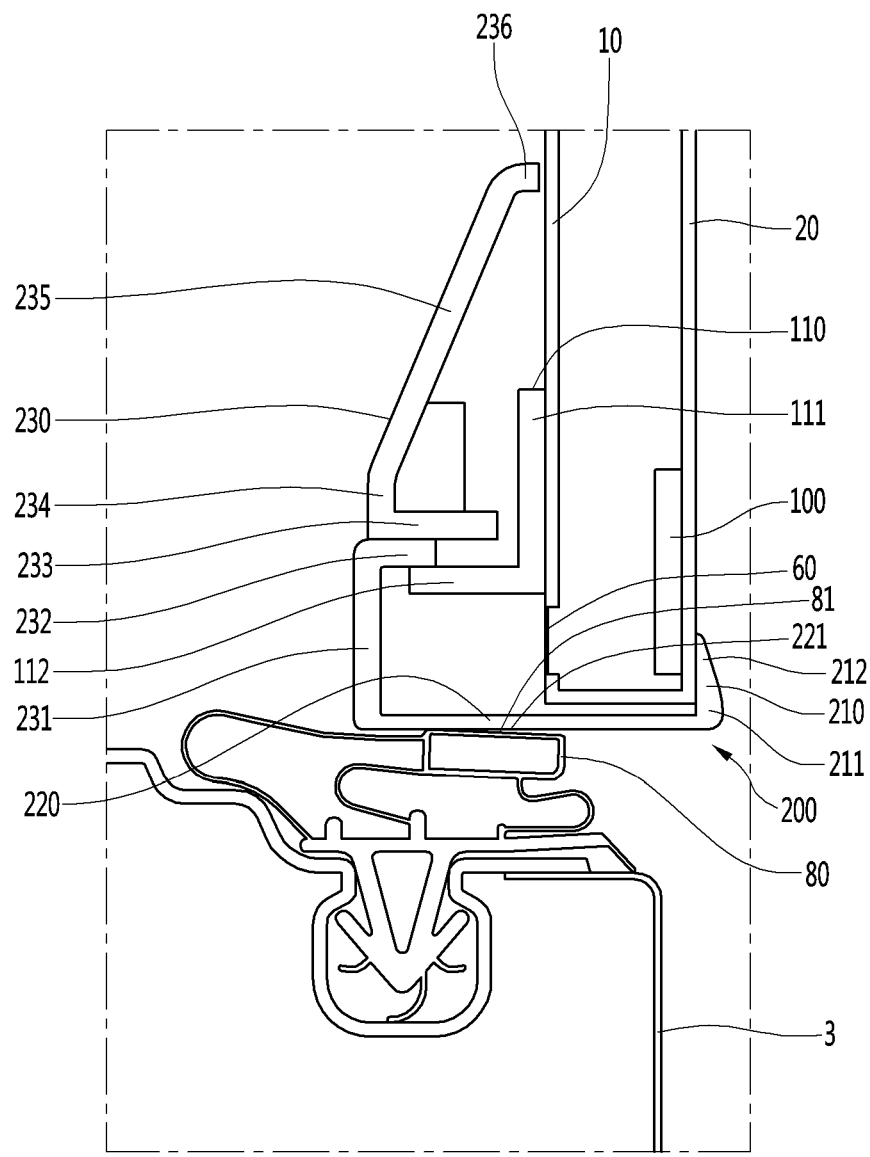
FIG. 12 is a sectional view illustrating a contact part of a main body and a door according to another embodiment.

FIG. 12 is a sectional view of a contact part of the main body 2 and the door 3 according to another embodiment. The present embodiment is characteristically different in the position of the conductive resistance sheet 60 and accordingly related portions.

Referring to FIG. 12, in this embodiment, the conductive resistance sheet 60 may be provided in the inside of the refrigerator 1 rather than on the end peripheral portion of the vacuum adiabatic body. The second plate member 20 may extend beyond the outside of the refrigerator 1 and the peripheral portion of the vacuum adiabatic body. In some cases, the second plate member 20 may extend a certain length to the inside of the refrigerator 1. In a case of this embodiment, it can be seen that a conductive resistance sheet 60 can be provided at a position similar to the conductive resistance sheet 60 of the door-side vacuum adiabatic body illustrated in FIG. 4(b).

In this case, it is preferable that the second reinforcing member 110 is moved to the inside of the refrigerator 1 without being in contact with the conductive resistance sheet 60 so as to avoid affecting the high thermal conductive adiabatic performance of the conductive resistance sheet 60. This is to achieve the function of the heat bridge of the conductive resistance sheet 60. Accordingly, the conductive resistance sheet 60 and the second reinforcing member 110 are not in contact with each other, and the conductive adiabatic performance by the conductive resistance sheet 60 and the strength reinforcement performance of the vacuum insulation member by the reinforcing members 100 and 110 can be achieved at the same time. This embodiment can be applied to a case where perfect thermal protection and physical protection against the peripheral portion of the vacuum adiabatic body are required.

Figure 13:
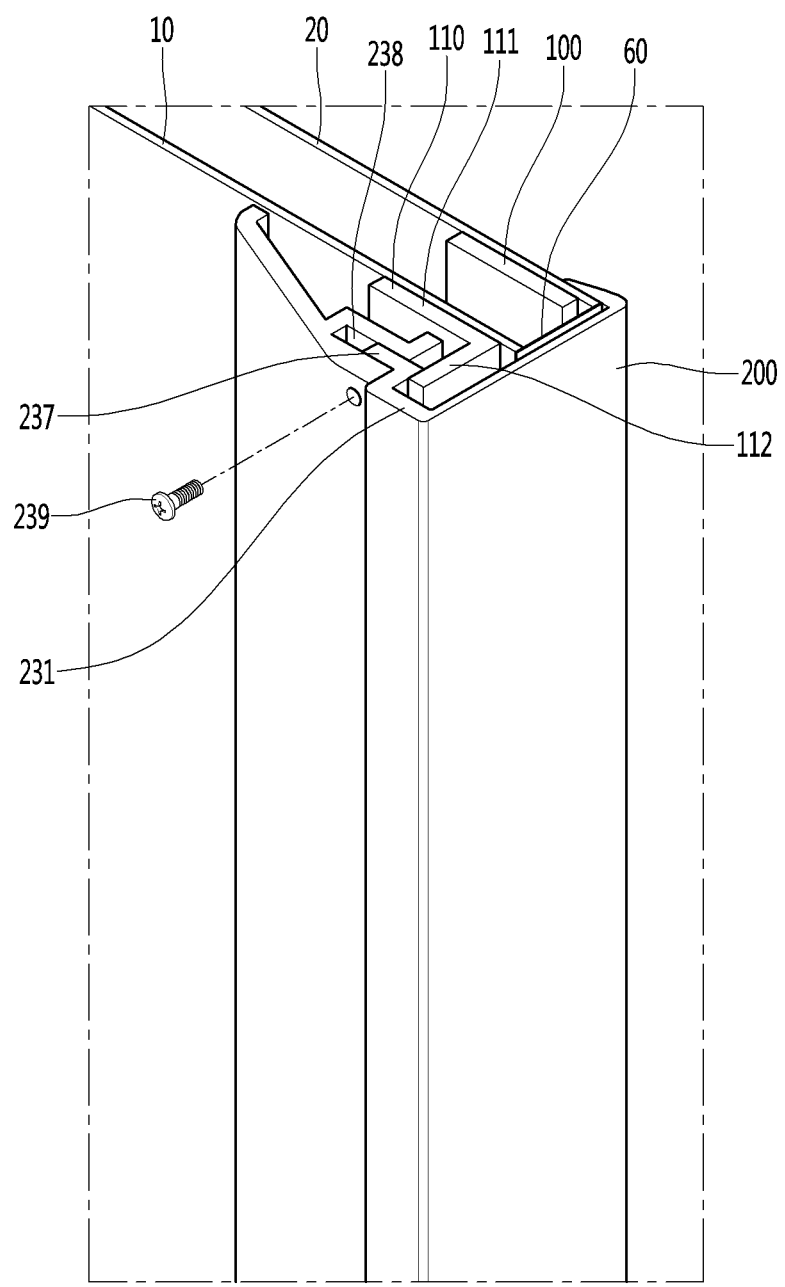
FIG. 13 and FIG. 14 are partial cutaway perspective views illustrating an inner surface part.
Figure 14:
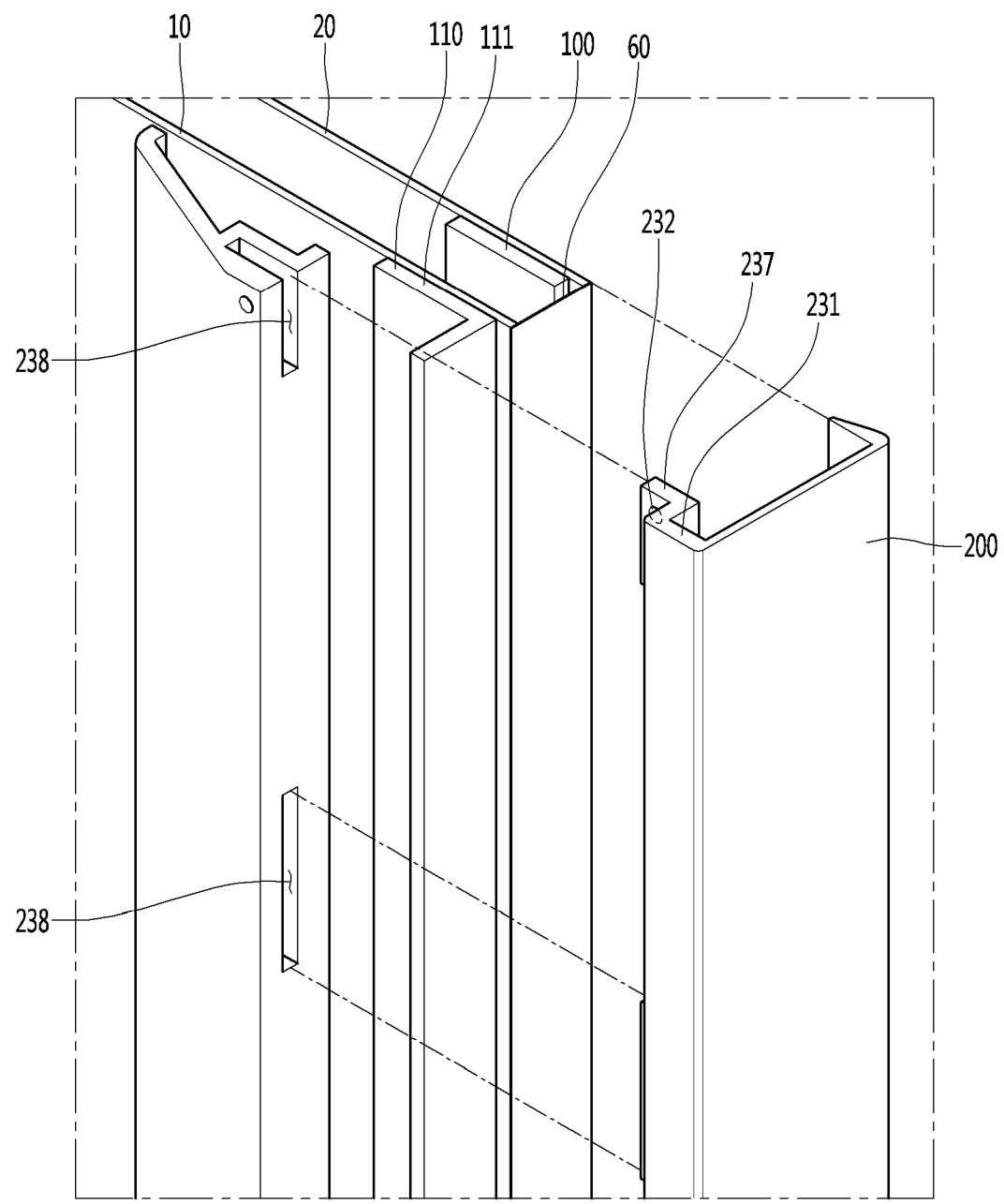

FIGS. 13 and 14 are partial cutaway perspective views illustrating the fastening of the two members of the inner surface part 230 in the embodiment previously described in which the inner surface part 230 is divided into two members. FIG. 13 is a view illustrating a state where fastening of the two members of the inner surface part 230 is completed and FIG. 14 is a view illustrating a fastening process of the two members of the inner surface part 230.

Referring to FIGS. 13 and 14, the first member fastening part 232 is engaged with the protrusion part 112 of the second reinforcing member 110, and the outer surface part 210 is supported by the second plate member 20. Accordingly, the sealing frame 200 can be fixed to the peripheral portion of the vacuum adiabatic body.

At least one first member insertion part or extension 237 which is bent and extends in the inside direction of the refrigerator 1 may be provided at the end portion of the first member fastening part 232, preferably, for each sealing frame 200 installed in the refrigerator. A second member insertion recess 238 may be provided at a position corresponding to the first member insertion part 237. The first member insertion part 237 and the second member insertion recess 238 are similar in size and shape to each other so that the first member insertion part 237 can be inserted into, fitted into, and fixed to the second member insertion recess 238.

The fastening of the first member and the second member of the inner surface part 230 will be described. The second member is aligned with respect to the first member so that the second member insertion recess 238 corresponds to the first member insertion part 237 in a state where the first member is fastened to the peripheral portion of the vacuum adiabatic body. By inserting the first member insertion part 237 into the second member insertion recess 238, the two members can be fastened.

At least a portion of the second member insertion recess 238 may be provided to be smaller than the first member insertion part 237 so as to prevent the fastened second member from being removed from the first member. Thereby, both members of the inner surface part 230 can be tightly fitted to each other. So as to perform an action of being engaged and supported after the first member insertion part 237 is inserted a predetermined depth into the second member insertion recess 238 and, at some point after a predetermined depth, a protrusion and a groove can be provided at both members, respectively. In this case, after the two members are inserted at a certain depth, the two members may be further inserted beyond the certain depth in steps so that the fixing of the two members may be performed to be more stable. A worker feels that the correct insertion has been performed through a light or clicking feeling.

The two members constituting the inner surface part 230 can be fixed in position, coupled, and fitted by the configuration of the two members. Alternatively, in a case where the load is large, the first member and the second member are fastened to each other by a separate fastening member such a fastener 239 inside the refrigerator.

FIGS. 15(a) to 15(f) are views for sequentially illustrating the fastening of the sealing frame 200 in a case of the embodiment in which the inner surface part 230 is provided as two members.

Figure 15A:
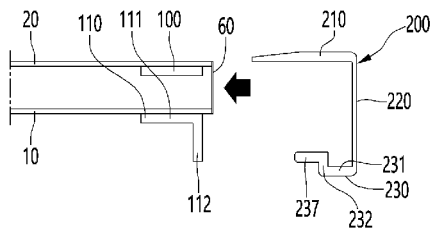
FIGS. 15A-15F are views for sequentially explaining fastening of a sealing frame in a case of an embodiment in which the sealing frame is provided as two members.

Referring to FIG. 15(a), the sealing frame 200 is fastened to the peripheral portion of the vacuum adiabatic body. At this time, the fastening can be performed by using the elastic deformation of the sealing frame 200 and the restoring force according to the elastic deformation without a separate member such as a screw.

For example, in a state where the inner surface part 230 is engaged with the second reinforcing member 110, the connection point between the inner surface part 230 and the side surface part 220 may be used as a center of rotation, and the side surface part 220 and the outer surface part 210 are rotated in a direction of the second plate member 20. This action can cause the elastic deformation of the side surface part 220.

Thereafter, the outer surface part 210 moves inward from the outer surface of the second plate member 20 and the elasticity restoring force of the side surface part 220 acts so that the outer surface part 210 can be lightly fastened to the outer surface of the second plate member 20. When the fastening of the sealing frame 200 is completed, the sealing frame 200 can be seated in the original position thereof designed to the designed original shape.

Figure 15B:
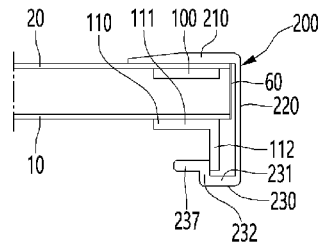

Referring to FIG. 15(b), a state where the fastening of the first member of the sealing frame 200 is completed is illustrated. The side surface part 220 may be formed to be thinner than the outer surface part 210 and the inner surface part 230 so that the sealing frame 200 can be fastened to the peripheral portion of the vacuum adiabatic body by elastic deformation and elastic restoring action of the sealing frame.

Figure 15C:
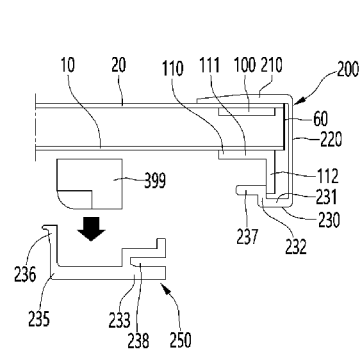

Referring to FIG. 15(c), a part seating member 250 may be the second member of the inner surface part 230. The part seating member 250 is a part on which a part or fixture 399 is placed and the set position thereof can be supported, and the additional function necessary for the action of the part 399 can be further performed. For example, in the present embodiment, in a case where the part 399 is a lamp, the gap forming part 234 may be provided on the part seating member 250 as a transparent member. Therefore, this allows the light emitted from the lamp 399 to pass through the inner surface part 230 and to be emitted into the refrigerator 1 and allows the user to identify products in the refrigerator 1.

The part seating member 250 may have a predetermined shape that can be fitted with the part 399 to fix the position of the part 399 so that the part 399 is seated.

Figure 15D:
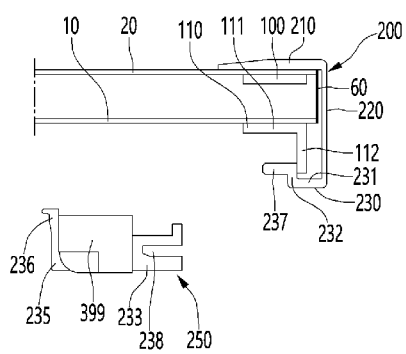

FIG. 15(d) illustrates a state where the part 399 is placed on the part seating member 250.

Figure 15E:
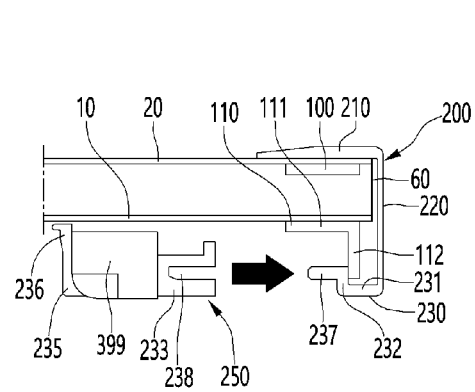

Referring to FIG. 15(e), the part seating member 250 on which the part 399 is seated is aligned in a predetermined direction so as to be fastened to the first member of the inner surface part 230. In the embodiment, the first member insertion part 237 of the first member fastening part 232 and the second member insertion recess 238 can be aligned with each other in the extending direction so that the first member fastening part 232 is fitted to the second member insertion recess 238. Although not limited in this way, such a fastening configuration may enhance the ease of assembly.

Figure 15F:
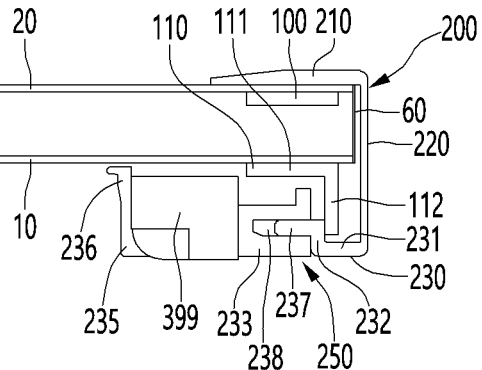

The first member insertion part 237 of the first member fastening part 232 is slightly larger than the second member insertion recess 238 so that the first member fastening part 232 and the second member insertion recess 238 are tightly fitted to each other, and an engagement structure such as a step and a protrusion can be introduced for light insertion. FIG. 15(f) illustrates the inner surface part 230 in a state where the assembling is completed.

Figure 16:
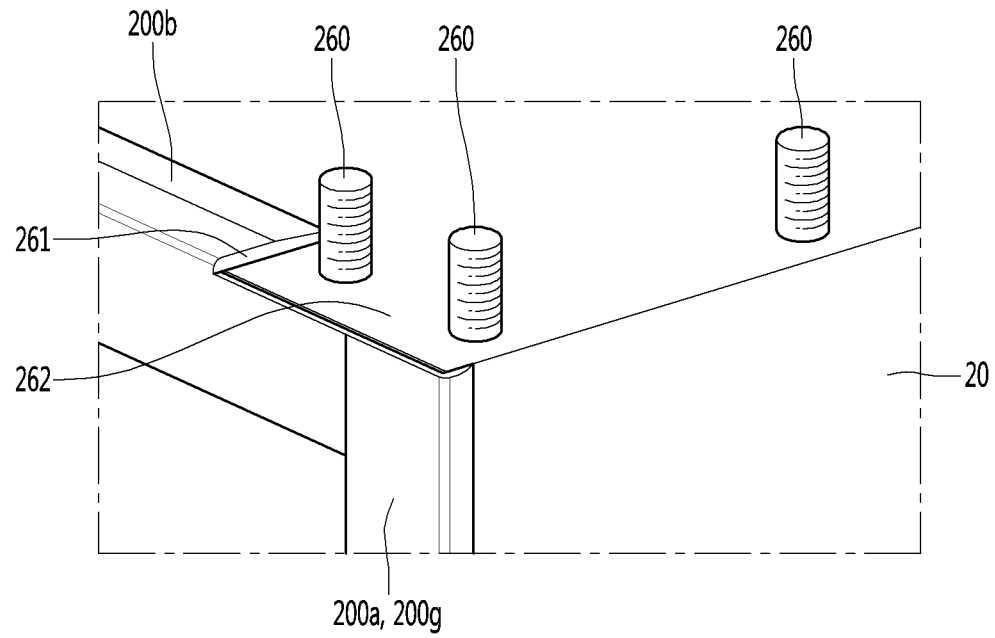
FIG. 16 and FIG. 17 are views illustrating any one end portion of the sealing frame.
Figure 17:
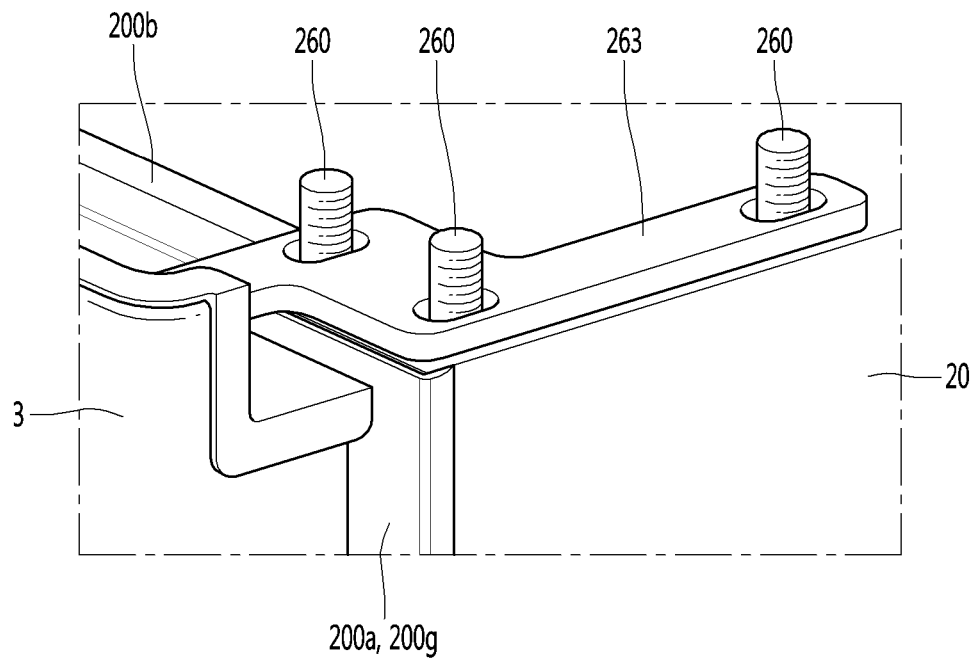

FIGS. 16 and 17 are views illustrating any one end portion of the sealing frame 200, FIG. 16 is a view before the door hinge is installed, and FIG. 17 is a view after the door hinge is installed.

In a case of a refrigerator 1, a door hinge 263 is provided at the connection part so that the door-side vacuum adiabatic body is fastened to the main body-side vacuum adiabatic body in a state of being capable of being rotated. The door hinge 263 has to have a predetermined strength and can prevent door sagging due to the own weight thereof in a state where the door is fastened and prevent the main body 2 from being distorted.

Referring to FIG. 16, so as to fasten the door hinge 263, a door fastener 260 is provided on the main body-side vacuum adiabatic body. Three door fasteners 260 may be provided. The door fastener 260 can be directly or indirectly fixed to the second plate member 20, the reinforcing members 100 and 110, and/or a separate additional reinforcing member (for example, additional plate which is further provided at the outer surface of second plate member 20). Here, direct fixing may be referred to as one by a fusion method such as welding, and indirect fixing may be referred to as a fastening method using an auxiliary fastening tool or the like instead of the method such as fusion or the like.

Since the door fastener 260 is required to have a high supporting strength, the door fastener 260 can be fastened while contacting the second plate member 20. For this, the sealing frame 200 may be cut, and the sealing frame 200 to be cut may be an upper sealing frame 200b at the upper corner of the main body-side vacuum adiabatic body. In addition, the sealing frame 200 to be cut may be a right sealing frame 200a, 200f, and 200g (FIGS. 9-10) at the right corner of the main body-side vacuum adiabatic body and the lower sealing frame 200e (FIGS. 9-10) at the lower edge of the main body-side vacuum adiabatic body. If the door installation direction is different, the sealing frame 200 to be cut may be a left sealing frame 200a, 200f, and 200g at the left corner of the main body-side vacuum adiabatic body.

The sealing frame 200 to be cut may have a cut surface 261 and the second plate member 20 may have a door fastener seating surface 262 to which the door fastener 260 is fastened. Accordingly, the door fastener seating surface 262 can be exposed to the outside by the cut of the sealing frame 200, and an additional plate member can be further interposed in the door fastener seating surface 262.

The end portion of the sealing frame 200 may not be entirely removed, but a portion of the sealing frame 200 may be removed only at a portion where the door fastener 260 is provided. However, it is more preferable to remove all the end portion of the sealing frame 200 so as to facilitate the manufacturing and to firmly support and fasten the door hinge 263 on the side of the vacuum adiabatic body.

Figure 18A:
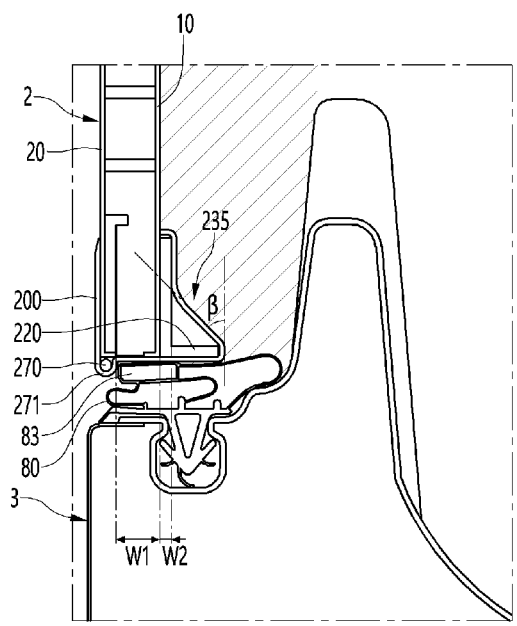
FIGS. 18A-18B is a view for explaining the effect of the sealing frame according to the present invention in comparison with the technique of the related art.
Figure 18B:
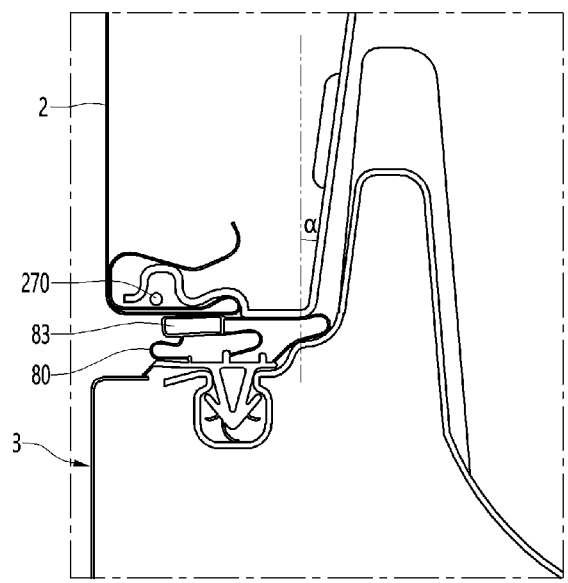

FIG. 18 is a view for explaining the effect of the sealing frame according to the present invention in comparison with the related art, FIG. 18(a) is a sectional view of a contact part between the main body-side vacuum adiabatic body and a door 3 according to the present invention, and FIG. 18(b) is a sectional view illustrating the main body and the door according to the related art.

Referring to FIG. 18, in the refrigerator 1, a hotline 270 may be installed at the contact part between the door 3 and the main body 2 so as to prevent dew formation due to abrupt temperature change. As the hotline 270 is closer to the outer surface and the peripheral portion of the main body 2, dew formation can be removed even with a small heat capacity.

According to the embodiment, the hotline 270 may be placed in an inner space of a gap between the second plate member 20 and the sealing frame 200. A hotline accommodation part or groove 271 in which the hotline 270 is placed may be further provided in the sealing frame 200. Since the hotline 270 is placed outside the conductive resistance sheet 60, the amount of heat transferred to the inside of the refrigerator 1 is also small. This makes it possible to prevent dew formation of the main body and the door contact part even with a smaller heat capacity. In addition, by allowing the hotline 270 to be relatively placed on the outside of the refrigerator, that is, a portion which is bent between the peripheral portion of the main body 2 and the outer surface of the main body 2, it is possible to prevent entry of heat into the refrigerator space.

In the embodiment, the side surface part 220 of the sealing frame 200 may have a portion or width W1 which is aligned with the gasket 80 and the vacuum space part 50 and a portion or width W2 which is not aligned with the vacuum space part 50 and is aligned with the refrigerator space. This is the portion provided by the side surface part 220 to ensure sufficient cool air blocking by the magnet of the gasket 80. Therefore, the sealing action by the gasket 80 can be sufficiently achieved by the sealing frame 200.

In the embodiment, the inclined part 235 inside the refrigerator 1 is provided to be inclined toward the inner surface of the first plate member 10 at a predetermined angle β. This can increase the volume in the refrigerator 1 like a hatched portion and can provide an effect of enabling a narrow space inside the refrigerator 1 to be more widely available. In other words, it is possible to widely utilize the space in the vicinity of the door 3 by inclining the inclined part inside the refrigerator 1 in a direction opposite to the predetermined angle α directed toward the space inside the refrigerator 1 as in the related art. For example, it is possible to accommodate more food in the door 3 and to obtain more space which can accommodate the various parts necessary for the operation of the appliance.

Figure 19:
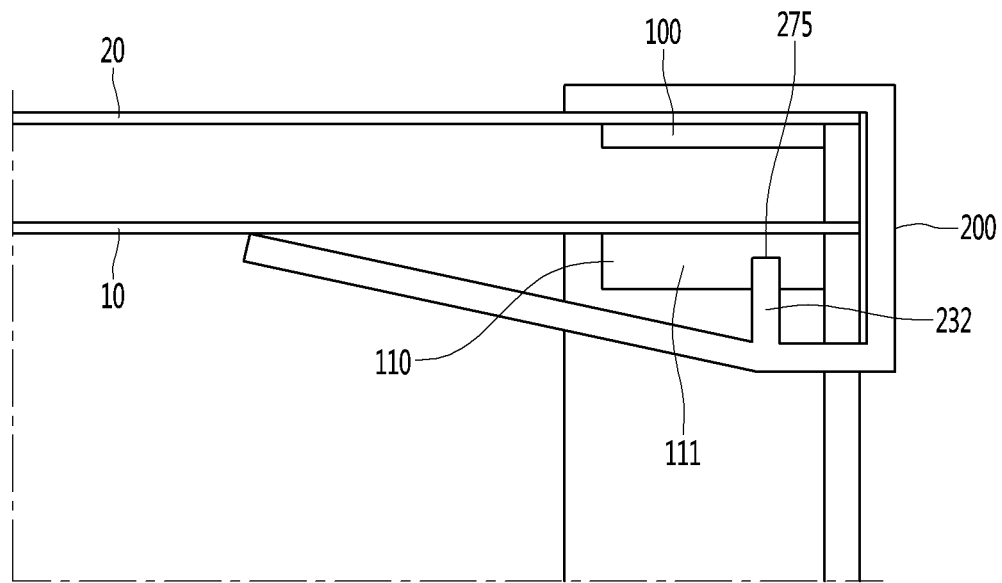
FIGS. 19 to 24 are views illustrating various embodiments in which a sealing frame is installed.

Hereinafter, FIGS. 19 to 24 illustrate various embodiments in which the sealing frame 200 is installed. Referring to FIG. 19, the second reinforcing member 110 may provide only the base part 111 and may not provide the protrusion part 112. In this case, a groove 275 may be provided in the base part 111. The end portion of the first member fastening part 232 may be inserted into the groove 275. This embodiment can be preferably applied in a case of a product which can provide sufficient strength without providing the protrusion part 112 in the second reinforcing member 110.

In a case of the present embodiment, as a process of the end portion of the first member fastening part 232 being fitted in the groove 275 and aligned when the sealing frame 200 is fastened, the sealing frame 200 is fastened to the end portion of the vacuum adiabatic body. According to the fastening action between the groove 275 and the first member fastening part 232, by only the fastening between the inner surface part 230 of the sealing frame 200 and the second reinforcing member 110, it is possible to stop the movement of the sealing frame 200 in the y-axis direction.

Figure 20:
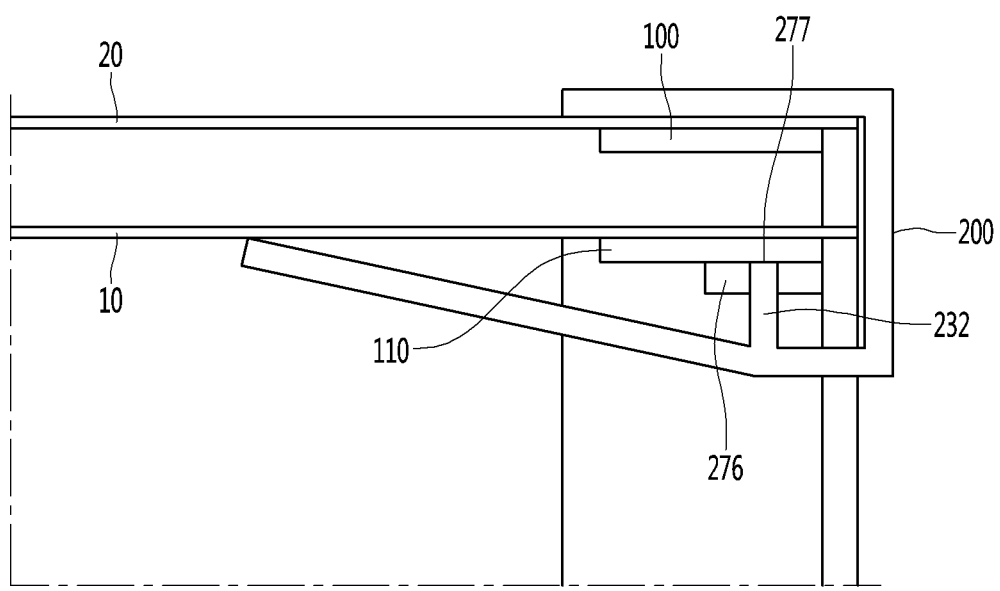

Referring to FIG. 20, when this embodiment is compared with the embodiment illustrated in FIG. 19, this embodiment differs from the embodiment illustrated in FIG. 19 in that a reinforcing base part 276 is further provided to the base part 111. The reinforcing base part 276 is further provided with a groove 277 so that the end portion of the first member fastening part 232 can be inserted. This embodiment can be applied when it is necessary to reinforce the strength to a predetermined level even if the protrusion part 112 is not provided with the second reinforcing member 110 due to lack of the installation space, interference, or the like. In other words, it is preferably applied when the strength of the main body-side vacuum adiabatic body can be reinforced by a certain amount by further installing a reinforcing base 276 at the outer end of the base part 111.

The groove 277 is provided in the reinforcing base part 276 and the end portion of the first member fastening part 232 is fitted and aligned in the groove portion 277 so that the sealing frame 200 can be fastened to the end portion of the vacuum adiabatic body. Even in a case of the fastening action of the groove 277 and the first member coupling part 232, the movement of the sealing frame 200 in the y-axis direction can be stopped only by only fastening between the inner surface part 230 of the sealing frame 200 and the second reinforcing member 110.

Figure 21:
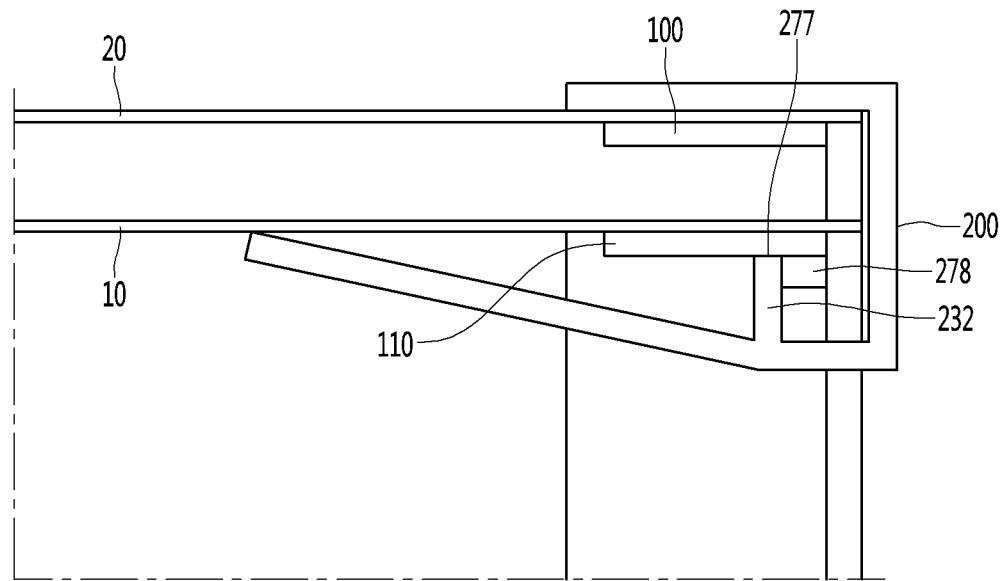

Referring to FIG. 21, when the present embodiment is compared with the embodiment illustrated in FIG. 19, the present embodiment differs from the embodiment illustrated in FIG. 19 in that the base part 111 is further provided with a reinforcing protrusion 278. The end portion of the first member fastening part 232 may be engaged with the reinforcing protrusion 278. Even if the second reinforcing member 110 is not provided with the protrusion part 112 or the reinforcing base part 276 due to lack of the installation space, interference, or the like, the present embodiment can be applied when the strength thereof is reinforced to a predetermined level and there is a need to ensure that the first member fastening part 232 is engaged. In other words, by further installing the reinforcing protrusion 278 at the outer end portion of the base part 111, the strength of the main body-side vacuum adiabatic body can be reinforced. In addition, the reinforcing protrusion 278 can be preferably applied because the reinforcing protrusion can provide an engagement action of the first member fastening part 232. The first member fastening part 232 is engaged and supported to the reinforcing protrusion 278 so that the sealing frame 200 can be fastened to the end portion of the vacuum adiabatic body.

The embodiment illustrated in FIGS. 19 to 21 illustrates a case where the inner surface part 230 is provided as a single product without being separated into the first member and the second member and is fastened to the vacuum adiabatic body. However, as previously described, the inner surface part 230 may be separated into two members without being limited thereto.

Although the embodiment described above provides a case where the second reinforcing member 110 is provided, the following embodiments will describe fastening of the sealing frame 200 in a case where no additional reinforcing member is provided inside the first plate member 10.

Figure 22:
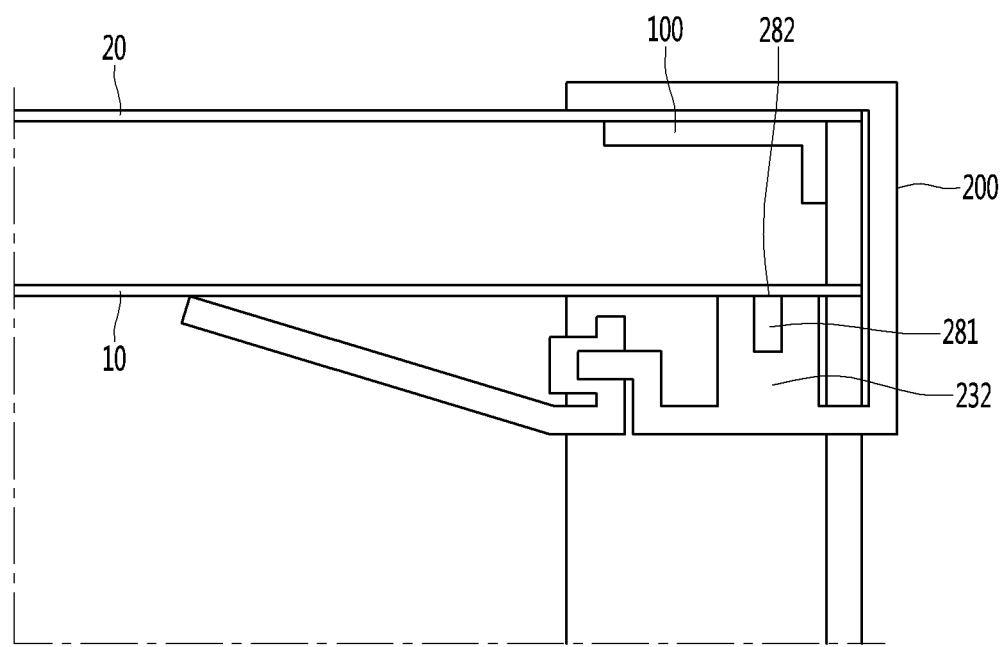

Referring to FIG. 22, the first reinforcing member 100 is provided to reinforce the strength of the vacuum adiabatic body, but the second reinforcing member 110 is not separately provided. In this case, an inner protrusion 281 may be provided on the inner surface of the first plate member 10 so that the sealing frame 200 is fastened. The inner protrusion 281 can be fastened to the first plate member 10 by welding, fitting, or the like. The present embodiment can be applied in a case where the sufficient strength of the main body-side vacuum adiabatic body can be obtained only by the reinforcing members provided in the first reinforcing member 100, that is, the vacuum space part 50, or in a case where the reinforcing member can be installed on a side of the second plate member 20.

A first member fastening groove 282 may be provided in the first member fastening part 232 so as to be capable of being fitted and fixed to the inner protrusion 281. In the first member fastening groove 282, by inserting the inner protrusion 281, the fastening position of the sealing frame 200 can be fixed.

Figure 23:
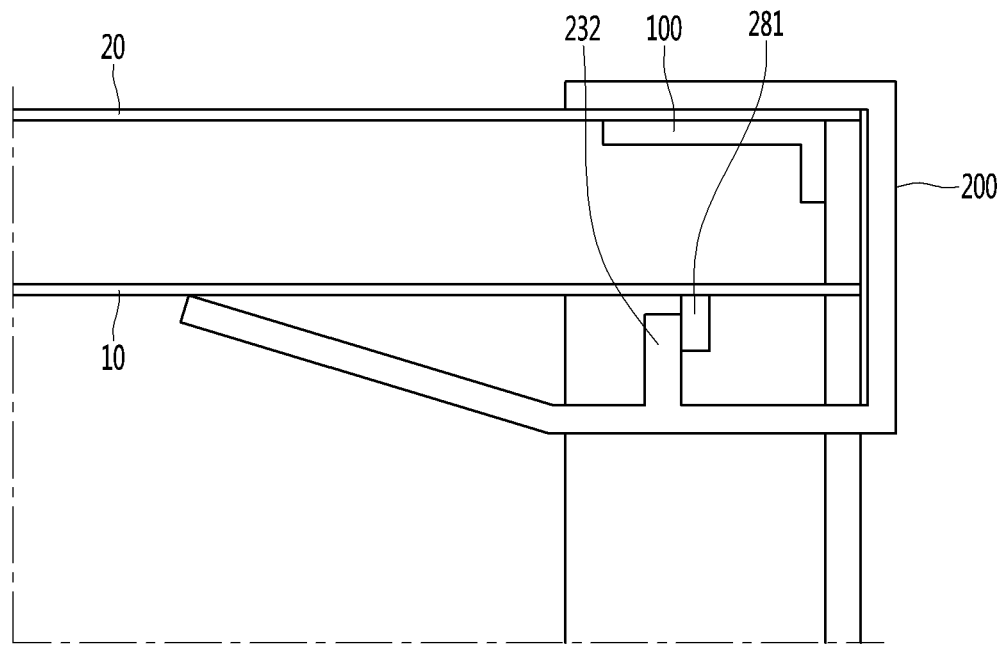

Referring to FIG. 23, when compared with the embodiment illustrated in FIG. 22, FIG. 23 characteristically differs from the embodiment illustrated in FIG. 22 in that, in FIG. 23, the first member fastening groove 282 is not provided. According to the present embodiment, the position of the sealing frame 200 can be supported by one end of the first member fastening part 232 being supported by the inner protrusion 281.

When compared with the embodiment illustrated in FIG. 22, in this embodiment, there is a disadvantage in that the movement of the sealing frame 200 in the y-axis direction is stopped only in one direction instead of stopping the movement of the sealing frame 200 in the y-axis direction in both directions. However, there is an advantage in that a worker can conveniently work at the time of fastening the sealing frame 200.

The embodiment illustrated in FIGS. 19 to 23 is provided as a configuration in which a side of the first plate member 10 is fixed, and the movement of a side of the second plate member 20 such as sliding is allowed. In other words, the second plate member 20 and the outer surface part 210 are allowed to be relatively slidable, and the relative movement of the first plate member 10 and the inner surface part 230 is not allowed. Such a configuration can be configured opposite to each other. Hereinafter, such a configuration is proposed.

Figure 24:
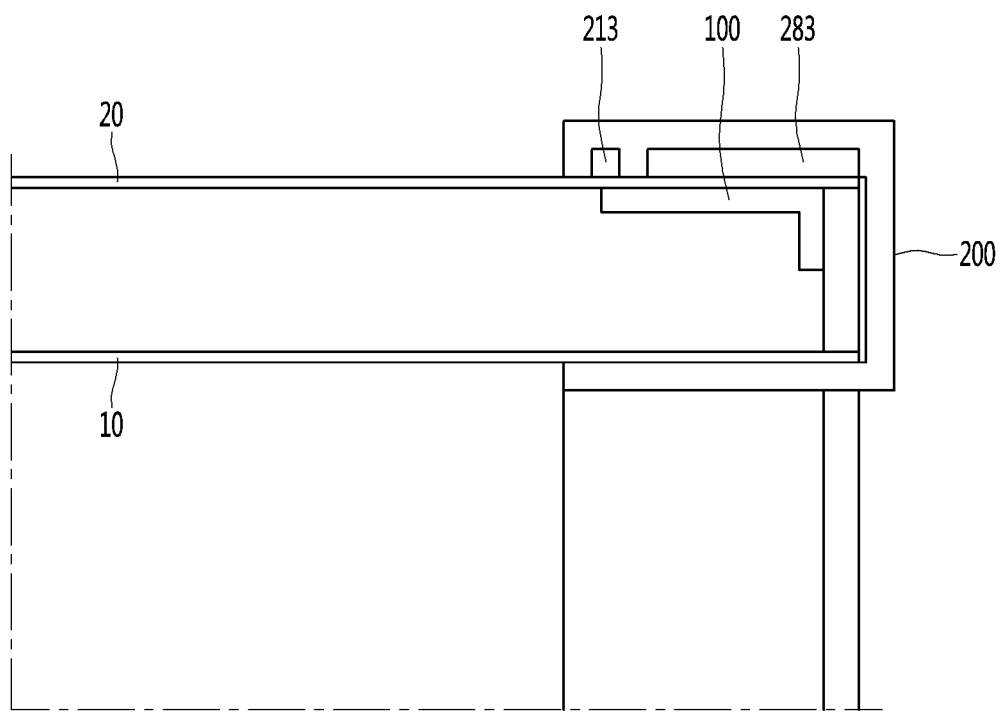

Referring to FIG. 24, an outer protrusion 283 may be provided on the outer surface of the second plate member 20 and an outer engagement part 213 may be provided on the outer surface part 210 of the sealing frame 200. The outer engagement part 213 can be engaged with the outer protrusion 283 and supported.

In a case of the present embodiment, the inner surface part 230 of the sealing frame 200 may be allowed to move with respect to the inner surface part of the first plate member 10, such as a sliding. In this embodiment, mounting and fixing of the sealing frame 200 differ only in the direction and the same description can be applied.

Various embodiments may be further proposed in addition to the embodiment related to FIG. 24. For example, the reinforcing members 100 and 110 may be further installed on the second plate member 20, and the various structures of FIGS. 19 to 21 may be provided with respect to the reinforcing members 100 and 110. Also, the outer engagement part 213 may alternatively be provided as a groove structure as illustrated in FIG. 22.

According to the present embodiment, there is a difference in a configuration in which the fastening direction of the sealing frame 200 can be provided in a direction opposite to the original embodiment. However, the fundamental action of the sealing frame can be obtained in the same way.

Hereinafter, a description will be given of a configuration in which a part 399 (e.g., a light or lamp) is installed in an appliance such as a refrigerator 1 to which a vacuum adiabatic body is applied and a wire or wiring 402 and/or 403 (FIG. 27) is applied to the part 399.

Figure 25:
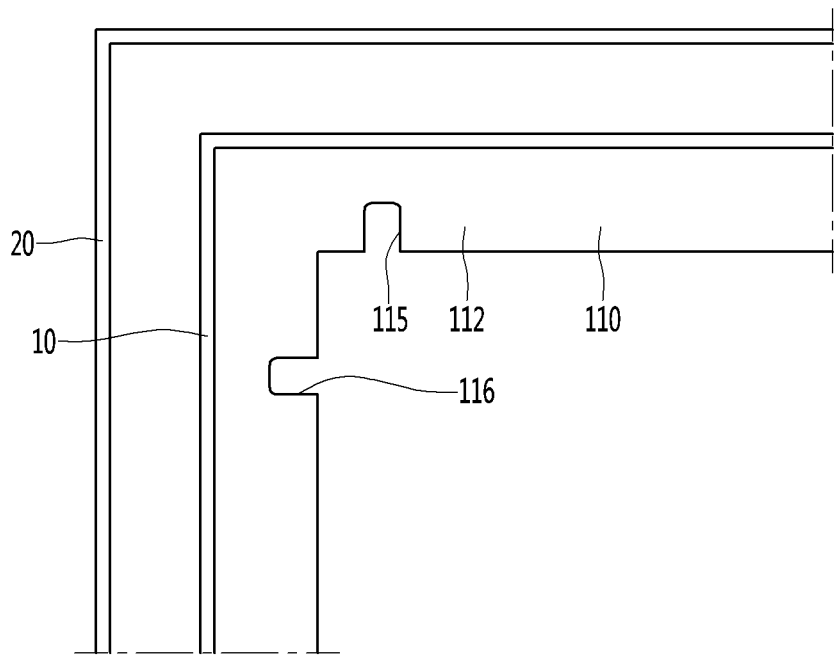
FIG. 25 is a view observing the upper right side of the main body-side vacuum adiabatic body from the front.

FIG. 25 is a front view of the upper right side of the main body-side vacuum adiabatic body. Referring to FIG. 25, a reinforcing member including a first reinforcing member 100 and a second reinforcing member 110 is provided together with the first plate member 10 and the second plate member 20. The second reinforcing member 110 is placed on the inner surface of the first plate member 10 to reinforce the strength of the main body-side vacuum adiabatic body. The second reinforcing member 110 is provided in the form of a long rod along the corner of the vacuum adiabatic body to reinforce the strength of the vacuum adiabatic body.

The protrusion part 112 of the second reinforcing member 110 may be provided with at least one slit 115 and/or 116. The slits 115 and 116 serve as holes through which wirings 402 and/or 403 pass so that the worker can conveniently locate the wirings 402 and/or 403. It is possible to prevent breakage of the wiring 402 and/or 403 due to the bending of the wiring by placing the wiring in the slits 115 and/or 116.

The slit 115 and/or 116 may be provided as a first slit 115 which is provided in the second reinforcing member 110 at the corner portion of the upper surface of the vacuum adiabatic body or as a second slit 116 which is provided in the second reinforcing member 11 in the side corner portion of the vacuum insulating member. The slit 115 or 116 may be provided corresponding to the portion through which the wiring 402 or 403 passes, and may be formed at another position of the second reinforcing member 110.

Figure 26:
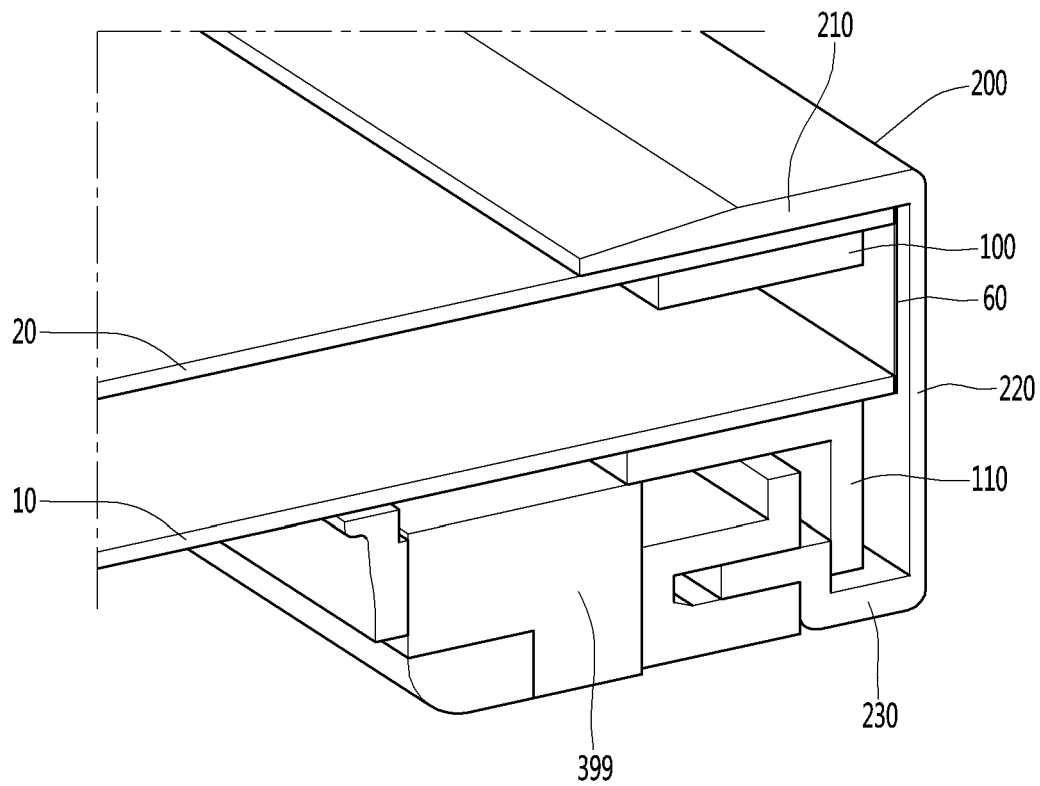
FIGS. 26 and 27 are sectional views illustrating a corner portion of the vacuum adiabatic body in a state where the lamp or the part is installed.

In a case of the embodiment, a lamp which illuminates the interior of the refrigerator 1 is exemplified as a part 399 (FIG. 26), and a slit 115, 116 can be provided at the end portion of each edge to guide the wiring 402, 403 of the part (see 399 in FIG. 26).

Since the slits 115 and 116 can serve as stress concentration points for weakening the strength of the reinforcing members 110 and 110, it is preferable to remove the protrusion part 112 to the height of the level at which the wiring 402 and 403 escapes from the part 399 such as the lamp without removing the entire protrusion part 112 as much as possible.

The vertex or corner portions of the slits 115 and 116 may be chamfered or cut to provide smooth round-shaped vertices. According to this configuration, the wiring 402, 403 passing through the slit 115, 116, can be prevented from being broken.

Figure 27:
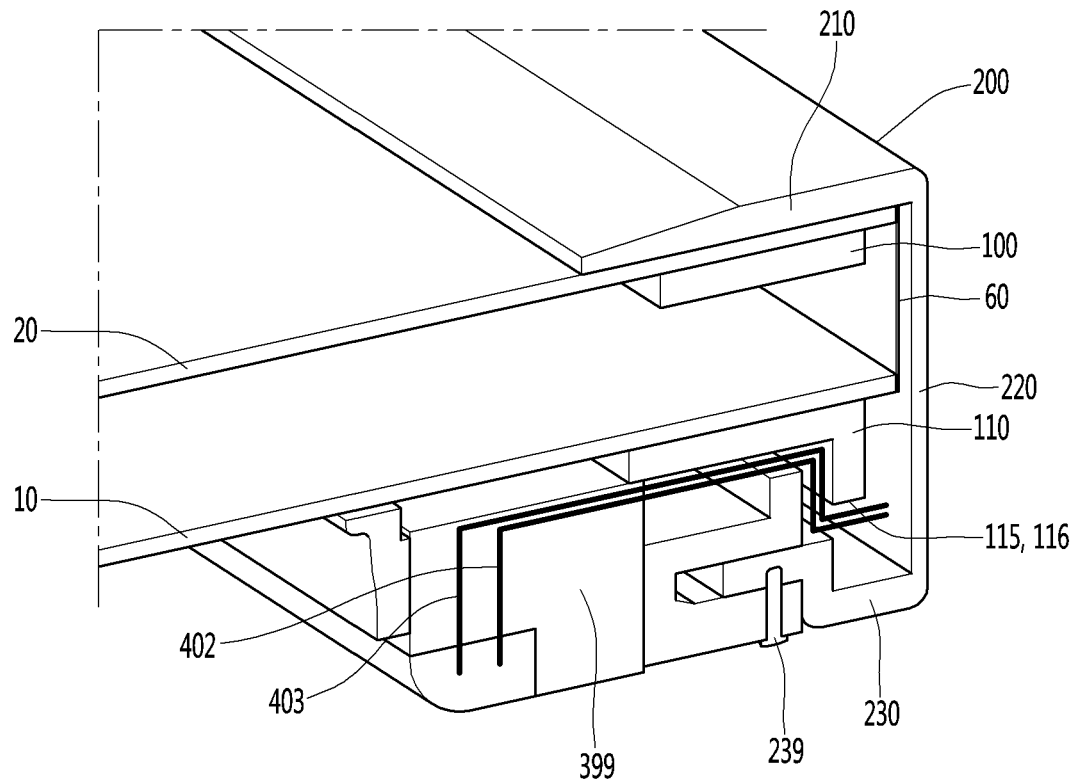

FIG. 26 and FIG. 27 are sectional views of a corner portion of the vacuum adiabatic body in a state where the lamp 399 is installed, FIG. 26 is a sectional view illustrating a portion through which the lamp wiring 402, 403 does not pass, and FIG. 27 is a sectional view illustrating a portion through which the lamp wiring 402, 403 passes. Hereinafter, as a part 399, the 399 will be described as an example, and the part 399 may be referred to as the lamp 399 but may also be referred to as the part 399.

Referring to FIGS. 26 and 27, it is possible to confirm a state where the part 399 is installed, and the lamp 399 is placed inside the gap forming part 234 as a part necessary for the refrigerator 1. Wires or wiring 402 and 403 of the part 399 extend outward at a gap between the inner surface part 230 and the second reinforcing member 110. Specifically, the wires 402 and 403 of the part 399 extend outward at a gap part between the first member fastening part 232, the second member fastening part 233, and the second reinforcing member 110.

The end portion of the second member fastening part 233 is spaced apart from the base part 112 by a predetermined gap so as to provide a gap through which the wirings 402 and 403 can pass in the second member fastening part 233. Of course, the second member fastening part 233 may be provided with a slit such as that provided in the protrusion part 112.

Referring to FIG. 26, the first member fastening part 232 and the protrusion part 112 are in contact with each other to support the sealing frame 200. Referring to FIG. 27, the slits 115 and 116 may extend beyond the end of the first member fastening part 232. The wiring 402, 403 can be drawn out of the protrusion part 112 through the gap between the slits 115 and 116 and the end portions of the first member fastening part 232. According to the configuration of the slits 115 and 116, the wirings 402 and 403 can be guided to the outside through the slits 115 and 116, and at this time, there may be no interference structure that can break the wiring 402 and 403.

Figure 28:
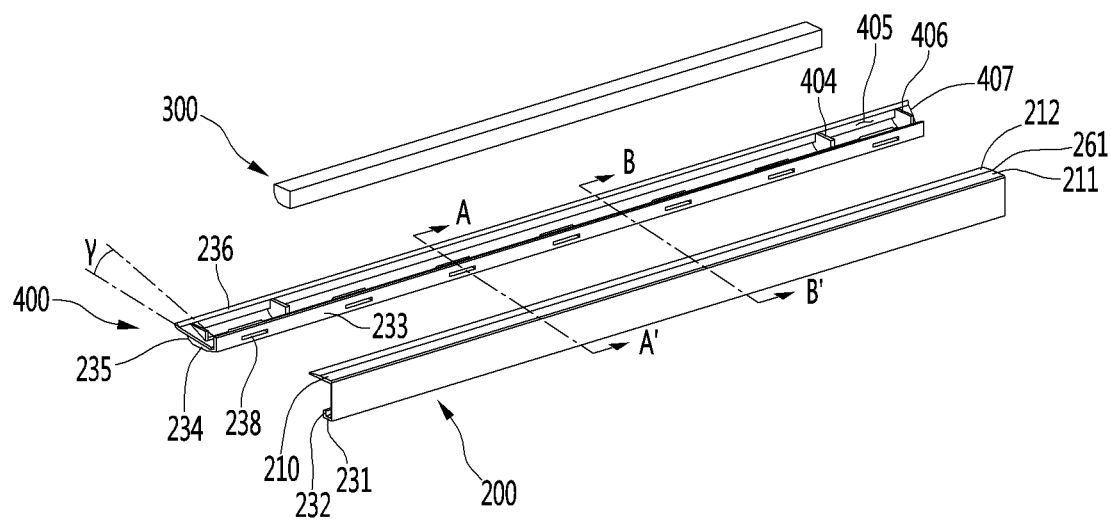
FIG. 28 is an exploded perspective view illustrating a peripheral portion of the part or the lamp.

FIG. 28 is an exploded perspective view illustrating the peripheral portion of the part 399. Referring to FIG. 28, a part 399, a part fixing frame 400 on which the part 399 is seated, and the sealing frame 200 are illustrated.

The part fixing frame 400 provides a portion of the inner surface part 230 of the sealing frame 200. The part fixing frame 400 has constituent elements for seating the part 399 thereon.

The part fixing frame 400 has a shape elongated in one direction and is a member corresponding to the second member constituting the inner surface part 230 when observed in the section thereof and can provide the second member fastening part 233, the gap forming part 234, the inclined part 235 inside the refrigerator 1, and the contact part 236 inside the refrigerator. Functions and actions of configurations already described can be applied to each configuration when observed in the section thereof.

In the part fixing frame 400, a second member insertion recess 238 can be provided at a position corresponding to the first member insertion part 237 which is bent and extended in the inner direction of the refrigerator in the end portion of the first member fastening part 232. The first member insertion part 237 and the second member insertion recess 238 are similar in size and shape to each other so that the first member insertion part 237 can be inserted into, fitted into, and fixed to the second member insertion recess 238. The first member insertion part 237 and the second member insertion recess 238 can be fastened by an additional fastener 239 in the refrigerator 1. In other cases, the part fixing frame 400 may be directly fastened to the second reinforcing member 110.

The inner spaces of the gap forming part 234 and the inclined part 235 inside the refrigerator 1 may form a space in which the part 399 is seated. A part seating rib 404 may be provided on the inner surfaces of the gap forming part 234 and the inclined part 235 inside the refrigerator. The part seating rib 404 can fix a lamp seating position as a portion where both end portions of a lamp main body of the lamp 399 are supported.

Electric wire accommodation ribs 406 may be formed on the outside of the part seating ribs 404. The gap part between the part seating rib 404 and the electric wire accommodation rib 406 may provide an electric wire accommodation part or space 405. The electric wire accommodation part 405 provides a space in which an electric wire 402, 403 for applying power to the part 399 is placed or a predetermined part necessary for the operation of the part 399 can be accommodated. The electric wire accommodation ribs 406 and the electric wire accommodation part 405 may be provided on both sides of the part fixing frame 400. Accordingly, inventory costs can be reduced through the common use of parts.

The wirings 402 and 403 drawn outward from the electric wire accommodation part 405 can pass through the gap part between the upper end of the first member fastening part 233 and the base part 111. The wires 402 and 403 can pass through the slits 115 and 116, enter the gap part between the side surface part 220 and the protrusion part 112 of the sealing frame 200 and be guided elsewhere along the gap part therebetween.

An inclined rib 407 may be provided at both end portions of the part fixing frame 400. The inclined ribs 407 are provided so as to be widened toward the rear from the front end portion of the part fixing frame 400. In the drawing, when referring to an index line extending along the electric wire accommodation rib 406 and an index line extending along the end portion of the inclined rib 407, the structure of the inclined rib 407 will be more accurately understood in a case where the angle γ therebetween is referred.

In the inclined ribs 407, the part fixing frame 400 is in contact with the inner surface part 230 of the sealing frame 200 adjacent to the part fixing frame 400 to eliminate the gap between the members. This makes it possible to provide a wider internal space in the refrigerator 1. For example, the part fixing frame 400 and the adjacent sealing frame 200 can be accurately in contact with each other in accordance with the inclination angle of the inclined part 235 inside the refrigerator provided as β In FIG. 18.

Figure 29:
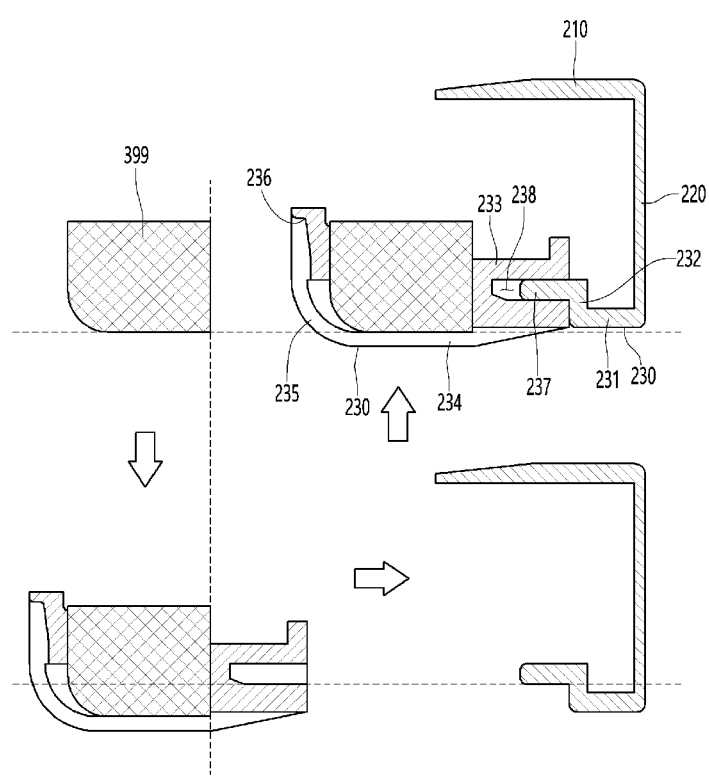
FIGS. 29 and 30 are sectional views taken along line A-A' and line B-B', respectively, in FIG. 28.
Figure 30:
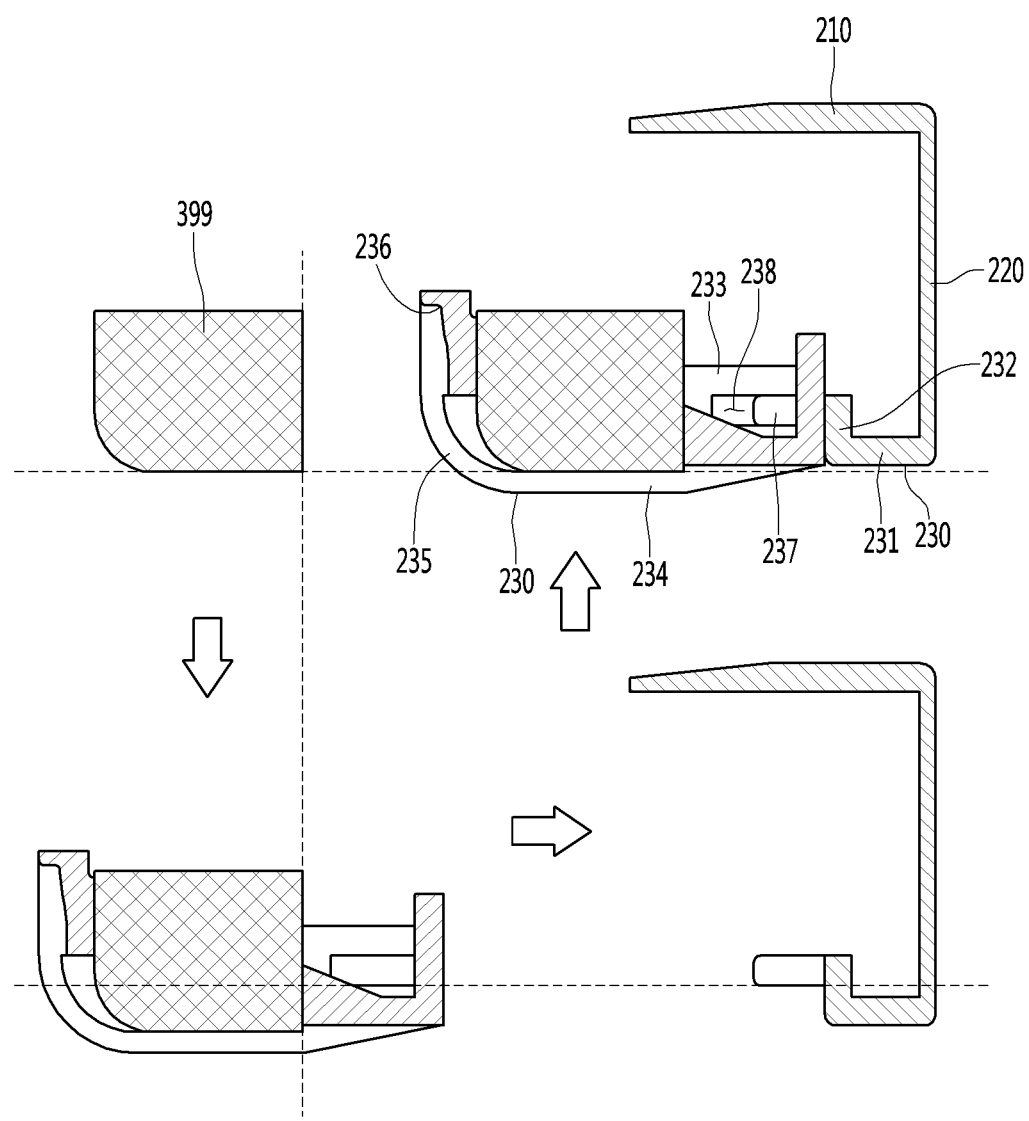

FIGS. 29 and 30 are sectional views taken along line A-A' and B-B' in FIG. 28, respectively, and are illustrated in a time sequence. FIG. 29 can be understood that the sealing frame 200 and the part fixing frame 400 are fastened, and FIG. 30 is a view which can be understood that the sealing frame 200 and the part fixing frame 400 are aligned with each other.

Referring to FIGS. 29 and 30, in a case where the part 399 is placed on the part fixing frame 400 and the part on the lower side of the part 399 is a lamp, the gap forming part 234 is provided as a transparent member and light can be emitted. This allows the light emitted from the lamp 399 to pass through the inner surface part 230 and to be emitted to the refrigerator 1, allowing the user to identify the product in the refrigerator 1.

The part fixing frame 400 on which the part 399 is seated is aligned in a predetermined direction so as to be fastened to the sealing frame 200. In the embodiment, the first member insertion part 237 and the second member insertion recess 238 are aligned to each other in the extending direction of each member so that the first member insertion part 237 can be fitted into the second member insertion recess 238. The first member insertion part 237 is slightly larger than the second member insertion recess 238 so that the first member insertion part 237 and the second member insertion recess 238 can be tightly fitted to each other and an engaging structure such as a step and a protrusion may be introduced for light insertion.

Figure 31:
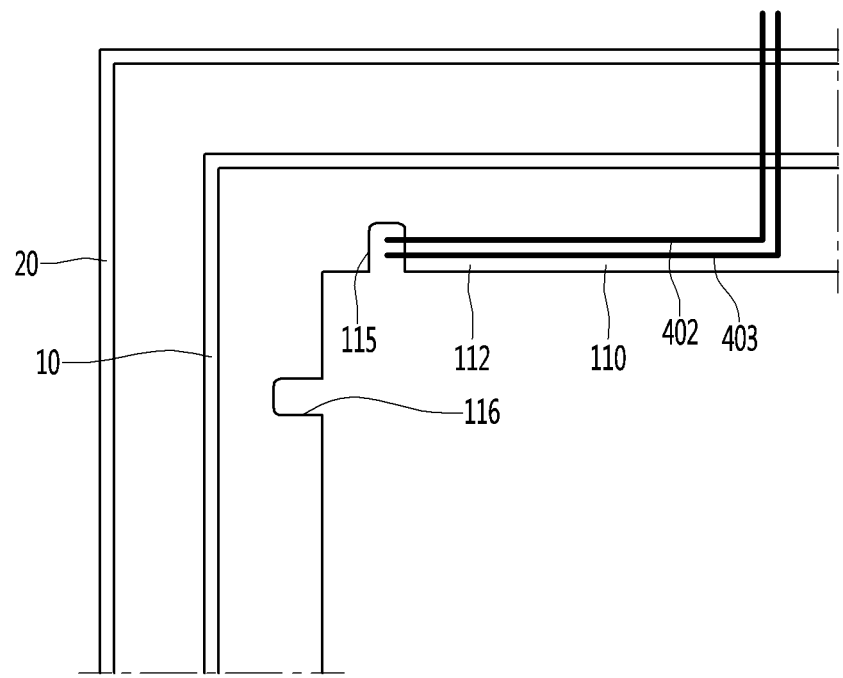
FIG. 31 is a view observing a side portion of the upper side part of the refrigerator from the front.

The path of the wiring 402, 403 drawn out to the outside of the protrusion part 112 of the second reinforcing member 110 through the slits 115 and 116 will be described. FIG. 31 is a view observing a side portion of the upper side part of the refrigerator 1 from the front.

Referring to FIG. 31, the wirings 402 and 403 drawn through the slit 115 can move in any direction along the gap between the protrusion part 112 and the side surface portion 220 of the sealing frame 200.

The moved wiring 402, 403 can be drawn out to an outside through an appropriate position, for example, a central part of the upper surface. The drawn wire 402, 403 can be connected to the controller.

Figure 32:
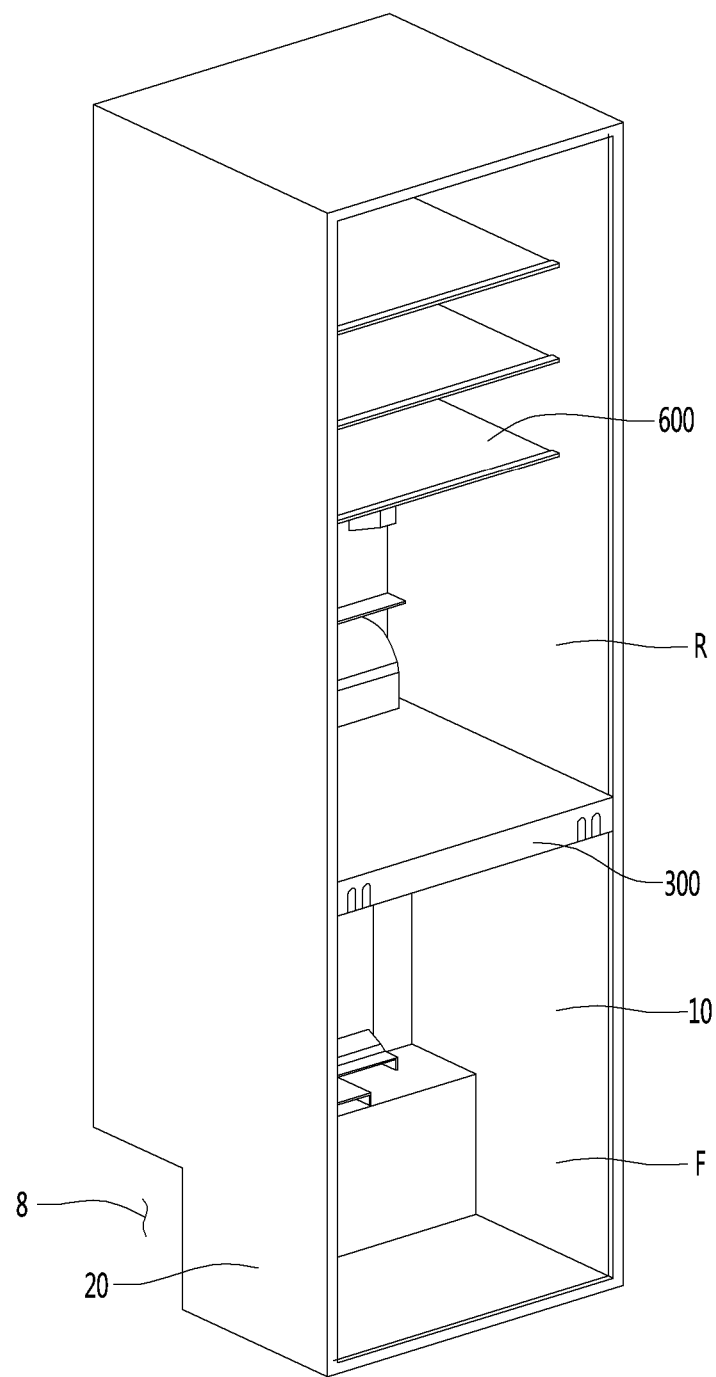
FIG. 32 is a front perspective view illustrating the main body-side vacuum adiabatic body.

Hereinafter, the distribution of cool air through a mullion [[s]] or dividing wall 300 will be described. FIG. 32 is a front perspective view illustrating the main body-side vacuum adiabatic body, and FIG. 33 is a rear perspective view illustrating the main body-side vacuum adiabatic body.

Figure 33:
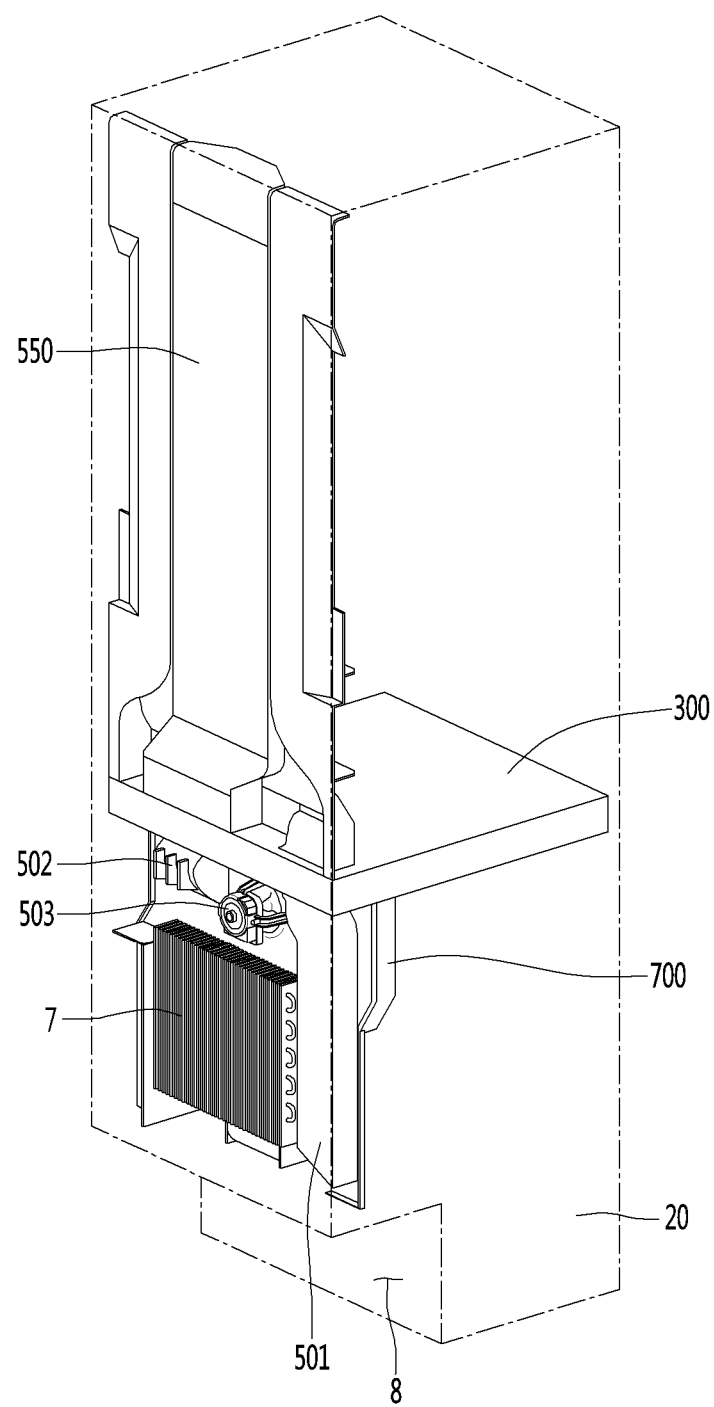
FIG. 33 is a rear perspective view illustrating the main body-side vacuum adiabatic body.

With reference to FIGS. 32 and 33, the vacuum adiabatic body having the first plate member 10 inside the refrigerator 1 and the second plate member 20 outside the refrigerator 1 can divide the inner space into a refrigerating chamber R and a freezing chamber F by the mullion 300.

A machine chamber 8 is provided on the outer lower part of the vacuum adiabatic body, and refrigeration system elements such as a compressor, a condenser, and an expander can be accommodated in the machine chamber 8 as already described. Shelves 600 are placed in the refrigerating chamber R and the freezing chamber F to efficiently accommodate the stored contents.

The freezing chamber F is provided with an evaporator 7 to provide cool air. The cool air provided by the evaporator 7 can be smoothly supplied into the freezing chamber F by the freezing chamber flow path guide 700. A part of the cool air provided in the evaporator 7 may be supplied to a refrigerating chamber flow path guide 550 so that cool air can be smoothly supplied into the refrigerating chamber R.

A fan module 503 provided on the upper side of the evaporator 7 provides negative pressure so that the heat-exchanged air in the refrigerating chamber R and the freezing chamber F passes through the evaporator 7. In other words, the fan module 503 can create a negative pressure environment at the outlet end of the evaporator 7 so that relatively hot air is introduced into the evaporator 7.

The cool air provided from the evaporator 7 is supplied to the refrigerating chamber flow path guide 550 through a cool air discharge pipe 502, and the relatively hot air in the refrigerating chamber R sucked through the refrigerating chamber flow path guide 550 may flow into the evaporator 7 through a cool air collecting pipe 501 again.

The cool air discharge pipe 502 and the cool air collecting pipe 501 can pass through the mullion 300. This is because the refrigerating chamber R and the freezing chamber F are insulated by the mullion 300.

Figure 34:
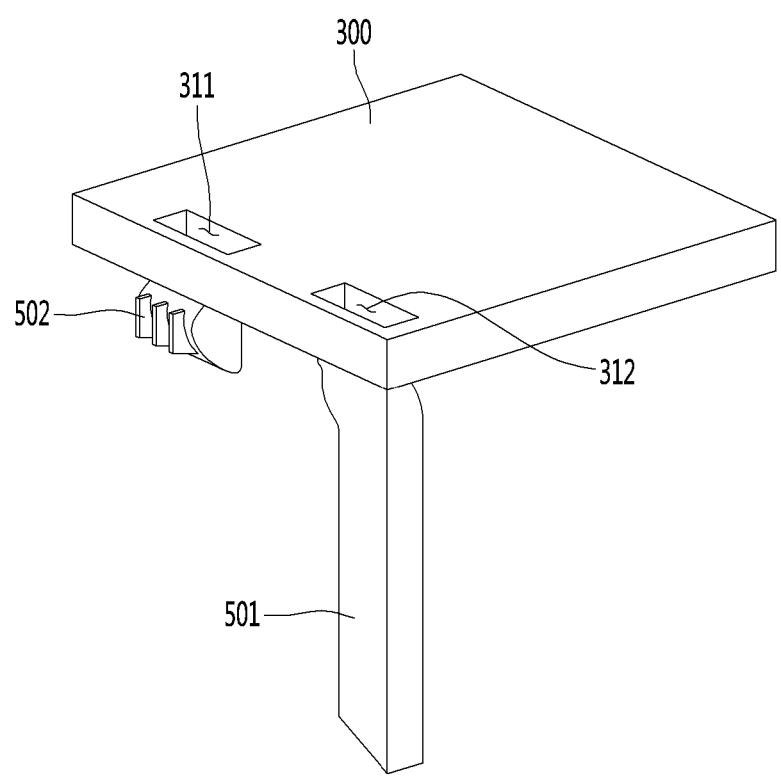
FIG. 34 is a rear perspective view illustrating mullions or a dividing wall separated and observed.

FIG. 34 is a rear perspective view illustrating the mullion 300 separated and observed. Referring to FIG. 34, the mullion 300 can divide the inner space of the vacuum adiabatic body into a refrigerating chamber R and a freezing chamber F. To this end, the outer surface of the mullion 300 can be in contact with the inner surface of the first plate member 10 as described above.

The cool air discharge pipe 502 may be aligned with a cool air supply flow path 311 provided in the mullion 300. The cool air discharge pipe 502 can be aligned with the fan module 503 to receive cool air and the flow path resistance passing through the cool air discharge pipe 502 by a damper provided in the cool air discharge pipe 502 can be adjusted. In some cases, the damper may completely block the cool air discharge pipe 502 or may be completely opened. The cool air supply flow path 311 can supply cool air to the refrigerating chamber flow path guide 550 side.

The cool air collecting pipe 501 can be aligned with a cool air collecting flow pipe or path 312 provided in the mullion 300 and relatively hot air can flow through the refrigerating chamber R by the positive pressure of the cool air supplied to the refrigerating chamber flow path guide 550 through the cool air discharging pipe 502.

Figure 35:
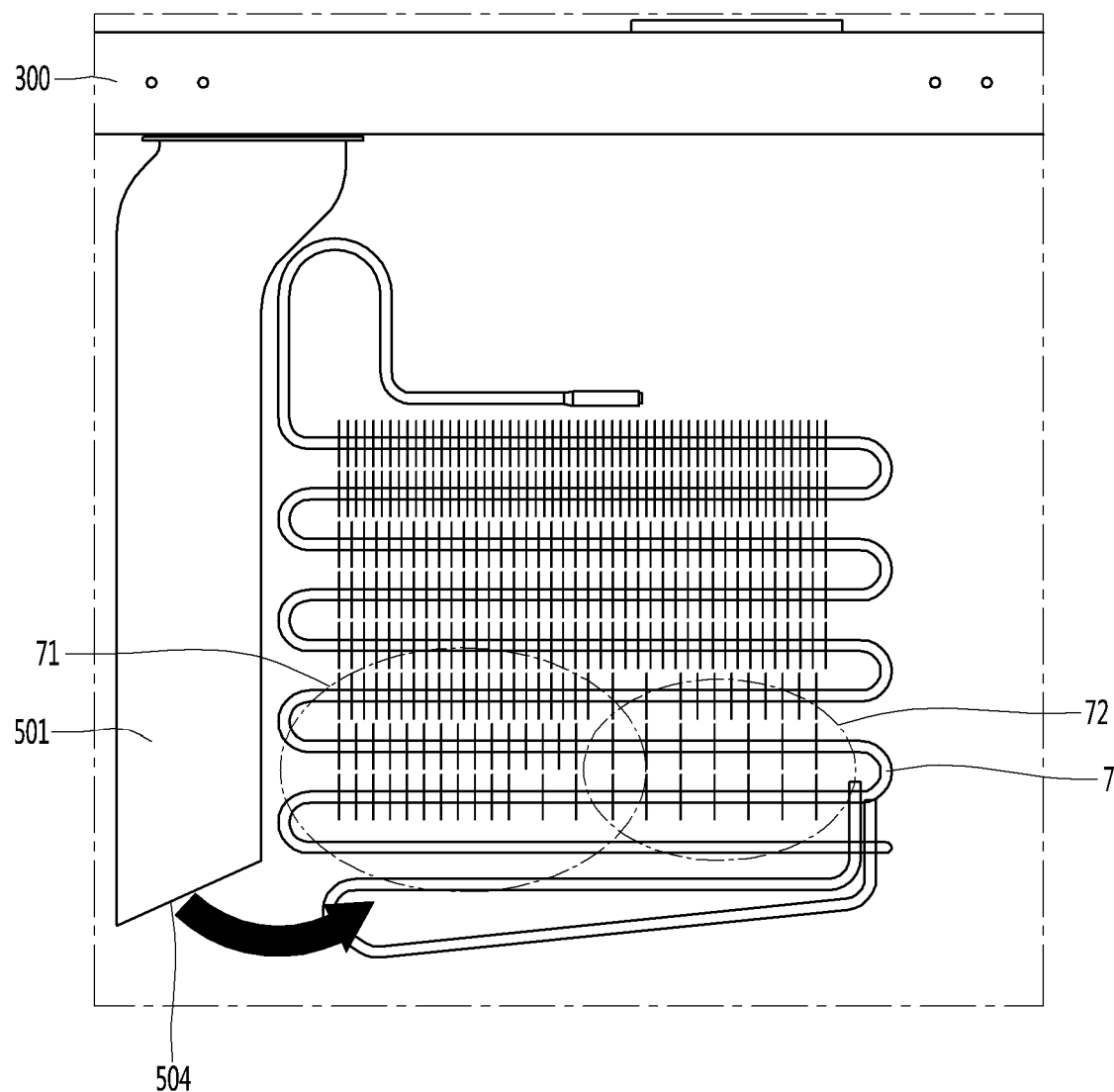
FIG. 35 is a front view illustrating the evaporator observed from the front in a state where a fan module and a freezing chamber flow path guide are removed.
Figure 36:
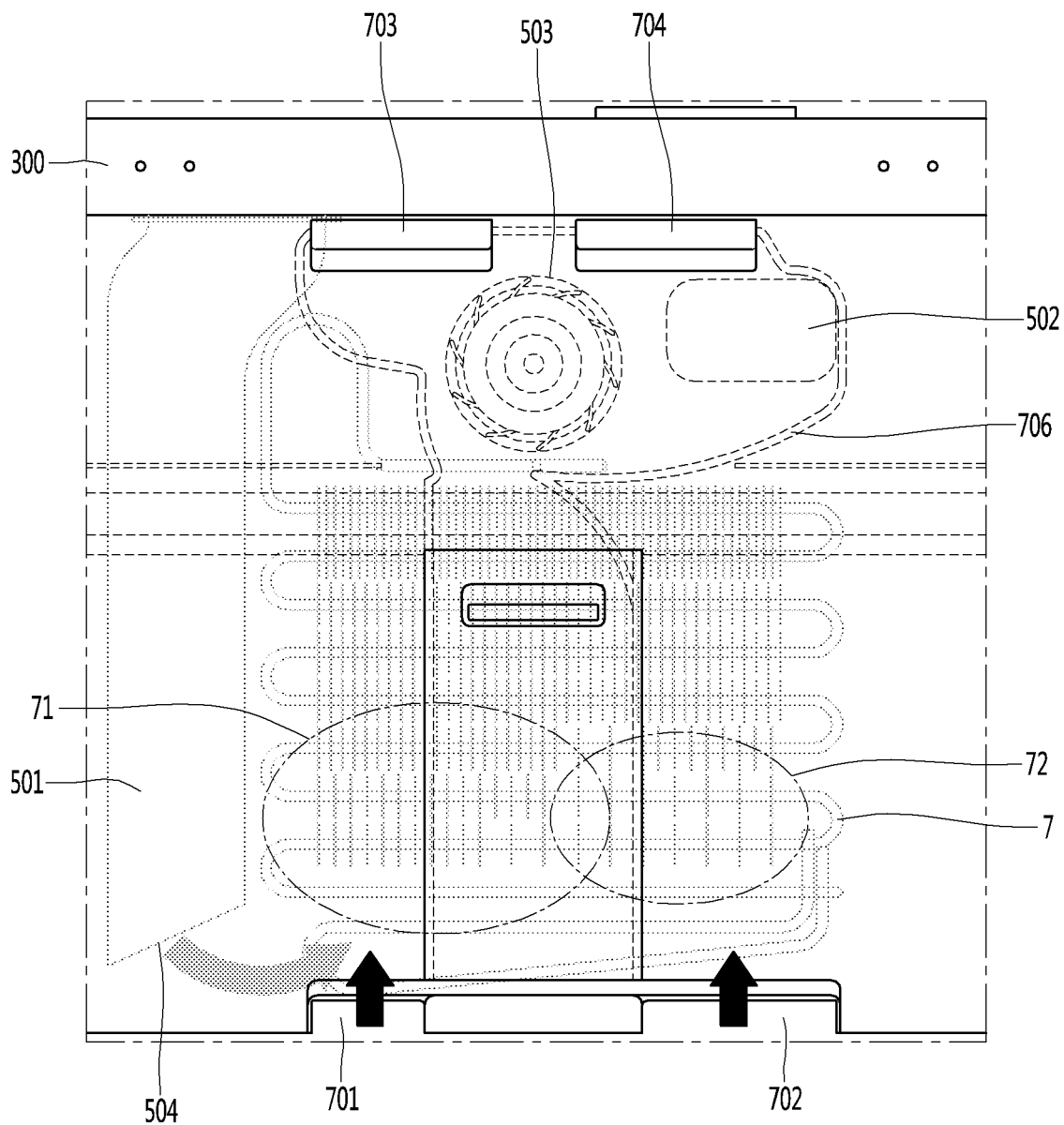
FIG. 36 is a front view illustrating the evaporator observed from the front in a state where the fan module and freezing chamber flow path guide are installed.

The circulation path of the refrigerant flowing through the refrigerating chamber R and the freezing chamber F around the evaporator 7 will be described in detail. FIG. 35 is a front view illustrating the evaporator 7 observed from the front in a state where the fan module 503 and a freezing chamber flow path guide 700 are removed. FIG. 36 is a front view illustrating the evaporator 7 observed from the front in a state where the fan module 503 and the freezing chamber flow path guide 700 are installed.

Referring to FIG. 35, the cool air collecting pipe 501 may be placed on the left side of the evaporator 7. In other words, the evaporator 7 and the cool air collecting pipe 501 may be arranged in a line. More specifically, the cool air collecting pipe 501 may be aligned with the extending direction of the refrigerant pipe provided in the evaporator 7. Accordingly, the evaporator 7 can be brought into close contact with the inner surface of the rear wall of the vacuum adiabatic body as much as possible, and the space inside the refrigerator 1 may be wider than expected.

A collecting pipe discharge port 504 is provided at the end of the cool air collecting pipe 501 and is cut to be inclined in a direction toward the evaporator 7. Therefore, the air discharged from the cool air collecting pipe 501 can be well guided to the evaporator 7 side.

A refrigerant pipe and a fin are installed on the evaporator 7. The fin may be tightly installed on the side close to the cool air collecting pipe 501 to provide a fin dense area 71 and a fin loose area 72 can be provided on the side far from the cool air collecting pipe 501. Accordingly, more heat exchange action can be performed on the air collected in the refrigerating chamber R relatively hotter than the air collected in the freezing chamber F. More specifically, it is possible to increase the heat exchange efficiency of the evaporator 7 by making the collected air from the relatively hot refrigerating chamber R be more guided to the fin dense area 71 in which the fins are dense. Such heat exchange efficiency increasing action can be further elevated because the cool air collecting pipes 501 are aligned in a line on the left side of the evaporator 7.

Referring to FIG. 36, freezing chamber suction ports 701 and 702 are provided on the lower left and right sides of the freezing chamber flow path guide 700, respectively. Freezing chamber discharge ports 703 and 704 are provided on the upper left and right sides of the freezing chamber flow path guide 700, respectively. One freezing chamber discharge port 705 is also provided at the center part of the freezing chamber flow path guide 700.

The freezing chamber flow path guide 700 is provided with a plate-like structure for guiding the air flow path so that the relative air sucked in the freezing chamber F and the refrigerating chamber R can be prevented from flowing backward. For example, ribs 706 provided in the freezing chamber flow path guide 700 may be configured such that the air that has passed through the evaporator 7 and the fan module 503 guides to the freezing chamber discharge ports 703, 704, and 705 and the cool air discharge pipe 502 and prevented from flowing back to the evaporator side.

The first freezing chamber suction port 701 and the second freezing chamber suction port 702 may be provided asymmetrically. The first freezing chamber suction port 701 is positioned on the side closer to the cool air collecting pipe 501 and the second freezing chamber suction port 702 is positioned on the far side from the cool air collecting pipe 501. In this case, the area of the first freezing chamber suction port 701 may be provided to be smaller than the area of the second freezing chamber suction port 702. Here, the area is proportional to the suction amount and may be inversely proportional to the flow path resistance. According to this configuration, the heat exchange efficiency of the fin dense zone 71 can be further increased.

The air passing through the evaporator 7 passes through the fan module 503, is discharged, and then divided into several parts.

First, cool air can be discharged through the freezing chamber discharge ports 703 and 704 on the upper left and right sides of the freezing chamber flow path guide 700, respectively. Also, the cool air is also discharged through the freezing chamber discharge port 705 provided at the center part of the freezing chamber flow path guide 700. Accordingly, it is possible to reliably perform the cooling operation for the entire area of the freezing chamber F. Meanwhile, any cool air discharged from the fan module 503 may be guided to the cool air discharge pipe 502 and flow out to the refrigerating chamber R.

Figure 37:
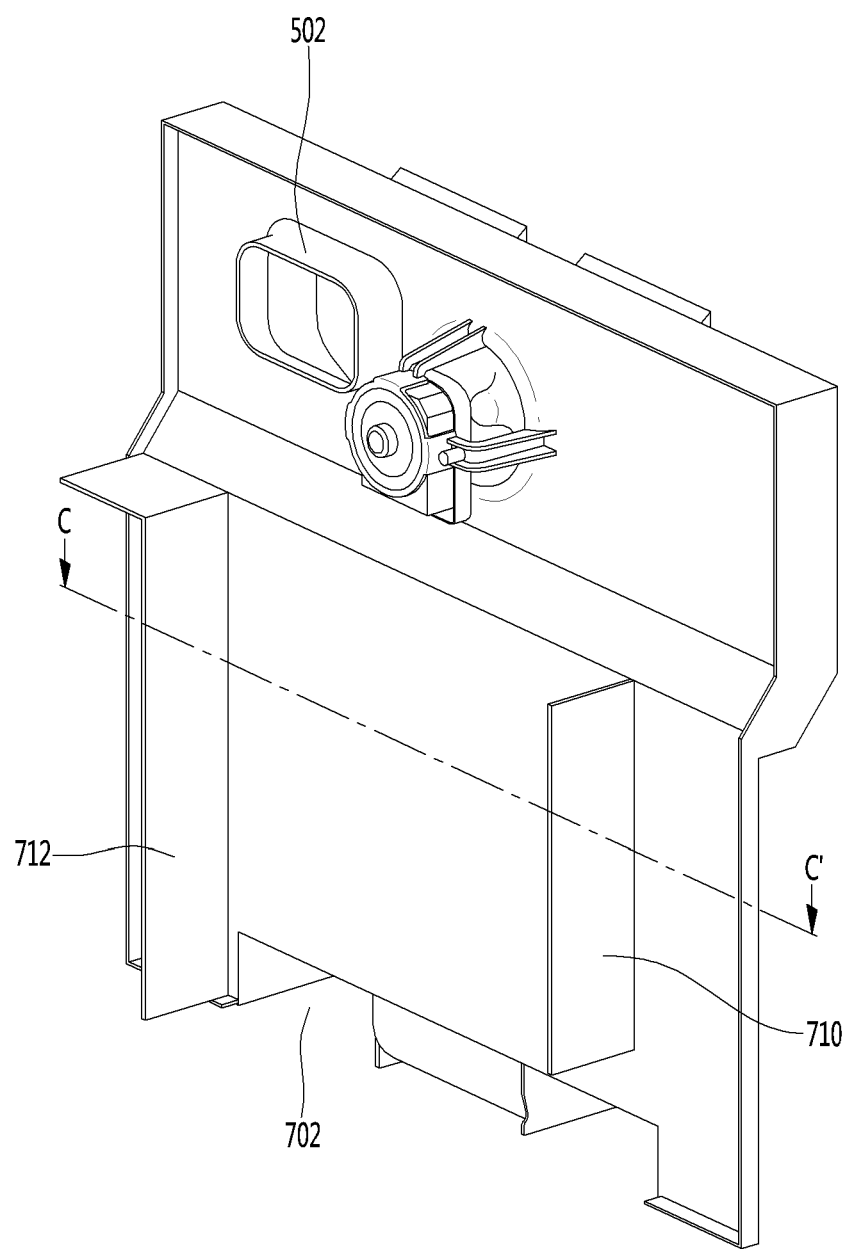
FIG. 37 is a view illustrating peripheral parts of the evaporator observed from the rear.
Figure 38:
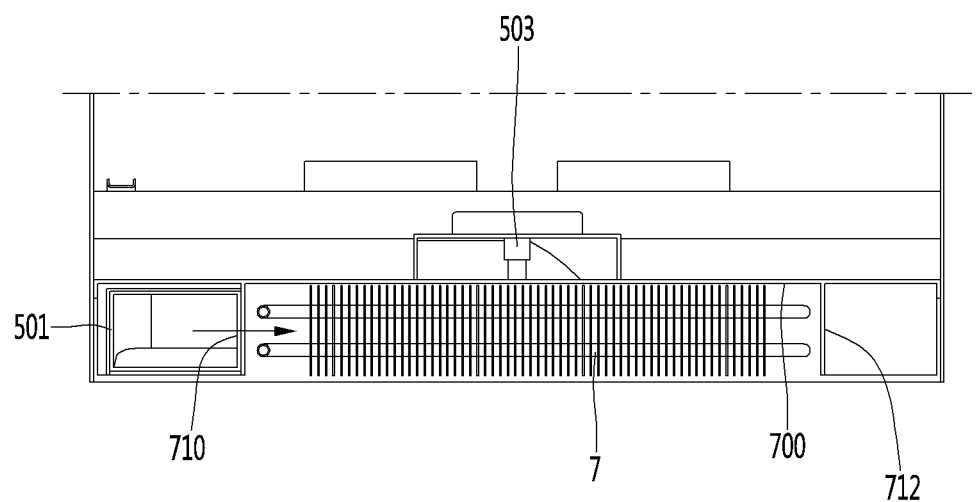
FIG. 38 is a sectional view taken along line C-C' in FIG. 37.

FIG. 37 is a view illustrating peripheral parts of the evaporator observed from the rear, and FIG. 38 is a sectional view taken along line C-C' of FIG. 37.

Referring to FIGS. 37 and 38, a first suction-side division wall 710 is provided between the cool air collecting pipe 501 and one side of the evaporator 7 and a second suction-side division wall 712 is provided on the other side of the evaporator 7. The suction-side division walls 710 and 712 prevent the air on the discharge side of the fan module 503 from being bypassed to the air flowing into the evaporator side. The suction-side division walls 710 and 712 may be provided as plate-like members provided in the freezing chamber flow path guide 700.

The second suction-side division wall 712 extends more downward to be longer than the first suction-side division wall 710. Accordingly, the air that can be bypassed, that is, the air passing through the evaporator 7, can be more accurately blocked from being re-absorbed to the evaporator side. The second suction-side division wall 712 and the first suction-side division wall 710 are provided on both left and right sides of the evaporator 7, respectively and thus the space inside the refrigerator 1 can be provided larger.

Figure 39:
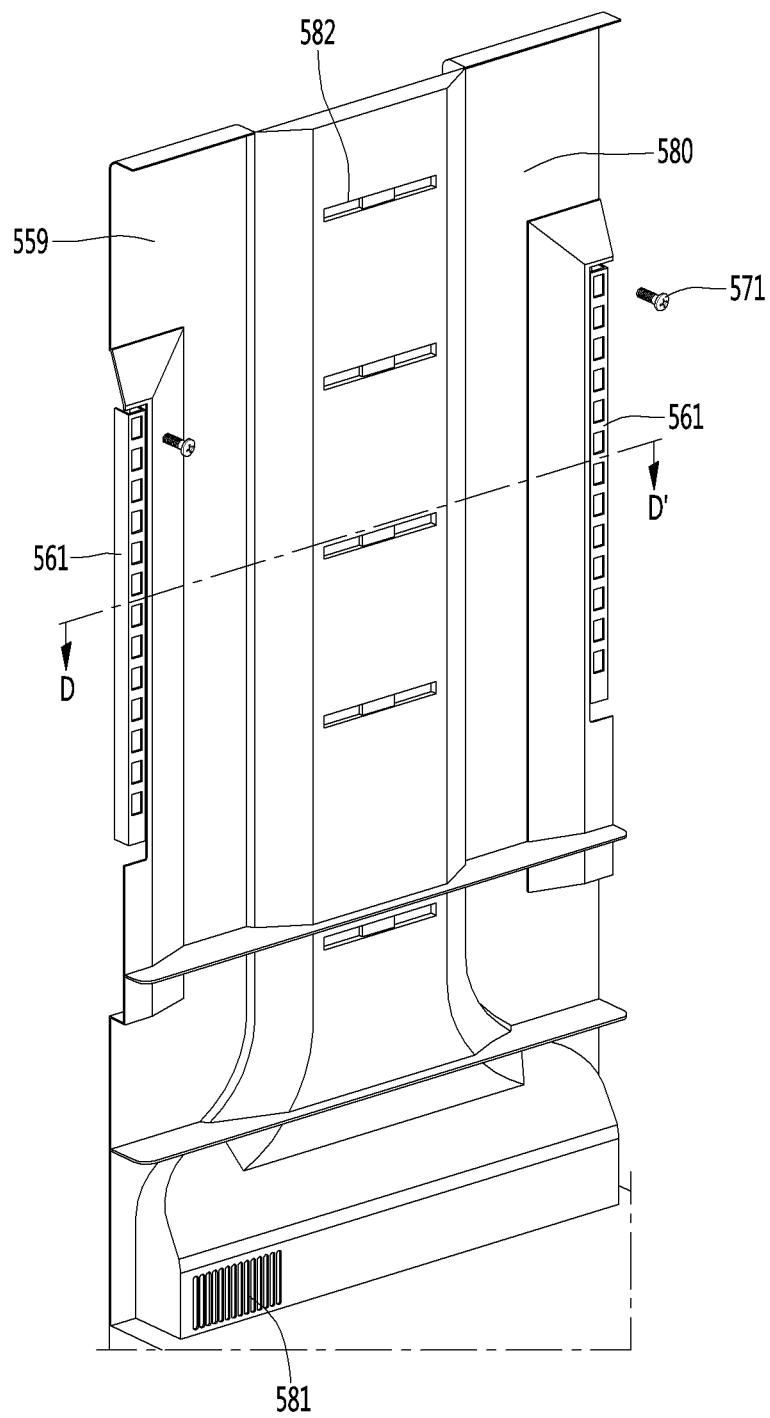
FIG. 39 is a perspective view illustrating a refrigerating chamber flow path guide.

FIG. 39 is a perspective view illustrating the refrigerating chamber flow path guide 550. Referring to FIG. 39, the refrigerating chamber flow path guide 550 includes a refrigerating chamber flow path cover 580 having a multi-duct (see 590 in FIG. 41) therein. Shelf racks 561 may be exposed to the outside of the left and right ends of the refrigerating chamber flow path cover 580.

The shelf rack 561 can be fastened to the first plate member 10 by a separate fastening member or by a welding method or the like. As an alternative, the shelf rack 561 can be fastened to the first plate member 10 together with the refrigerating chamber flow path cover 580 by another fastening member or screw 571. In this case, the first plate member 10 is provided with a fastening aid tool such as a boss, and the fastening member 571 supports the refrigerating chamber flow path cover 580 and the self rack 561 together to fasten to the fastening aid tool.

The refrigerating chamber flow path cover 571 may be provided with a refrigerating chamber suction port 581 and a refrigerating chamber discharge port 582. The refrigerating chamber suction port 581 may be aligned with the cool air collecting flow path 312 of the mullion 300. The refrigerating chamber discharge port 582 may communicate with the cool air supply flow path 311 of the mullion 300. A plurality of the refrigerating chamber outlet ports 582 are spaced vertically from the refrigerating chamber flow path cover 580 to cool the entire space of the refrigerating chamber R in various ways depending on the purpose. It is preferable that the refrigerating chamber discharge port 582 is provided from the left and right to substantially the center part of the refrigerating chamber R so that the refrigerating chamber R is entirely cooled.

Figure 40:
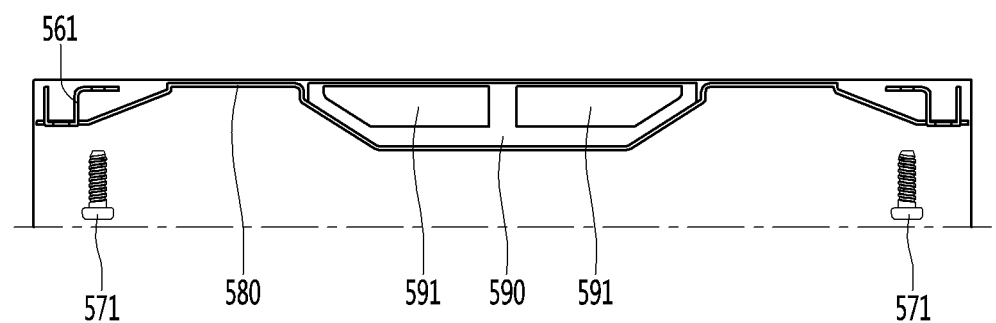
FIG. 40 is a sectional view taken along line D-D' in FIG. 39.

FIG. 40 is a sectional view taken along line D-D' in FIG. 39. Referring to FIG. 40, a multi-duct 590 having multi-channels 591 is provided inside the center part of the refrigerating chamber flow path cover 571, and the multi-duct 590 is provided at a substantially central portion when the left and right sides of the refrigerating chamber R are entirely observed. Accordingly, the discharged cool air can be uniformly distributed over the entire area of the refrigerating chamber R. The fastening member 571 can fasten the refrigerating chamber flow path cover 580 and the self rack 561 together with the vacuum adiabatic body.

Figure 41:
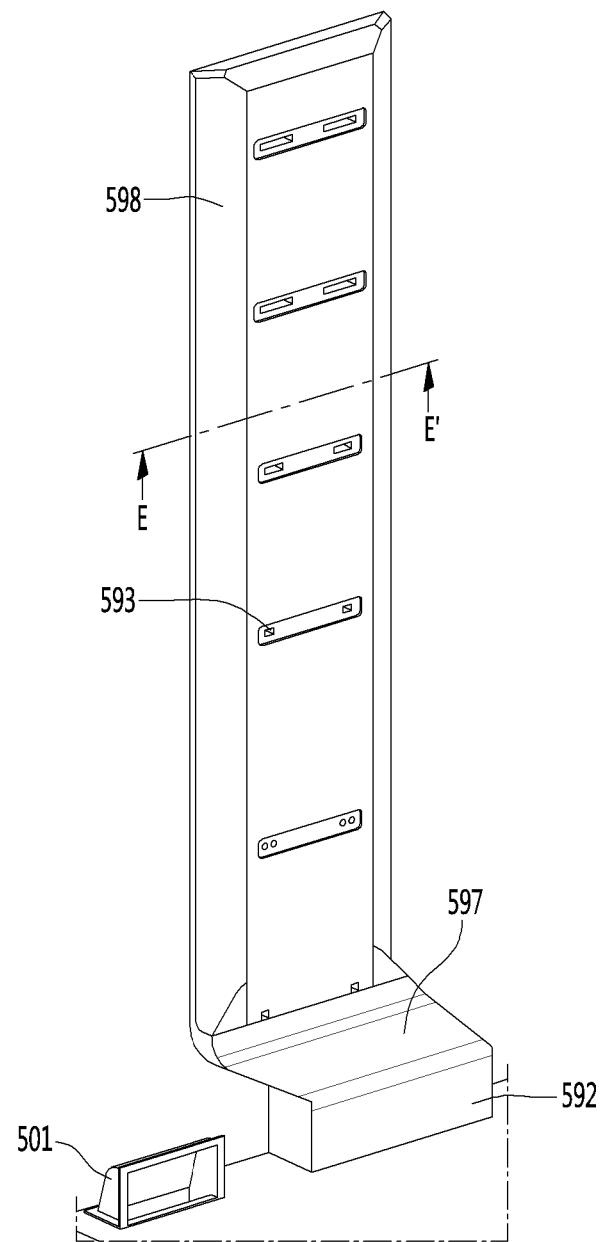
FIG. 41 is a rear perspective view illustrating a refrigerating chamber in a state where a refrigerating chamber flow path cover is removed.

FIG. 41 is a rear perspective view illustrating the refrigerating chamber R in a state where the refrigerating chamber flow path cover 581 is removed. Referring to FIG. 41, the multi-duct 590 is made of an adiabatic material, in which resin is foamed, to prevent dew formation. The multi-duct 590 has a lower bent portion 597 and an extended part or extension 598 extending upward from the bent portion 597. A cool air inflow end 592 is provided at the lower end of the bent portion 597 to allow cool air to flow. The cool air of the cool air supply flow path 311 may flow cool air into the inner part of the multi-duct 590 through the cool air inflow end 592.

The bent portion 597 allows the cool air supplied to the cool air supply flow path 311 to be deflected to either side with respect to the left and right of the refrigerating chamber R to move to the center part with respect to the left and right of the refrigerating chamber R. The extended portion 598 distributes cool air supplied from the bent portion 597 through the cool air discharge port 593 and discharges the cool air. The cool air discharge port 593 may be aligned with the refrigerating chamber discharge port 582 of the refrigerating chamber flow path cover 580.

The upper end part of the cool air collecting pipe 501 illustrated in the lower left of the drawing may be aligned with the refrigerating chamber suction port 581 so that the air in the relatively hot refrigerating chamber R flowing from the refrigerating chamber R may be directed toward the evaporator 7.

Figure 42:
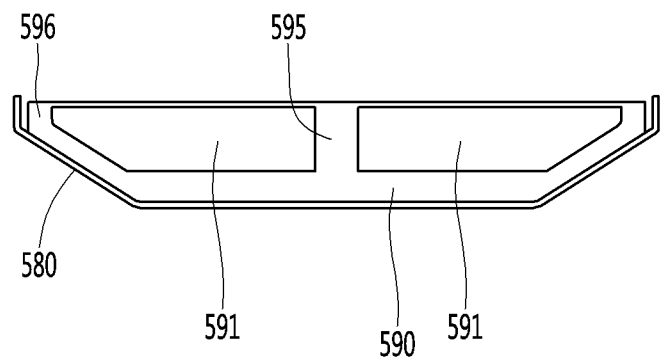
FIG. 42 is a sectional view taken along line E-E' in FIG. 41.

FIG. 42 is a sectional view taken along line E-E' in FIG. 41, and referring to FIG. 42, the multi-duct 590 may include a housing 596 having multi-channels 591 to which cool air is supplied. In the housing 596, at least two multi-channels 591 divided by a duct division wall 595 are provided in a state of being spaced apart from each other. The multi-channels 591 are spaced apart from each other in the left and right direction so that the cool air supplied into the refrigerating chamber R can be smoothly spread over the entire refrigerating chamber R when viewed in the left-right direction.

Figure 43:
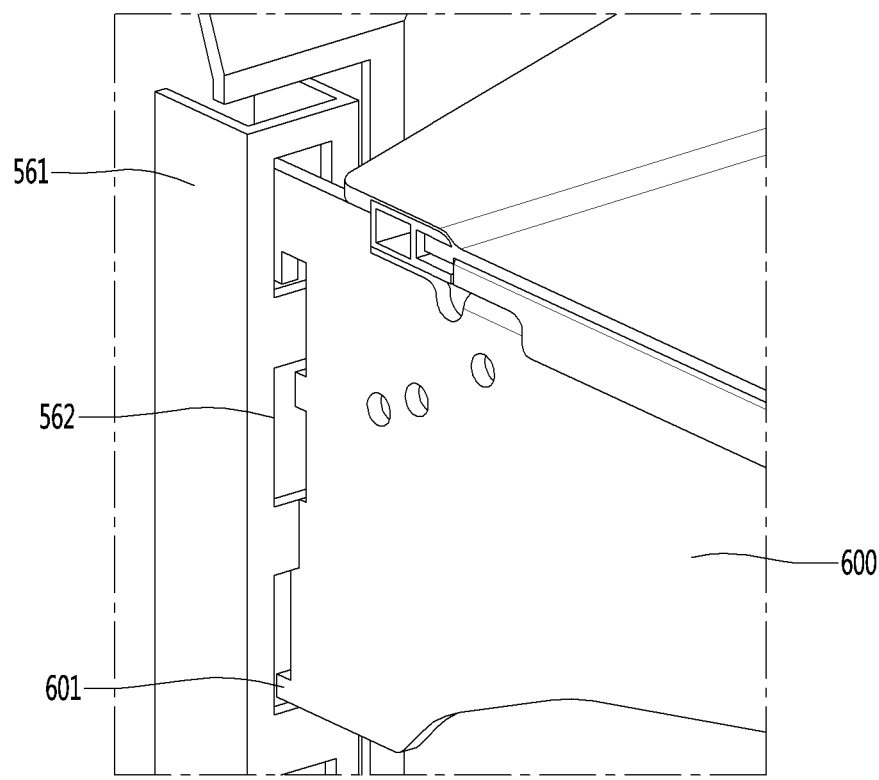
FIG. 43 is a view for explaining the support operation of the shelf.

FIG. 43 is a view for explaining the support operation of the shelf and referring to FIG. 43, the shelf rack 561 may be provided with shelf support holes or openings 562 spaced apart from each other in the up and down direction. A shelf rack end or protrusion 601 at the rear end of the shelf 600 may be inserted into the self support hole 562 to support the weight of the shelf 600.

In order to allow the weight of the shelf 600 to be supported by the shelf rack 561, the shelf rack 561 must be firmly supported on the inner surface of the vacuum adiabatic body. To this end, the number of fastening members 571 to fasten the shelf rack 561 to the first plate member 10 may be increased.

According to the embodiment, a large amount of cool air is concentratedly supplied through the cool air discharge port 593. A large amount of cool air rapidly cools the cool air adjacent to the cool air discharge port 593, but cannot smoothly cool the cool air which is far from the cool air discharge port 593. In addition, when the cool air discharge port 593 is blocked by products stored inside the refrigerator 1, the stored products inside the refrigerator 1 may be overcooled, and the other adjacent stored products inside the refrigerator 1 may not be sufficiently cooled. Particularly, there is a fear that cool air may not reach the stored product inside the refrigerator 1 which is far from the cool air discharge port 593, for example, the stored product inside the refrigerator 1 which is stored in the door 3, at all.

Under the background described above, the inventors of the present invention have focused on the fact that a metal material constituting the vacuum adiabatic body has a high thermal conductivity to lead to the following embodiments. In the following embodiments, portions which are already described are applied to portions which are not directly explained as they are, and the description of FIG. 36, for example, the configuration related to the cool air discharge pipe 502 is also applied to the following embodiments. FIG. 44 to FIG. 48 are views illustrating embodiments with respect to this.

Figure 44:
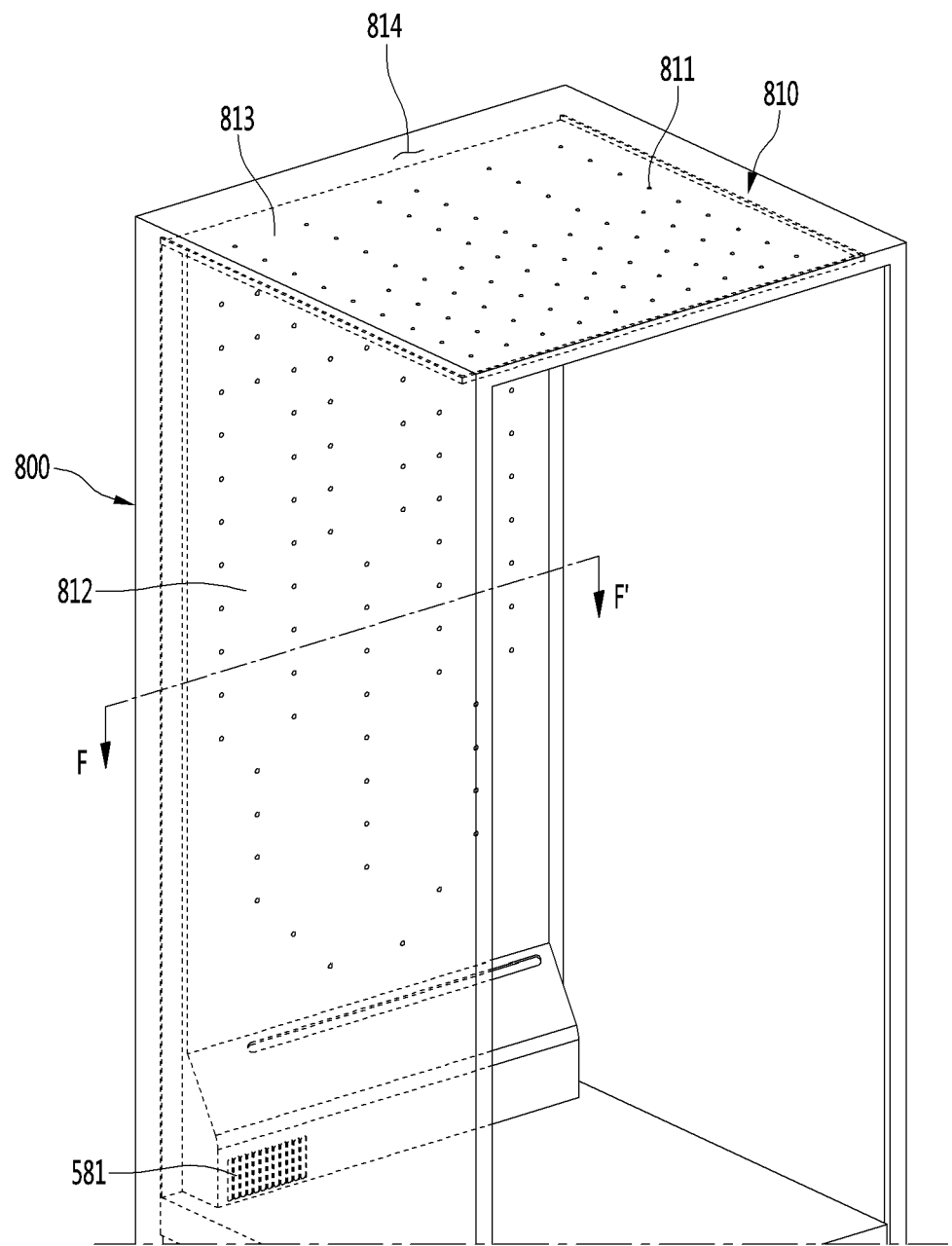
FIG. 44 is a perspective view illustrating a refrigerator according to an embodiment.

FIG. 44 is a perspective view of a refrigerator according to an embodiment. In this drawing, the vacuum adiabatic body is indicated by a virtual or dotted line so that the internal configuration is made more visible, and the door 3 is in a state of being removed.

Referring to FIG. 44, the refrigerator 1 is provided with a perforation plate 810 on the inner surface of a main body-side vacuum adiabatic body 800. A plurality of small cool air supply holes 811 are provided in the perforation plate 810 so that a small amount of cool air is supplied through the plurality of cool air supply holes 811. The cool air supply hole 811 may be provided substantially on the entire surface of the perforation plate 810 except for an engineering element for fastening or the like. The perforation plate 810 includes an upper perforation plate 813 and a rear perforation plate 812, and the perforation plate 810 may be provided substantially entirely on the rear surface and the upper surface of the main body-side vacuum adiabatic body 800. As a result, cool air can be supplied to the inside of the refrigerator through all the rear surface of the refrigerator 1 and the upper surface of the refrigerator 1.

The perforation plate 810 may define an accommodation space in which the perforation plate 810 can be in contact with a product within the refrigerating space of the refrigerator 1.

A gap or cool air supply gap part 814 between the perforation plate 810 and the first plate member 10 may form a flowing space for the cool air to be supplied through the cool air discharge pipe 502. The refrigerant supplied into the refrigerator 1 through the perforation plate 810 may be recovered through the refrigerating chamber suction port 581 and guided to the evaporator side.

The perforation plate 810 may be made of a resin having an adiabatic property, for example, expandable polystyrene (EPS). According to this, it is possible to prevent overcooling of a stored product which is in contact with the perforation plate 810.

In this embodiment, the cool air supplied through the cool air discharge pipe 502 flows into the cool air supply gap part 814 at the gap between the perforation plate 810 and the first plate member 10 and can be in direct contact with both surfaces of the perforation plate 810 and the first plate member 10. The entire cool air supply gap part 814 may be one space such that all areas of the cool air supply gap part 814 are connected to each other so that the entire cool air can flow through the cool air supply gap part 814.

The cool air supply gap part 814 may be defined as a gap between the perforation plate 810 and the first plate member 10. Here, the first plate member 10 may be surface-treated for the purpose of preventing dew formation, or the like, but, in order to directly receive the influence of the cool air, the first plate member 10 can alternatively be in direct contact with the cool air without any surface treatment so as to receive cool air from the cool air which is supplied from the outside. The first plate member 10 is made of metal, for example, stainless steel, and has a high thermal conductivity coefficient. Therefore, the cool air transferred to the first plate member 10 in the portion adjacent to the cool air discharge pipe 502 can be quickly transferred through the conduction action of the first plate member 10. Table 1 is a chart comparing thermal conductivity coefficients.

TABLE 1

| Material | Thermal conductivity coefficient (W/mK) |
| --- | --- |
| Acrylonitrile butadiene styrene (ABS) resin | 0.17 |
| Expandable Polystyrene (EPS) resin | 0.038 |
| Stainless Steel Grade 430 (SUS430) | 26 |

As illustrated in Table 1, the first plate member 10 has a high thermal conductivity coefficient. Accordingly, the cool air transferred from the portion adjacent to the cool air discharge pipe 502 can quickly spread out to the entirety of the first plate member 10 by the heat conduction phenomenon. As a result, the first plate member 10 can retain substantially equal levels of cool air as a whole. The cool air held by each position of the first plate member 10 can be transferred to the air by a convection action with air passing through the cool air supply hole 811 closest to the first plate member 10. As a result, the cool air passing through each of the cool air supply holes 811 may contain more cool air.

The cooling air of the first plate member 10 may be also supplied into the refrigerator 1 by the heat radiation cooling through the cool air supply hole 811. The thermal radiation cooling action may also depend on the size of the cool air supply hole 811.

Since the cool air supply holes 811 are provided on substantially the entire surface of the perforation plate 810, the discharge of the cool air through the adjacent other cool air supply holes 811 can proceed without interruption even if any one portion of the cool air supply holes 811 is shielded. Therefore, there is no problem in supplying cool air to the stored product. In addition, the amount of cool air supplied to the shielded cool air supply holes 811 does not cause overcooling of the corresponding stored product because the size of the cool air supply holes 811 is small.

Figure 45A:
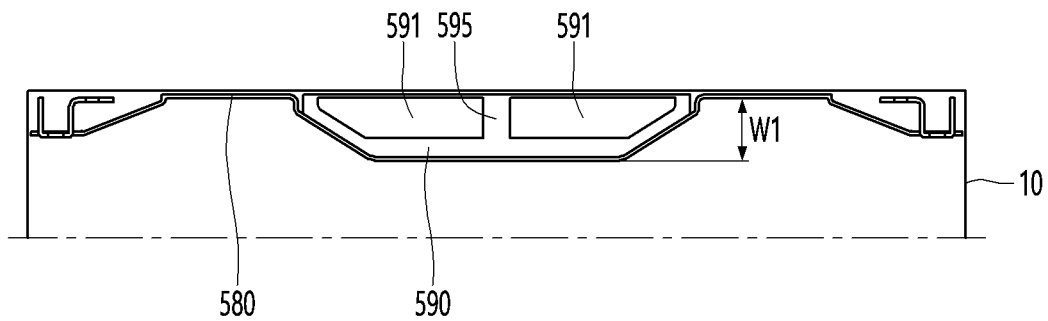
FIGS. 45A-45B are views for explaining the cool air supply gap part, wherein FIG. 45 (*a*) is a sectional view in which a multi-duct is provided as in FIG. 40, and FIG. 45 (*b*) is a sectional view taken along line F-F' in FIG. 44.
Figure 45B:
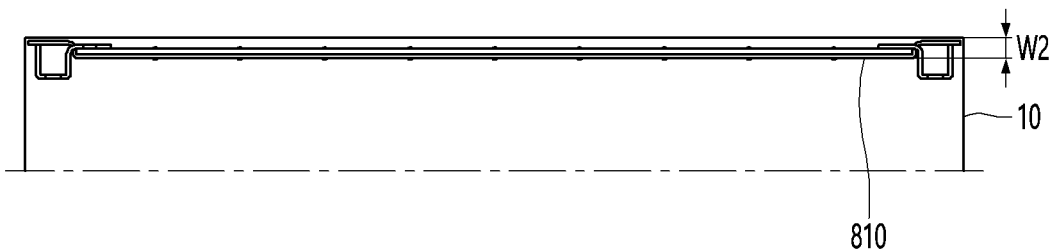

FIG. 45 shows views for explaining the cool air supply gap part 814 and is described in comparison with a case where a multi-duct 590 is provided. FIG. 45 (a) illustrates a case where a multi-duct 590 is provided as in the case of FIG. 40, and FIG. 45 (b) is a sectional view taken along line F-F' of FIG. 44.

Referring to FIG. 45, a width W2 of the cool air supply gap part 814 may be defined as a gap part or distance between the first plate member 10 and the perforation plate 810. The width W2 of the cool air supply gap part 814 is provided as W2, and it can be seen that the width W2 of the cool air supply gap part 814 considerably decreases as compared with the portion W2 of the previous embodiment shown in FIG. 18. Accordingly, the space inside the refrigerator 1 in which the stored product is placed is not disturbed by the multi-duct 590, and the space in which the stored product is placed can be made substantially larger. For example, in a case where a stored product is provided as a right-angled type product, a wider space can be used as a storage space. A protruding distance or width of the multi-duct at its largest may be W1.

Figure 46:
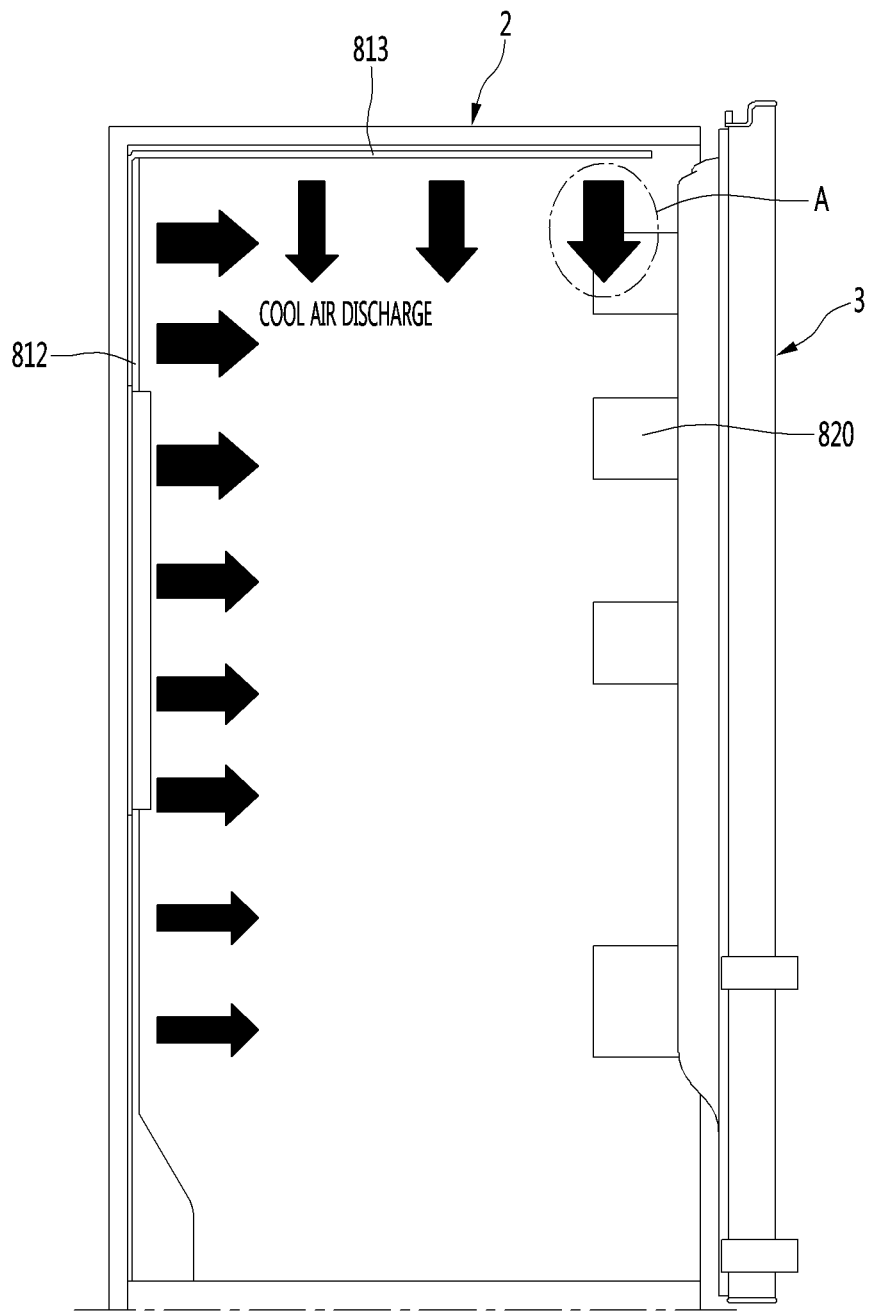
FIG. 46 is a side sectional view schematically illustrating a refrigerator showing the amount of cool air discharge in this embodiment.

FIG. 46 is a side sectional view schematically illustrating a refrigerator 1 showing the amount of cool air discharge in this embodiment. Referring to FIG. 46, a larger amount of cool air is discharged to the rear perforation plate 812 from the upper side than the lower side. According to this, since the upper cool air is moved forward and then faces downward, the inside of the refrigerator can be cooled as a whole. In particular, the stored product on the door side can be sufficiently cooled.

A larger amount of cool air is discharged to the upper perforation plate 813 from the front side than the rear side. A door-side cool air supply zone (A) expresses a state where a larger amount of cool air is discharged to the upper perforation plate 813 from the front side than the rear side. According to this, it is possible to supply sufficient cool air to a stored product accommodated in the front of the inside of the refrigerator 1 where the cool air supply is weak or accommodated in the door. For example, a basket 820 may be applicable to this, and a magic space or a door shelf may be included.

The supply of the cool air can be achieved by adjusting the size, disposition, number, or the like of the cool air supply holes 811. For example, it can be achieved by analyzing that the positive pressure of the cool air supplied from the cool air discharge pipe 502 is lost through the cool air supply hole 811 located upstream of the flow path. For example, in the entire air flow of the cool air supply gap part 814, the supply of the cool air can be achieved by reducing the size of the cool air supply holes 811 on the upstream side, increasing the gap between the cold air supply holes 811, or reducing the number of the cool air supply holes 811.

In the embodiment, only the rear surface and the upper surface inside the refrigerator 1 are illustrated, but a perforation plate may also be provided on the side surface inside the refrigerator 1. In addition, although the refrigerator 1 is exemplified, this configuration may be applied to the freezing chamber F. However, in a case of the freezing chamber F, since there is a fear that frost forming or the like can be generated in the freezing chamber F, it may be necessary to prevent the generation of frost forming or the like.

Figure 47:
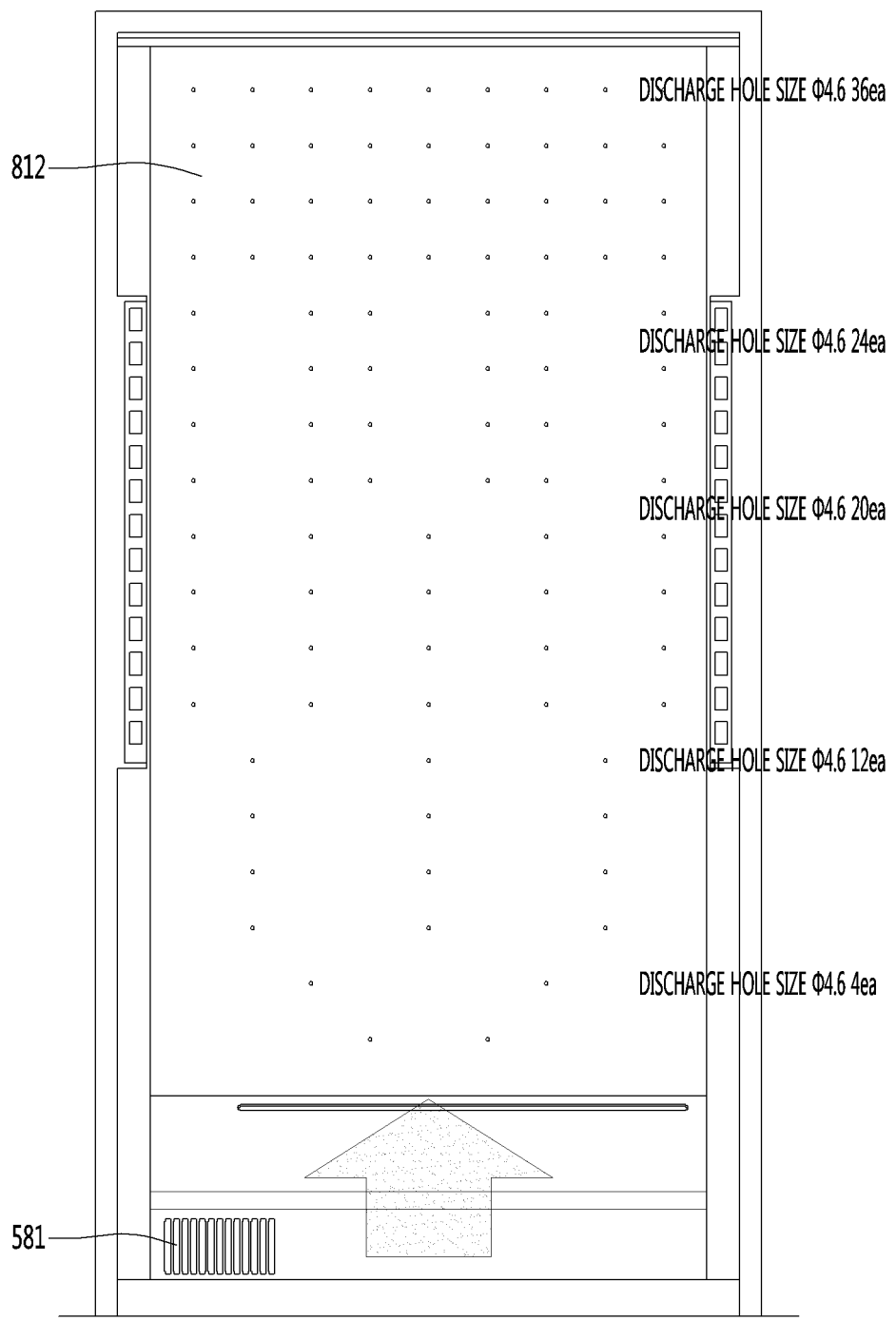
FIG. 47 and FIG. 48 are front views illustrating a refrigerator according to the embodiment to illustrate a method for distributing cool air.
Figure 48:
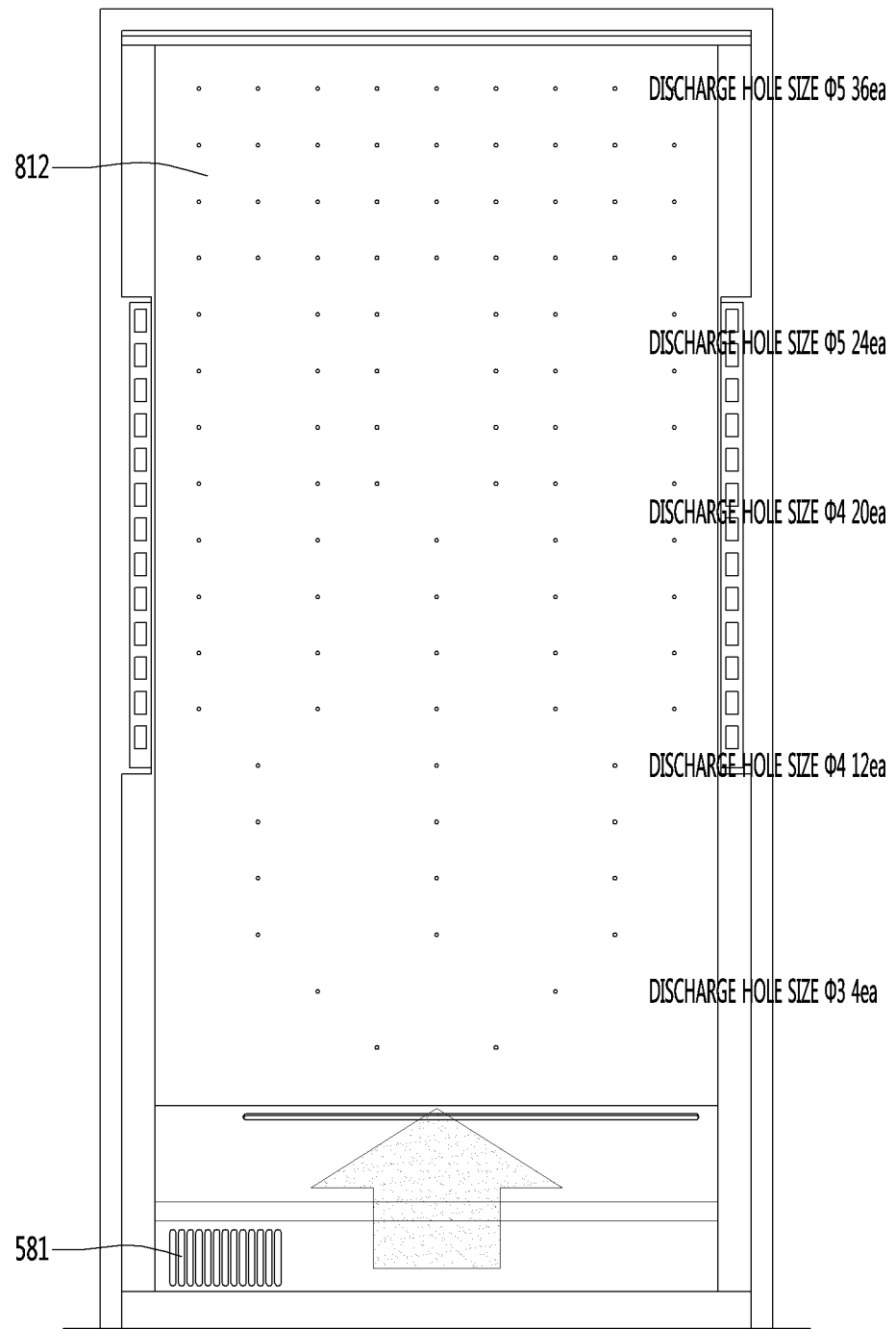

FIG. 47 and FIG. 48 are front views illustrating a refrigerator 1 according to an embodiment for explaining a method for distributing cool air. Referring to FIG. 47, when the refrigerant supplied from the cool air discharge pipe 502 is supplied upward, the sizes of the cool air supply holes 811 are equalized, and the number of the cool air supply holes 811 increases to adjust the desired supply amount of the cool air.

Referring to FIG. 48, FIG. 48 illustrates that when the refrigerant supplied from the cool air discharge pipe 502 is supplied upward, the desired supply amount of cool air can be adjusted by gradually increasing the size of the cool air supply hole 811 and being also increasing the number of the cool air supply hole 811.

The size of the cool air supply hole 811 is about 3 to 5 mm, and the supply area of each cool air supply hole is 7.065 square mm2 to 19.625 mm2, which are remarkably smaller than the other embodiments. Of course, this numerical range is not limited thereto.

Alternatively, the perforation plate 812 is not installed on the entire rear surface, the entire upper surface, and the entire side surface inside the refrigerator 1, but may be installed only one portion to secure a specific space. In this case, a rapid cooling area for the corresponding area may be provided.

FIG. 49 to FIG. 54 illustrate various embodiments of a refrigerator using a single vacuum adiabatic body and separating the internal space of the vacuum 1 adiabatic body with mullions or dividing walls 300.

The following description is a simplified illustration of a side view of the refrigerator, and thus may be different from the actual product. A vacuum adiabatic body is used for the main body 3 unless otherwise specified. In a case where the indicating line passes through the vacuum adiabatic body, it can be understood that the pipeline or the component line passes through the vacuum adiabatic body. In a case where the internal accommodation space of the vacuum adiabatic body is separated, a first door 3a, a second door 3b, and other doors for separating and opening and closing the respective accommodation spaces may be provided.

When passing through the vacuum adiabatic body, members such as a welded pipeline and a corrugated conductive resistance sheet 63 can be applied. It is preferable that a space in which the reinforcing member 100 and/or 110 is installed is avoided when passing through the vacuum adiabatic body. The welding pipeline and the corrugated conductive resistance sheet 63 may be subjected to a sealing action to the plate member 10 and/or 20 to maintain the sealing of the vacuum space portion. In a case where the indicating line passes through the inside of the vacuum adiabatic body, that is, the vacuum space portion, it can be understood that the pipeline and the component line pass through the inside of the vacuum adiabatic body. In the drawings, the mullions 300 are illustrated as vertically dividing the vacuum adiabatic body, but may be laterally dividing the vacuum adiabatic body without being limited thereto. The mullions 300 can thermally separate the accommodation spaces (like the refrigeration chamber R and the freezing chamber F) from each other, which is filled with the adiabatic member and divided.

Figure 49:
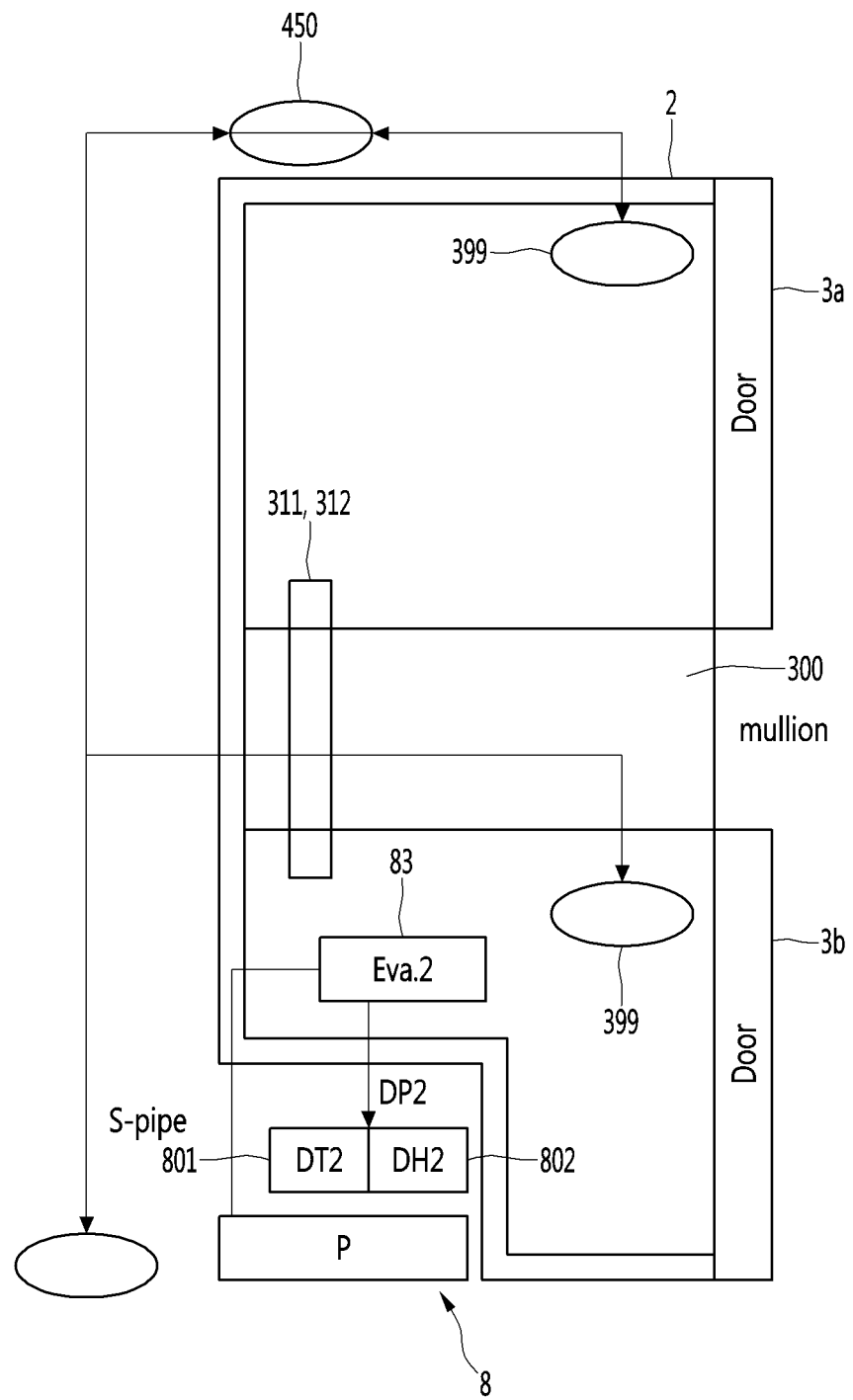
FIG. 49 to FIG. 54 are views schematically illustrating another embodiment of a refrigerator using a single vacuum adiabatic body and separating the internal space of the vacuum adiabatic body with mullions.

Referring to FIG. 49, as illustrated above, in the present embodiment, a cool air supply flow path 311 and a cool air collecting flow path 312 are provided in the mullion 300 so that the cool air in the freezer chamber F is supplied to the refrigerating chamber R. For the convenience of explanation, the supply path of the power, the supply path of the refrigerant and the cool air, and the discharge path of the defrost water are separately described.

First, the power supply path will be described. External power supplied from the second space is supplied to a controller 450 on the upper surface of the vacuum adiabatic body that is placed in the second space. The controller 450 supplies the necessary power to the various parts 399 necessary for the operation of the refrigerator 1. The part 399 may include a lamp and a sensor and is placed in the first space. In a case where the part 399 is a sensor, the controller 450 not only supplies power to the sensor but also receives the sensing signal of the sensor to utilize the signal to control the refrigerator 1. It will be naturally understood that the part 399 also includes a compressor P which forms a refrigeration cycle.

In order to supply power to the first space from the second space via the controller 450, power may pass through the third space as illustrated or may pass through the gap part between the door 3a and/or 3b and the main body 2. The power supply line can extend through the mullion 300 to supply power to the part 399 placed in the freezing chamber F or to a component adjacent to the mullion 300.

The supply path of the refrigerant and cool air will be described. First, cool air is described. It is possible to provide cool air by the integral evaporator 83 ("Eva.2" in FIG. 49) placed in the main body 2, that is, the lower freezing chamber F of the first space and the cool air can be first supplied to the inside of the freezing chamber F.

The cool air of the integral evaporator 83 can be supplied to the refrigerating chamber R and circulated through the cool air flow paths 311 and 312 provided in the mullion 300 and other cool air communication structures.

The refrigerant supply to the evaporators 81 and 82 (FIG. 52) will be described. The refrigerant can be provided to each evaporator 81 and 82 placed in the first space in a state before the evaporation by the member including the compressor P placed in the machine chamber 8 provided in the second space. The refrigerant pipeline may have a flow path placed in the first space and a flow path placed in the second space, respectively. It is preferable for heat exchange between the inlet and outlet of the integral evaporator 83 to improve the efficiency of the refrigeration cycle.

Figure 54:
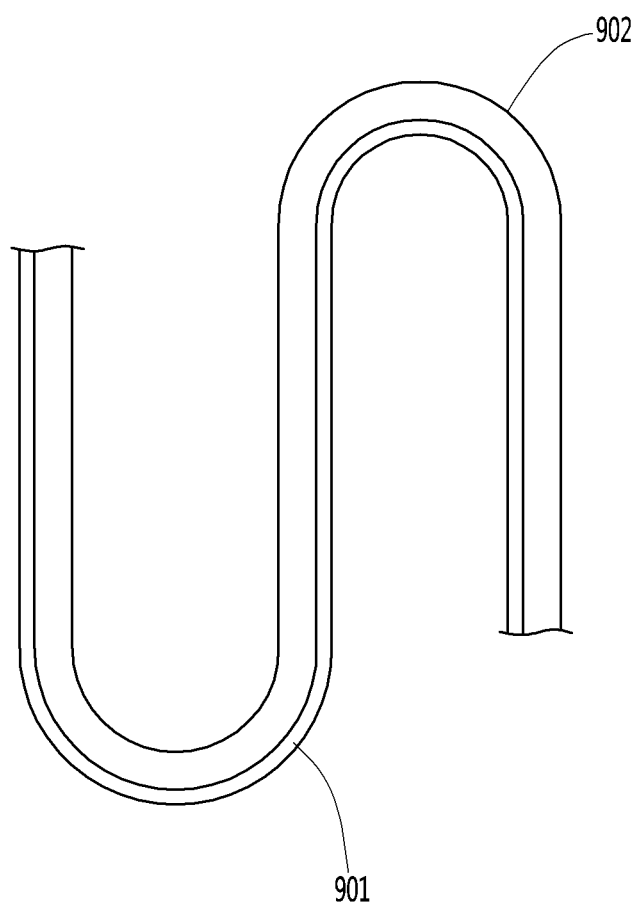

Referring to FIG. 54, it can be seen that the two pipelines of the first refrigerant pipe 901 and the second refrigerant pipe 902 approach each other and heat exchange occurs between the two pipelines of the first refrigerant pipe 901 and the second refrigerant pipe 902. The first refrigerant pipe 901 may extend from the expander inside the machine chamber 8 and the second refrigerant pipe 902 may be a pipeline which extends from the integral evaporator 83. The heat exchange pipelines formed by the contact of the two refrigerant pipes 901 and 902 are provided in a curved shape in order to secure a sufficient heat exchange length in a narrow space, so the heat exchange pipelines can be referred to as heat exchange curved pipes or S-pipes.

Referring again to FIG. 49, the S-pipe may be placed in the third space which is the vacuum space of the wall body of each main body, that is, the vacuum adiabatic body. Therefore, it is possible to prevent heat loss, and there is no need for a space for insulating the pipeline separately.

This is explained in more detail using time series. The refrigerant compressed/condensed/expanded in the machine chamber 8 and directed to the integral evaporator 83 perform heat exchange by the heat exchange curved pipe 901 and 902 inside the vacuum adiabatic body and supplied to the integral evaporator 83. The refrigerant evaporated in the integral evaporator 83 may perform heat exchange through the heat exchange curved pipe 901 and 902 while being discharged.

The heat exchange curved pipe 901 and 902 is described as passing through the vacuum space part 50. However, the present invention is not limited thereto, and may pass through the inner space of the mullion 300 in a case where the inner space of the vacuum space part 50 is insufficient. Since the mullion 300 is thermally insulated, it is possible to obtain the advantage that no separate adiabatic action is needed for the heat exchange curved pipe.

The discharging path of the defrost water will be described. The defrost water generated in the integral evaporator 83 placed in the first space is collected in a drain tray (DT2) 801 positioned in the machine chamber 8 which is placed in the second space through the third space 50 and is suitably vaporized by the drain heater (DH2) 802 to be capable of being removed.

Here, a drain pipe (also referred to as DP2) to connect the integral evaporator 83 and the drain tray (DT2) 801 may be used to penetrate the third space 50. The defrost water can pass through the drain pipe (DP2). The drain pipe (DP2) may pass through the welding pipeline and corrugated conductive resistance sheet 63. The drain pipe (DP2) is illustrated as passing through the bottom surface of the vacuum adiabatic body in the drawing, but may also be drawn out through the rear and side surfaces.

Although the drain pipe (DP2) has been described as passing through the bottom surface of the vacuum adiabatic body, the present invention is not limited thereto, and the drain pipe (DP2) may pass through the rear surface or the side surface of the vacuum adiabatic body. However, it may be desirable to pass through the bottom surface for rapid discharge.

Figure 50:
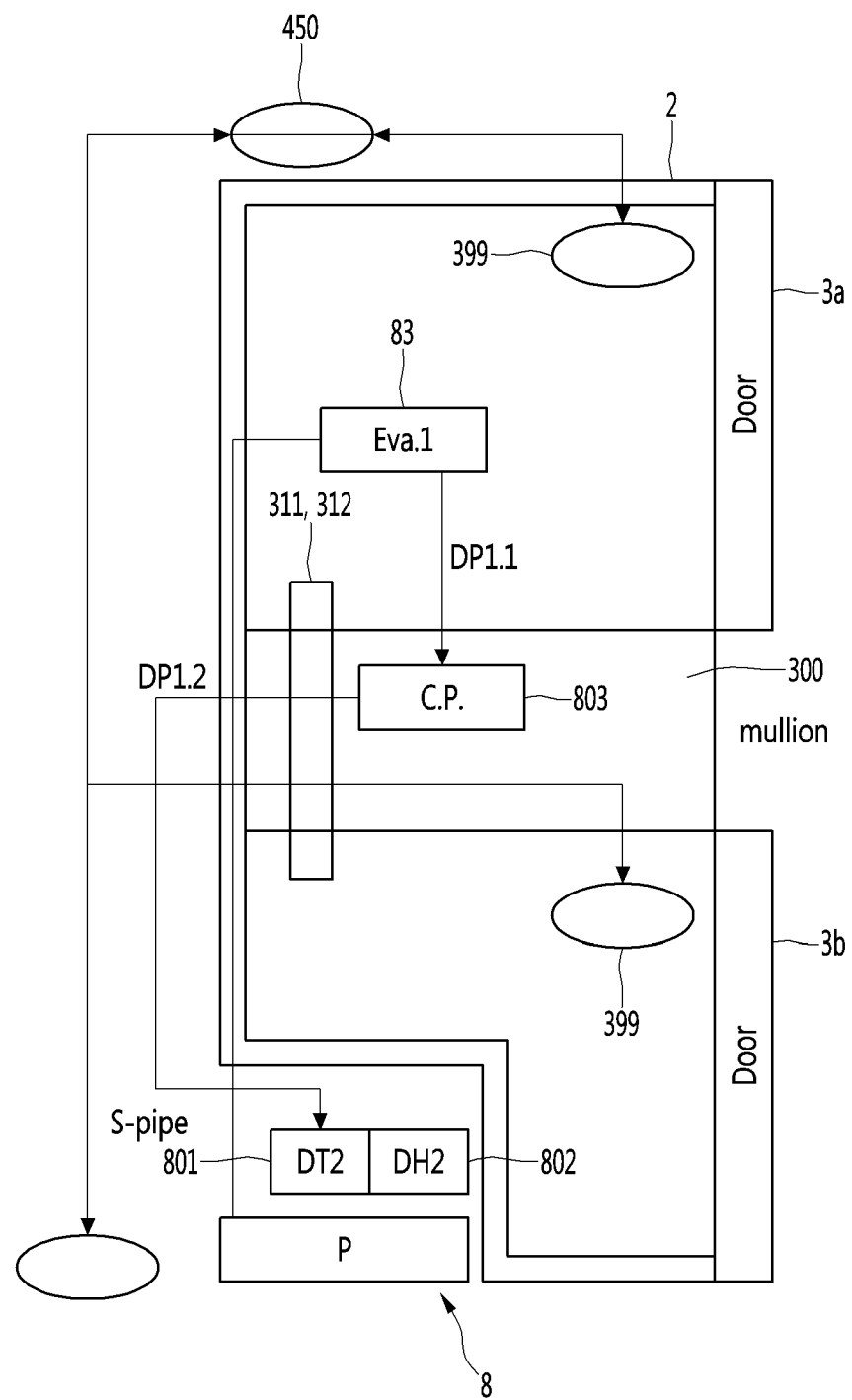

Referring to FIG. 50, this embodiment is different from the embodiment illustrated in FIG. 49 in the installation position of the integral heat exchanger 83 and the discharge path of the defrost water. Therefore, the explanation of FIG. 49 will be applied to another explanation, and the discharge path of the defrost water and the integral heat exchanger will be described.

The integral evaporator 83 may be positioned farther away from the machine chamber 8, that is, above among the spaces divided by the mullion 300. The defrost water generated in the integral evaporator 83 may be guided to the defrost water connection part 803 positioned inside the mullion 300. The defrost water connection part 803 can primarily collect the defrost water. The drain pipe or a first drain pipe DP1.1 connecting the integral evaporator 83 and a defrost water connection part (C.P.) 803 is placed inside the first space, so no separate sealing structure is required.

The defrost water in the defrost water connection part 803 is collected in the drain tray (DT2) 801 positioned inside the machine chamber 8 and can be appropriately vaporized and removed by the drain heater (DH2) 802.

At this time, the pipeline through which the defrost water connection part (C.P.) 803 and the drain tray (DT2) 801 are connected to each other can be guided along the outer surface of the second plate member 20 through the vacuum adiabatic body. The pipeline connecting the defrost water connection part (C.P.) 803 and the drain tray (DT2) 801 may pass through the vacuum adiabatic body and thus may be provided in a sealed structure by a welding pipeline and a corrugated pipe conductive resistance sheet 63 or the like.

In the present embodiment, the drain tray (DT2) 801 and the drain heater (DH2) 802 are provided inside the machine chamber 8. However, the present invention is not limited thereto, and a separate drain heater may be installed inside the mullion 300 to prevent the defrost water from being guided into the machine chamber 8.

In this case, it is expected that the number of pipelines passing through the vacuum adiabatic body is reduced, thereby improving the adiabatic efficiency of the vacuum adiabatic body. However, it may be necessary to provide a configuration for guiding the vaporized defrost water vapor to the outside through the front of the mullion 300. This embodiment can be preferably applied in a case of an integral evaporator (Eva.1) 83 in which the generation amount of the defrost water is small.

Figure 51:
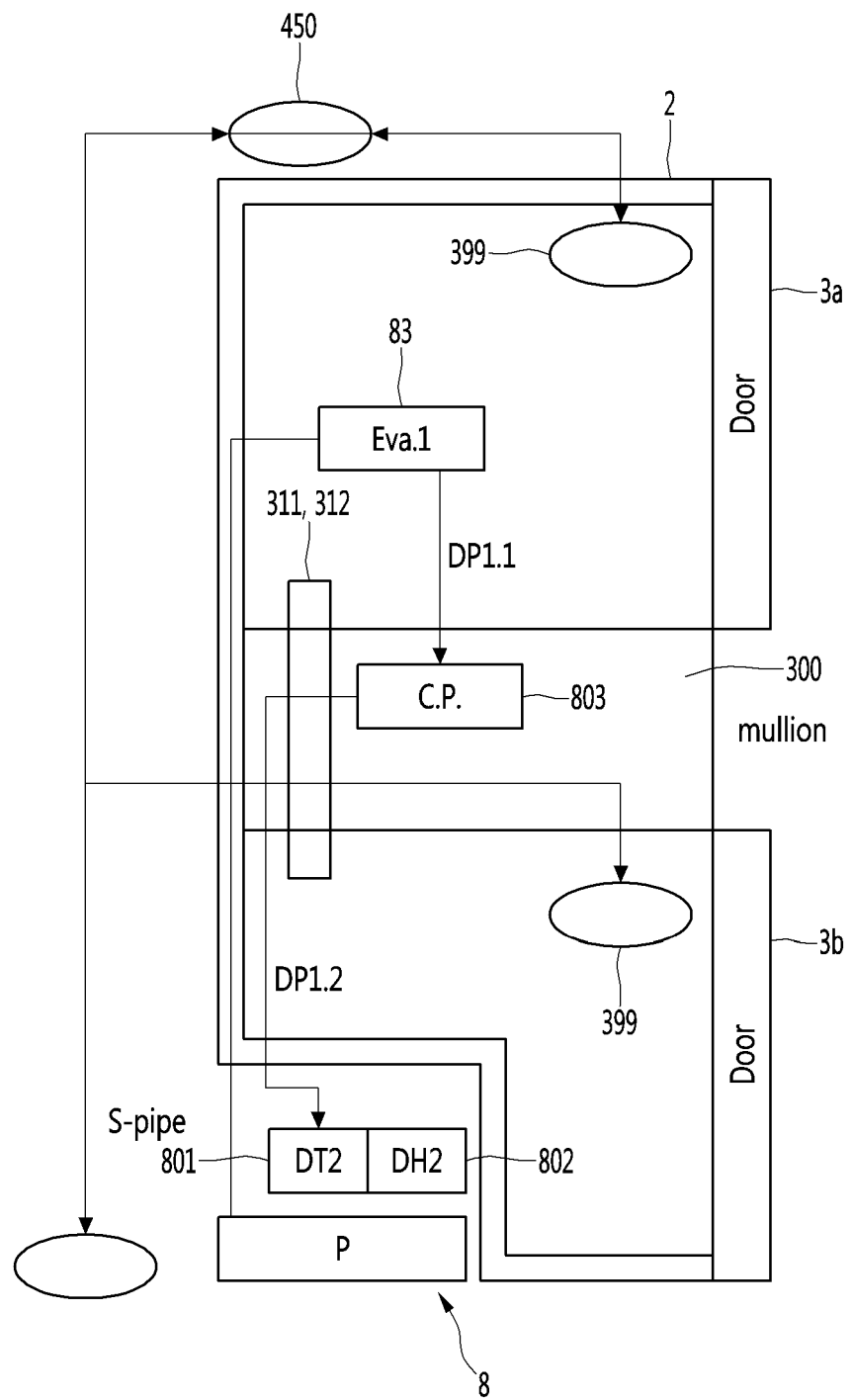

In a case of the present embodiment, an upper-freezing refrigerator or freezer can be applied. Referring to FIG. 51, this embodiment is characteristically different from the embodiment illustrated in FIG. 50, in that the discharging paths of the defrost water are different from each other. Therefore, another explanation will be made assuming that the description of FIG. 50 is applied as it is, and the discharge path of the defrost water will be described.

The defrost water generated in the integral evaporator 83 may be guided to the defrost water connection part (C.P.) 803 positioned inside the mullion 300. The defrost water connection part 803 can primarily collect the defrost water. The defrost water in the defrost water connection part 803 is collected in the drain tray (DT2) 801 positioned inside the machine chamber 8 and can be appropriately vaporized and removed by the drain heater (DH2) 802.

The pipeline connecting the defrost water connection part 803 and the drain tray 801 may be guided to the machine chamber 8 through the bottom surface of the vacuum adiabatic body. The conduit connecting the defrost water connection part 803 and the drain tray 801 may pass through the vacuum adiabatic body and thus may be provided in a sealed structure by a welding pipeline and a corrugated pipe conductive resistance sheet.

In a case of the present embodiment, it can be applied when it is not easy to provide a separate pipeline on the outer wall part of the vacuum adiabatic body in a case of the upper-freezing refrigerator.

Figure 52:
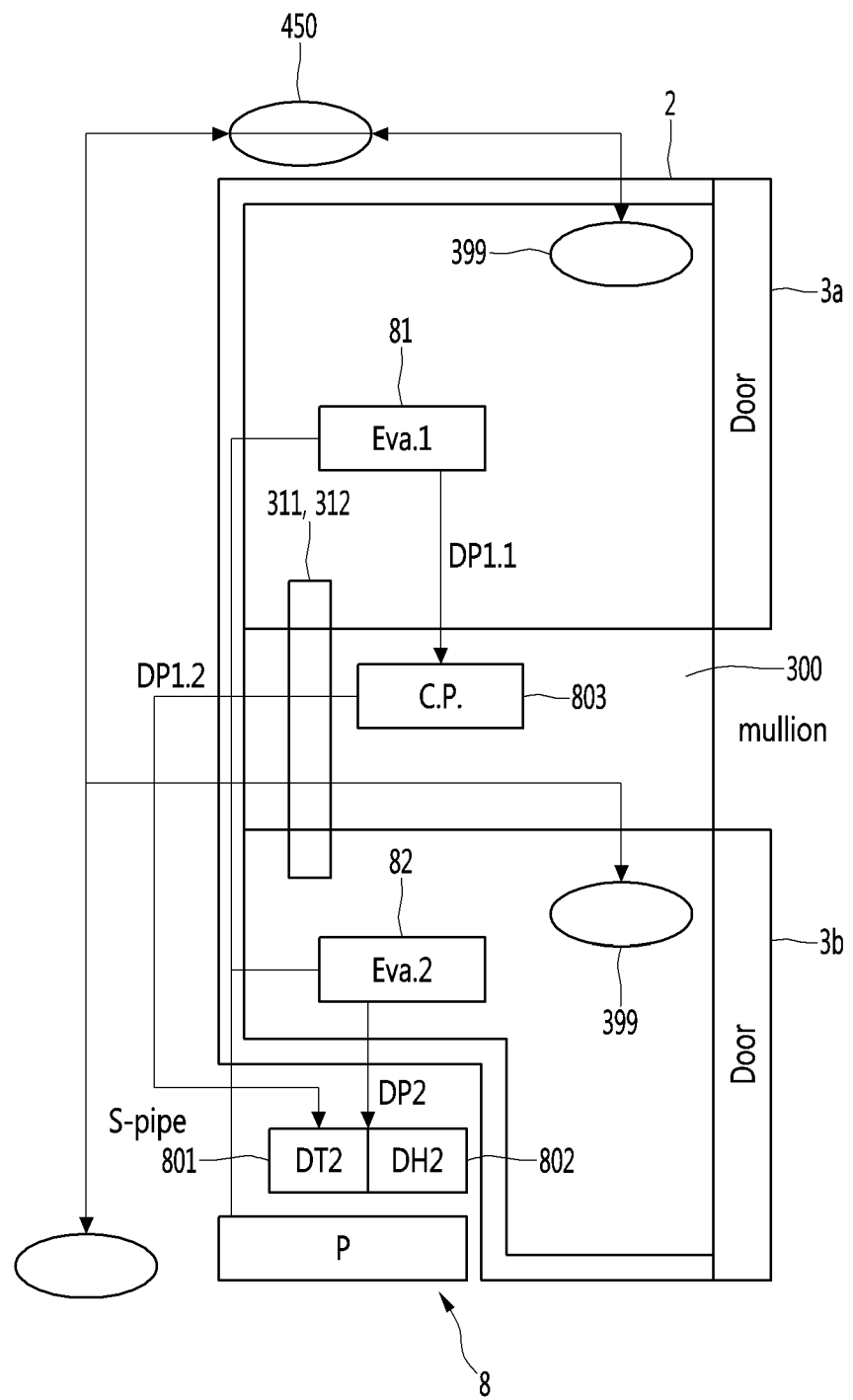

Referring to FIG. 52, in a case of the present embodiment, an evaporator is separately installed in each divided space of the main body 2 divided by the mullions 300, which is different from the previous embodiment. Portions different from those of the previous embodiment will be described, and the same constitution will be applied to the same description as the previously described explanation.

The supply path of the refrigerant and cool air will be described. First, the cool air is explained. The cool air is provided by the evaporators or first and second evaporators (Eva.1 and Eva.2) 81 and 82 placed in the divided inner part of the main body 2, that is, the first space, respectively, so as to be supplied to each divided inner part of each main body 2.

The refrigerant supply to the evaporators 81 and 82 will be described. The refrigerant can be provided to each evaporator 81 and 82 which is placed in the first space in a state before the evaporation by the member including the compressor P placed in the machine chamber 8 provided in the second space. Multi-ducts corresponding to the respective evaporators 81 and 82 may also be provided, respectively.

The heat exchange curved pipe can be installed in the same manner as that described above, and the heat exchange curved pipe 901 and 902 can be placed in the vacuum space part 50, and in a case where the inner space of the vacuum space part 50 is insufficient or there is interference, the heat exchange curved pipe 901 and 902 can be placed inside the mullion 300.

The refrigerant which is compressed/condensed/expanded in the machine chamber 8 and directed to the evaporators 81 and 82 can be branched and supplied and the branched point may be placed on the inside of the machine chamber 8, the inside of the vacuum adiabatic body, or the inside of the mullion 300. The refrigerant evaporated in the evaporators 81 and 82 can perform heat exchange through the respective heat exchange curved pipes 901 and 902.

The discharge path of the defrost water will be described. The defrost water generated in the first evaporator 81 placed in the first space can be collected primarily in the defrost water connection part 803 positioned inside the mullion 300 placed in the first space. Thereafter, the defrost water can be guided to the drain tray 801 inside the machine chamber 8 and removed by the drain heater 802.

The defrost water generated in the second evaporator 82 is collected in the drain tray 801 positioned in the machine chamber 8 penetrating the third space and placed in the second space and can be properly vaporized and removed by the drain heater (DH2) 502.

The aspect of the drain pipe DP, the position of the drain pipe, and the modified embodiment of the drain pipe may be applied to the present embodiment in a case of the previously described embodiment.

According to the present embodiment, it is expected that the present invention can be applied to a case where it is difficult to provide a cool air flow path to the mullion 300 or a case of a high-grade product which actively controls the inner space divided by the mullion 300.

Figure 53:
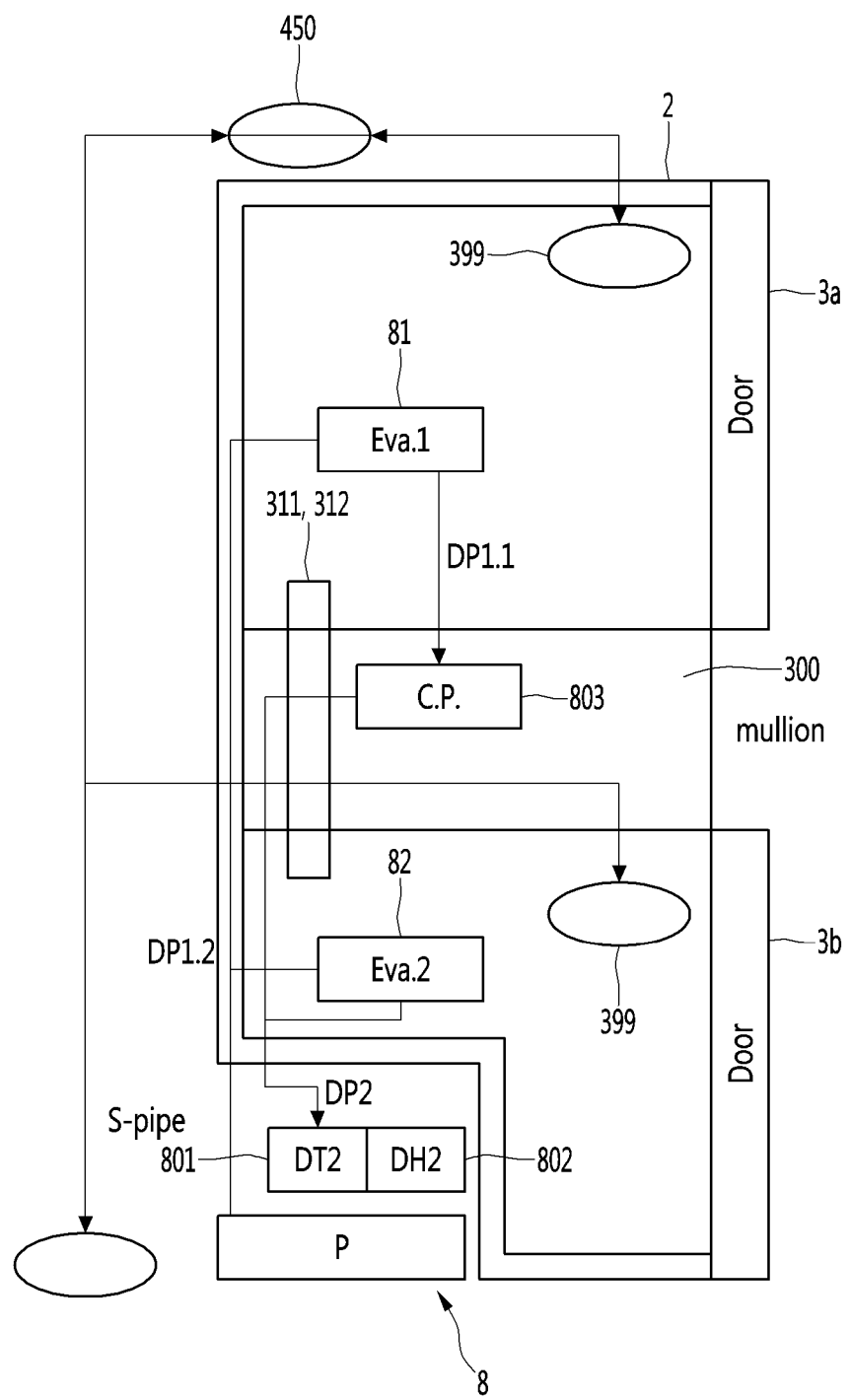

Referring to FIG. 53, the present embodiment characteristically differs from the embodiment in FIG. 52 in that a drain pipe is provided. The defrost water generated in the second evaporator 82 is collected in the drain tray 801 positioned in the machine chamber 8 passing through the third space 50 and placed in the second space and can be properly vaporized and removed by the drain heater (DH2) 502.

A drain pipe passing through the third space is provided, and the drain water can pass through the drain pipe. The drain pipe DP2 may pass through the welding pipeline and the corrugated conductive resistance sheet 63. The drain pipe DP2 is illustrated as passing through the bottom surface of the vacuum adiabatic body in the drawing, but may also be drawn out through the rear and side surfaces.

The defrost water generated in the first evaporator 81 can be guided to the defrost water connection part 803 positioned inside the mullion 300, that is, the first space, through the drain pipe DP1.1. The defrost water connection part 803 can primarily collect the defrost water. The defrost water received in the defrost water connection part 803 can move to a drain pipe or a second drain pipe DP1.2 along the inner space of the vacuum adiabatic body, that is, the first space, and be merged at the inlet side of the drain pipe DP2 removing the defrost water from the second evaporator 82. In other words, the defrost water of each of the evaporators 81 and 82 can be combined in the first space and can be guided to the second space through the third space together.

In a case of this embodiment, it can be applied when it is not easy to provide separate pipelines on the outer wall part of the vacuum adiabatic body in a case of a high-class refrigerator.

INDUSTRIAL AVAILABILITY

The present invention proposes a utilization method of each constitution of a refrigerator which is divided by a dividing wall or mullion in a case where a single vacuum adiabatic body is used.

According to the present invention, there is proposed a method for actively controlling the environment in a refrigerator using a vacuum adiabatic body as needed in a refrigerator in which refrigeration and freezing are required together.

This suggests that the vacuum adiabatic body can be used more industrially.

The invention claimed is:
1. A vacuum adiabatic body, comprising:
   a first plate;
   a second plate, a vacuum space being provided between the first plate and the second plate;
   a support configured to maintain a distance between the first plate and second plate, the support being positioned to contact or to be adjacent to the first plate; and
   a perforation plate spaced apart from the first plate by a gap to allow passage of cool air, the perforation plate having at least one hole through which the cool air is discharged from the gap.

2. The vacuum adiabatic body of the claim 1,
wherein the first plate includes at least one wall to define a first space to store items, and
wherein the at least one hole is configured to discharge the cool air into the first space.

3. The vacuum adiabatic body of claim 2,
wherein the at least one wall includes a rear wall, a pair of side walls and an upper wall, and
wherein the perforation plate is provided at a position spaced apart from at least one of the rear or the upper walls.

4. The vacuum adiabatic body of claim 3,
wherein the perforation plate is spaced apart from and frontward of the rear wall, and
wherein the perforation plate extends across an entirety of the rear wall.

5. The vacuum adiabatic body of claim 3,
wherein the perforation plate is spaced apart from and downward of the upper wall, and
wherein the perforation plate extends across an entirety of the upper wall.

6. The vacuum adiabatic body according to claim 1, wherein the perforation plate is provided at a position spaced apart from the rear wall and has an upper portion and a lower portion, the upper portion of the partition plate being configured to discharge a relatively larger amount of the cool air than the lower portion of the partition plate.

7. The vacuum adiabatic body according to claim 6,
wherein at least one hole includes at least one first hole provided in the upper portion of the perforation plate and at least one second hole provided in the lower portion of the partition plate, and
wherein the first hole is relatively larger than the second hole.

8. The vacuum adiabatic body according to claim 6,
wherein the at least hole includes at least three holes,
wherein a number of the holes provided in the upper portion of the partition plate is greater than a number of the holes provided in the lower portion of the partition plate.

9. The vacuum adiabatic body according to claim 1, wherein the perforation plate is provided at a position spaced apart from the upper wall, and the perforation plate has a front portion and a rear portion, the front portion of the partition plate being configured to discharge a relatively larger amount of the cool air than the rear portion of the partition plate.

10. The vacuum adiabatic body according to claim 9,
wherein at least one hole includes at least one first hole provided in the front portion of the perforation plate and at least one second hole provided in the rear portion of the perforation plate, and
wherein the first hole is larger than the second hole.

11. The vacuum adiabatic body according to claim 9,
wherein the at least hole includes at least three holes,
wherein a number of the holes provided in the front portion of the partition plate is relatively greater than a number of the holes provided in the rear portion of the partition plate.

12. The vacuum adiabatic body according to claim 2, further comprising a door configured to open or close the first space.

13. The vacuum adiabatic body according to claim 1, wherein the at least one hole includes a plurality of holes arranged in at least two columns and at least two rows.

14. The vacuum adiabatic body according to claim 1, wherein the at least one hole includes a plurality of holes that are distributed across an entire surface of the perforation plate.

15. The vacuum adiabatic body according to claim 1, wherein the at least one hole includes a plurality of holes that are distributed across the entire surface of the perforation plate at an uneven density.

16. A vacuum adiabatic body, comprising:
a first plate;
a second plate;
a vacuum space being provided between the first plate and the second plate;
a support configured to maintain a distance between the first plate and second plate, the support being positioned to contact or to be adjacent to the first plate;
a cover spaced apart from the first plate and having at least one hole through which cool air is discharged; and
a cooling air passage formed between the first plate and the cover.

17. The vacuum adiabatic body according to claim 16, wherein the cover includes a cooling duct that is spaced apart from and forward of the first plate, and
wherein a division wall is provided between the cooling duct and the first plate, and the divisional wall is configured to divide an inner space defined by the first plate and the cooling duct.

18. The vacuum adiabatic body according to claim 16, wherein the cover includes a perforation plate provided at a position adjacent to the first plate, and
wherein the perforation plate extends across an entirety of the first plate.

19. A vacuum adiabatic body, comprising:
a first plate;
a second plate, a vacuum space being provided between the first plate and the second plate;
a support configured to maintain a distance between the first plate and second plate, the support being positioned to contact or to be adjacent to the first plate; and
a perforation plate spaced apart from the first plate by a gap through which cool air passes,
wherein the perforation plate includes a plurality of holes that have a size and a density configured to increase in a downstream flow direction of the cool air in the gap.

20. The vacuum adiabatic body of claim 19,
wherein the first plate includes a rear wall, a pair of side walls and an upper wall,
wherein the perforation plate includes a first perforation plate that is provided at a position spaced apart from the rear wall, and a second perforation plate that is provided at a position spaced apart from the upper wall,
wherein the plurality of holes include first holes included in the first perforation plate, and the size and the density of the first holes increase in a direction of an upward stream of the cool air flowing through the gap, and
wherein the plurality of holes include second holes included in the second perforation plate, and the size and the density of the second holes increase in a direction of a frontward stream of the cool air flowing through the gap.

* * * * *